US012597420B2

(12) United States Patent
Wang

(10) Patent No.: US 12,597,420 B2
(45) Date of Patent: Apr. 7, 2026

(54) ENABLING USER-CENTERED AND CONTEXTUALLY RELEVANT INTERACTION

(71) Applicant: Polypie Inc., Atascadero, CA (US)

(72) Inventor: Jenny Z. Wang, Atascadero, CA (US)

(73) Assignee: Polypie Inc., Atascadero, CA (US)

( * ) Notice: Subject to any disclaimer, the term of this patent is extended or adjusted under 35 U.S.C. 154(b) by 186 days.

(21) Appl. No.: 18/129,898

(22) Filed: Apr. 3, 2023

(65) Prior Publication Data

US 2023/0245651 A1 Aug. 3, 2023

Related U.S. Application Data

(63) Continuation-in-part of application No. 17/200,901, filed on Mar. 14, 2021, now Pat. No. 11,632,341.

(60) Provisional application No. 62/989,589, filed on Mar. 14, 2020.

(51) Int. Cl.

| | |
|---|---|
| ***G10L 15/22*** | (2006.01) |
| ***G10L 15/18*** | (2013.01) |
| ***G10L 25/63*** | (2013.01) |
| *G06F 40/35* | (2020.01) |

(52) U.S. Cl.

CPC .......... *G10L 15/1815* (2013.01); *G10L 15/22* (2013.01); *G10L 25/63* (2013.01); *G06F 40/35* (2020.01); *G10L 2015/223* (2013.01)

(58) Field of Classification Search

CPC ....... G10L 15/183; G10L 15/22; G06F 3/167; G06F 40/35

See application file for complete search history.

(56) References Cited

U.S. PATENT DOCUMENTS

| | | | | |
|---|---|---|---|---|
| 9,318,108 | B2 * | 4/2016 | Gruber .............. | H04M 1/72484 |
| 10,891,682 | B2 * | 1/2021 | Swanson ............ | G06Q 30/0224 |

(Continued)

FOREIGN PATENT DOCUMENTS

| | | | |
|---|---|---|---|
| EP | 2787468 | B1 | 4/2016 |
| JP | 2020505673 | A | 2/2020 |
| WO | 2020/098188 | A1 | 5/2020 |

OTHER PUBLICATIONS

International Search Report and Written Opinion, Application No. PCT/IB2022/052252, mailed Jun. 16, 2022.

*Primary Examiner* — Daniel Abebe

(57) ABSTRACT

An approach is disclosed for enabling contextually relevant conversational interaction. Environment data is received by an AI System which detects a plurality of physical objects in a physical environment and forms a contextual understanding of the plurality of physical objects and the physical environment and identifies a user relevant to the contextual understanding. A most relevant contextual information to the user is predicted by the AI system and transformed into a textual form. A set of intents and objectives is predicted by the AI system for user-centered interaction. The AI system and the user interact iteratively through the user-centered interaction to determine an understanding of a most relevant intent and a most relevant objective which is validated by the AI system with the user until the user agrees. The validated most relevant intent and the most relevant objective is utilized to facilitate the user-centered and contextually relevant conversational interaction.

20 Claims, 24 Drawing Sheets

(56) References Cited

U.S. PATENT DOCUMENTS

| | | | | |
|---|---|---|---|---|
| 2003/0194062 | A1* | 10/2003 | Nelson | G06Q 10/10<br>379/67.1 |
| 2013/0134213 | A1 | 5/2013 | Pallakoff et al. | |
| 2014/0095147 | A1* | 4/2014 | Hebert | G06F 40/30<br>704/9 |
| 2015/0099257 | A1 | 4/2015 | Kozloski et al. | |
| 2016/0077711 | A1 | 3/2016 | Jung et al. | |
| 2016/0093106 | A1* | 3/2016 | Black | G06V 20/653<br>345/633 |
| 2018/0124245 | A1 | 5/2018 | Klein et al. | |
| 2018/0321931 | A1 | 11/2018 | El Maghraoui et al. | |
| 2018/0349976 | A1 | 12/2018 | Viswanathan | |
| 2019/0042988 | A1 | 2/2019 | Brown et al. | |
| 2019/0188590 | A1* | 6/2019 | Wu | G06F 40/30 |
| 2019/0394145 | A1* | 12/2019 | Le Huerou | H04L 51/04 |
| 2020/0137230 | A1 | 4/2020 | Spohrer et al. | |
| 2021/0117948 | A1 | 4/2021 | Voss | |
| 2021/0271726 | A1* | 9/2021 | Trainor | G06Q 10/0837 |

* cited by examiner

1) OKB is a trademark of Polypie Inc,
2) Wi-Fi is a trademark of *Wi-Fi Alliance.*
3) Bluetooth is a trademark of Bluetooth SIG, Inc.
4) NFC is a trademark of Never Fame Over Currency, LLC.

400

AI system gathers domain knowledge, expert input, and law application examples from various sources — 401

AI system creates algorithms and scripts with ML, NLP, genetic algorithms, and symbolic AI methods — 402

AI system analyzes context using pattern recognition, NLP, and other techniques — 403

AI system identifies applicable rule(s) or law(s) — 404

AI system retrieves relevant algorithm(s) or script(s) from rules engine based on recognized context — 405

AI system applies retrieved relevant algorithm(s) or script(s) in the given scenario — 406

AI system learns continuously — 407

AI system updates algorithms and scripts in the rules engine — 408

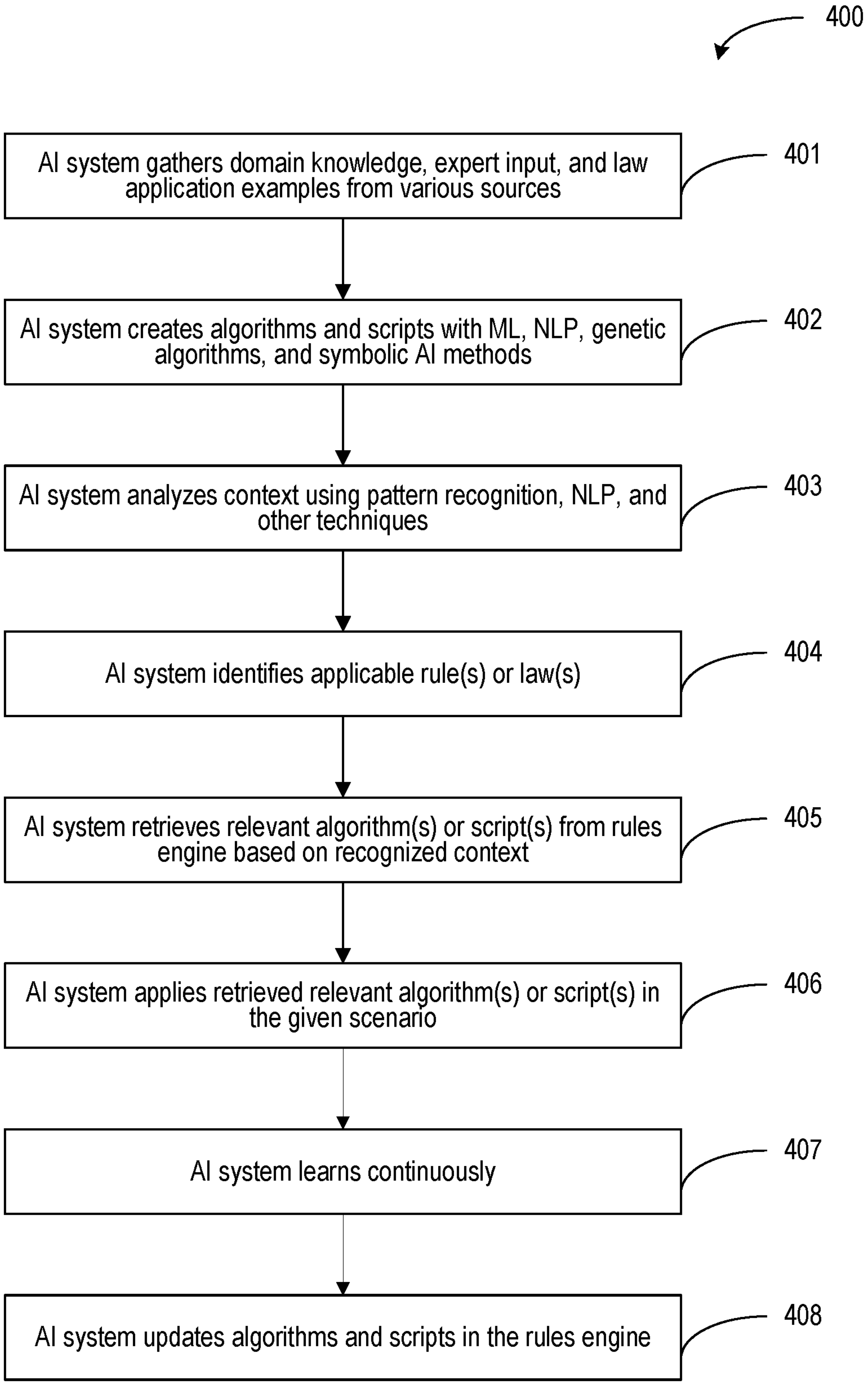

AI system receives input from the user — 601

AI system processes the user's input using the NLP engine to extract relevant information — 602

AI system analyzes the extracted relevant information using the NLP engine — 603

AI system extracts the relevant information and identifies the user's intent using natural language understanding (NLU) techniques — 604

AI system analyzes the user's intent using the intent classification component — 605

AI system selects the most appropriate response or action to fulfill the user's request using the response selection component — 606

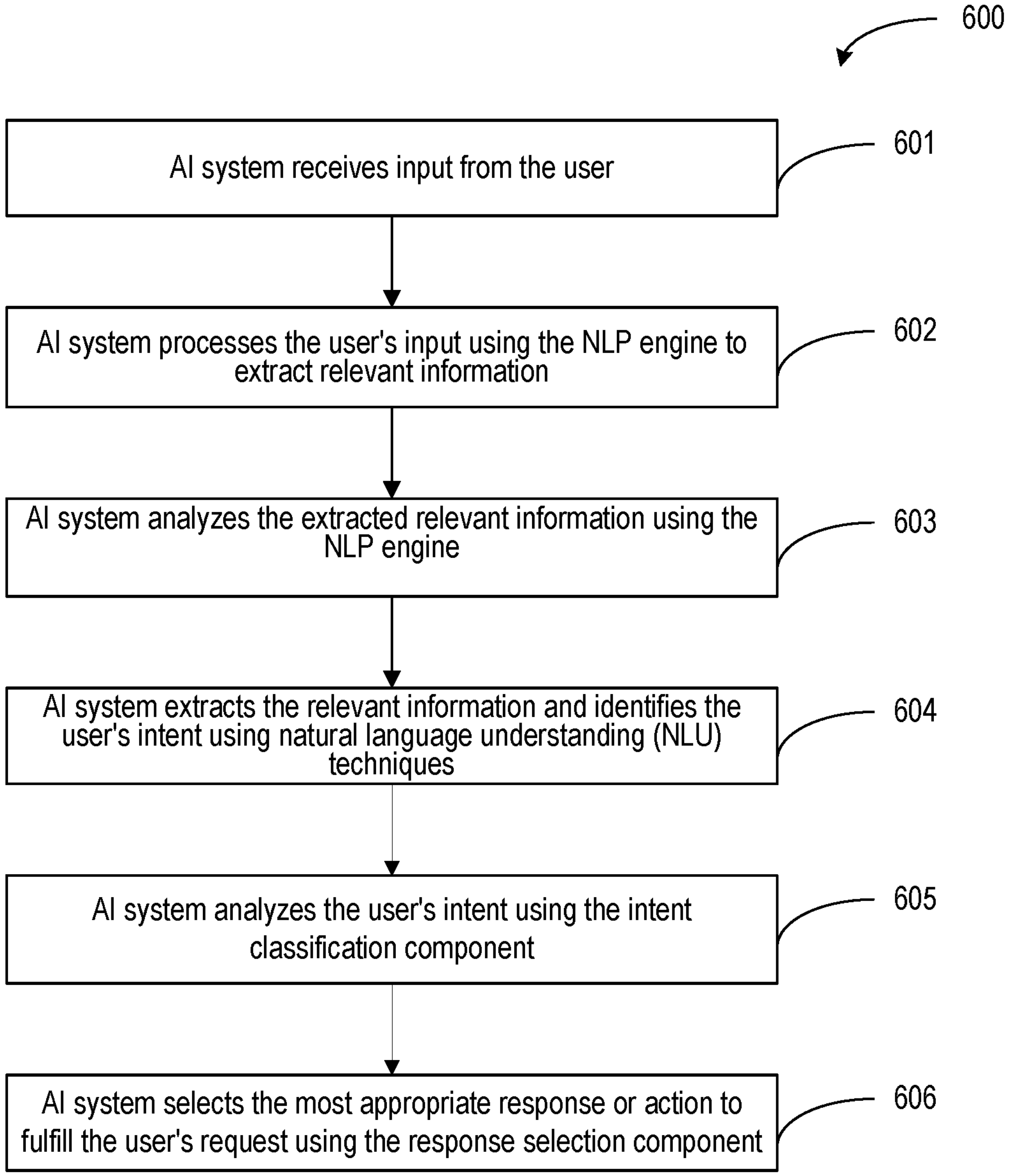

AI system identifies the type of notification to be generated — 901

AI system evaluates the notification's relevance and urgency — 902

AI system selects the appropriate recipients based on the notification's relevance and urgency — 903

AI system generates a notification — 904

AI system selects an appropriate channel — 905

AI system sends the notifications through the preferred communication channel — 906

AI system tracks the delivery status — 907

AI system provides confirmation to the sender — 908

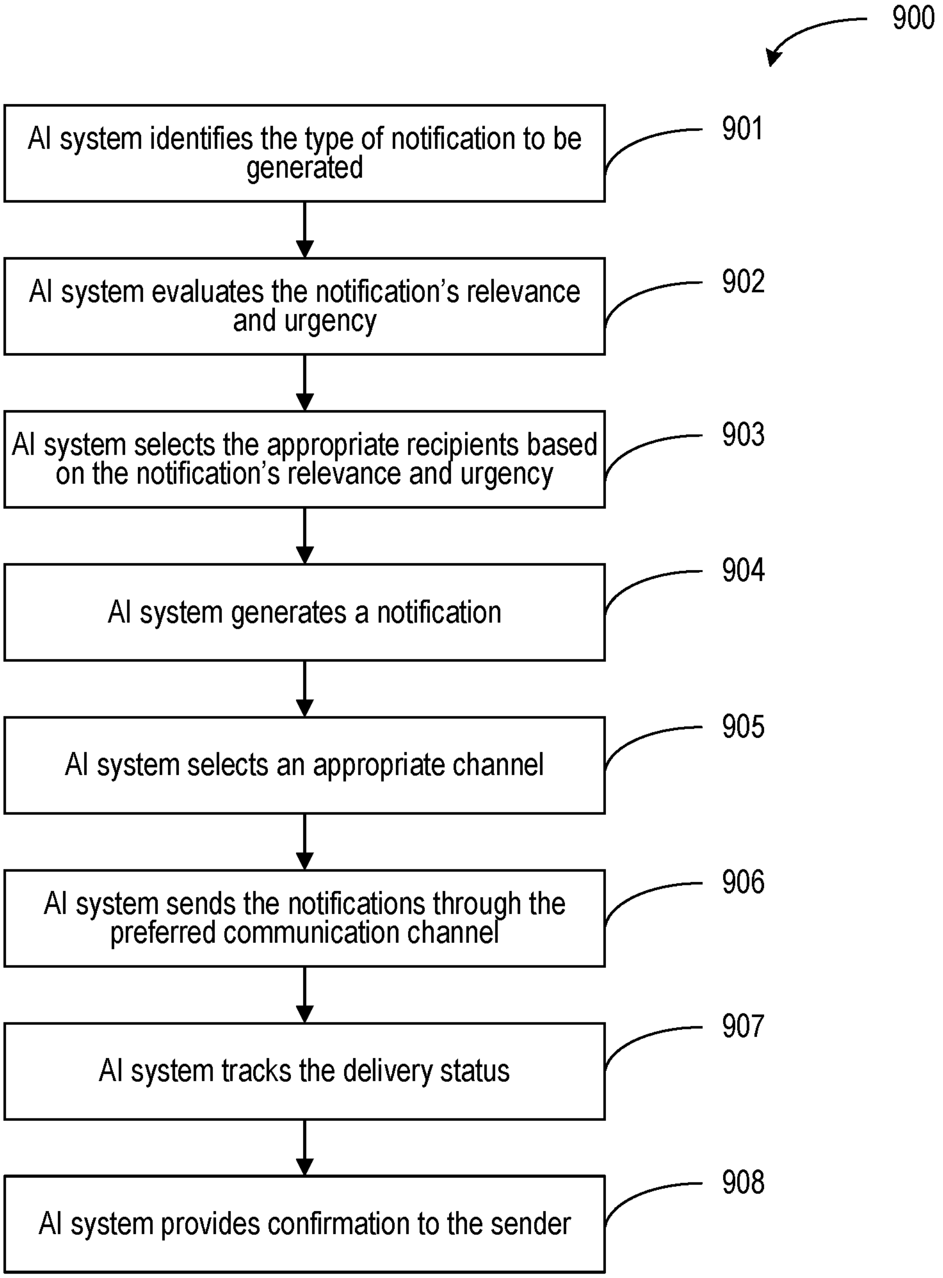

1001 — AI application receives environment data

1002 — AI application sends environment data to AI system

1003 — AI system receives and analyzes environment data

1004 — AI system detects physical objects in the environment

1005 — AI system generates contextual information about the detected objects in the environment 1006 — AI system forms a set of contextual understanding 1007 — AI system identifies a relevant user with conversational capabilities 1008 — AI system predict the most relevant contextual information for the identified relevant user 1009 — AI system transforms the most relevant contextual information into textual form 1010 — AI system predicts a set of intents and objectives for the user-centered contextual relevant interaction

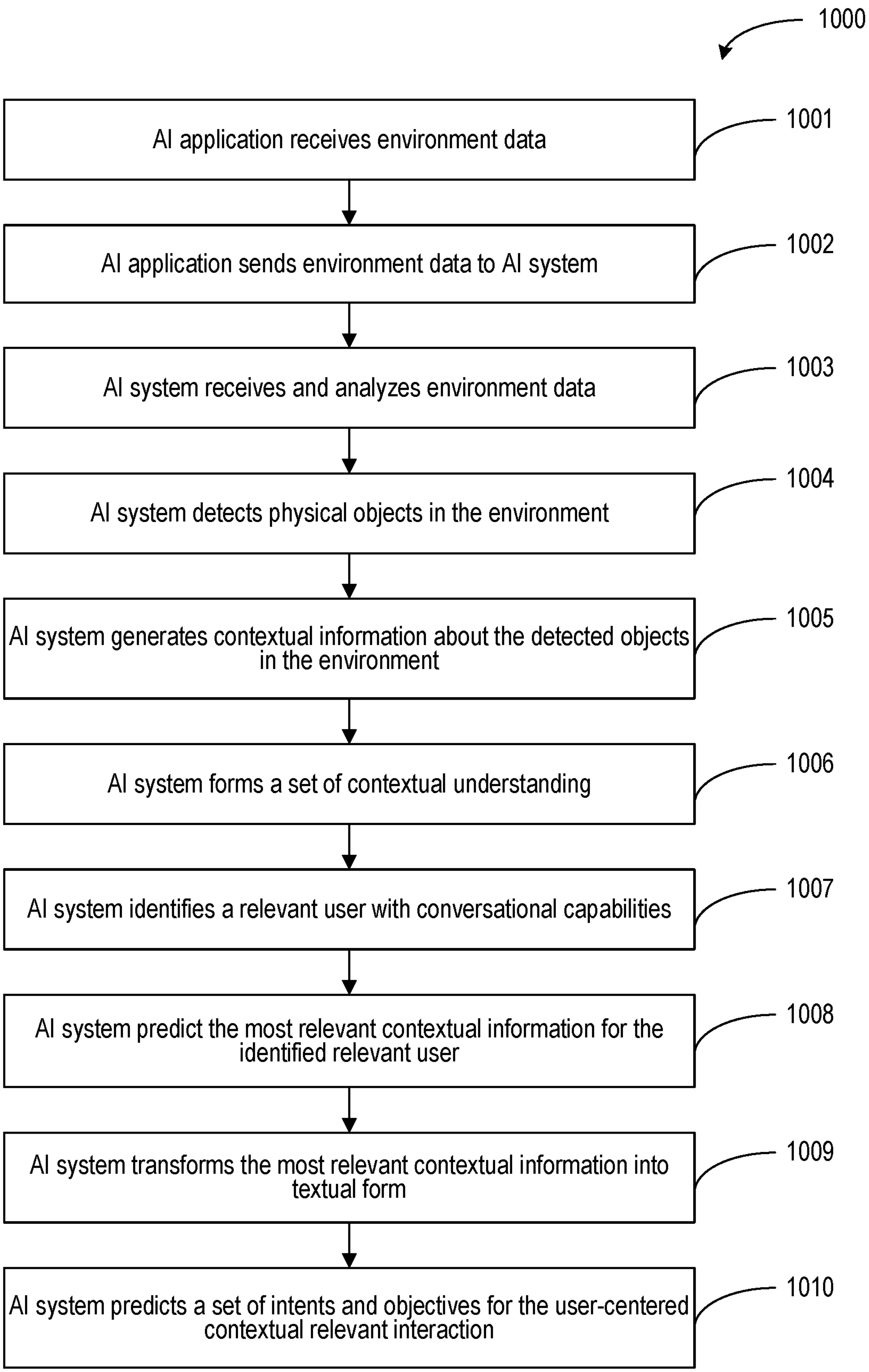

AI application engages in a conversational interaction with the user iteratively — 1101

AI application sends interaction data to the AI system — 1102

AI system receives and analyzes the interaction data — 1103

AI system determines the most relevant intent and objective — 1104

AI system validates the understanding of the most relevant intent and objective with the user — 1105

AI system continues to interact with the user until an agreement is reached — 1106

AI application utilizes the validated intent and objective to facilitate user-centered and contextually relevant interaction — 1107

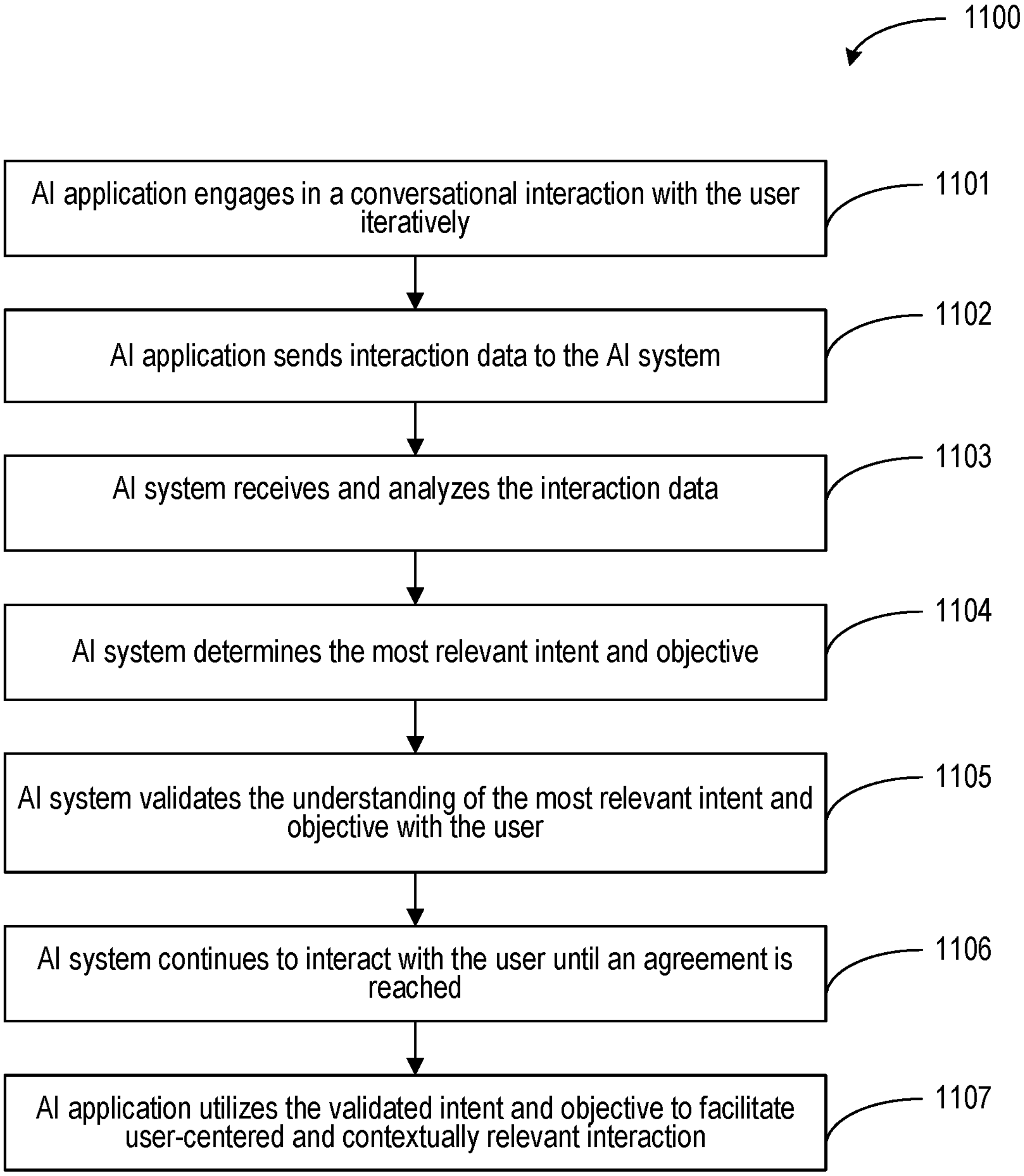

AI system collects, classifies, and categorizes environment data — 1301

AI system applies predefined rules to filter and select relevant objects — 1302

AI system uses ML algorithms to further refine the object selection process — 1303

AI system outputs the most relevant objects based on the processed environment data — 1304

AI system links the selected object with the classified and categorized environment data — 1305

AI system utilizes the associated environment data and objects to provide contextually relevant and personalized interaction — 1306

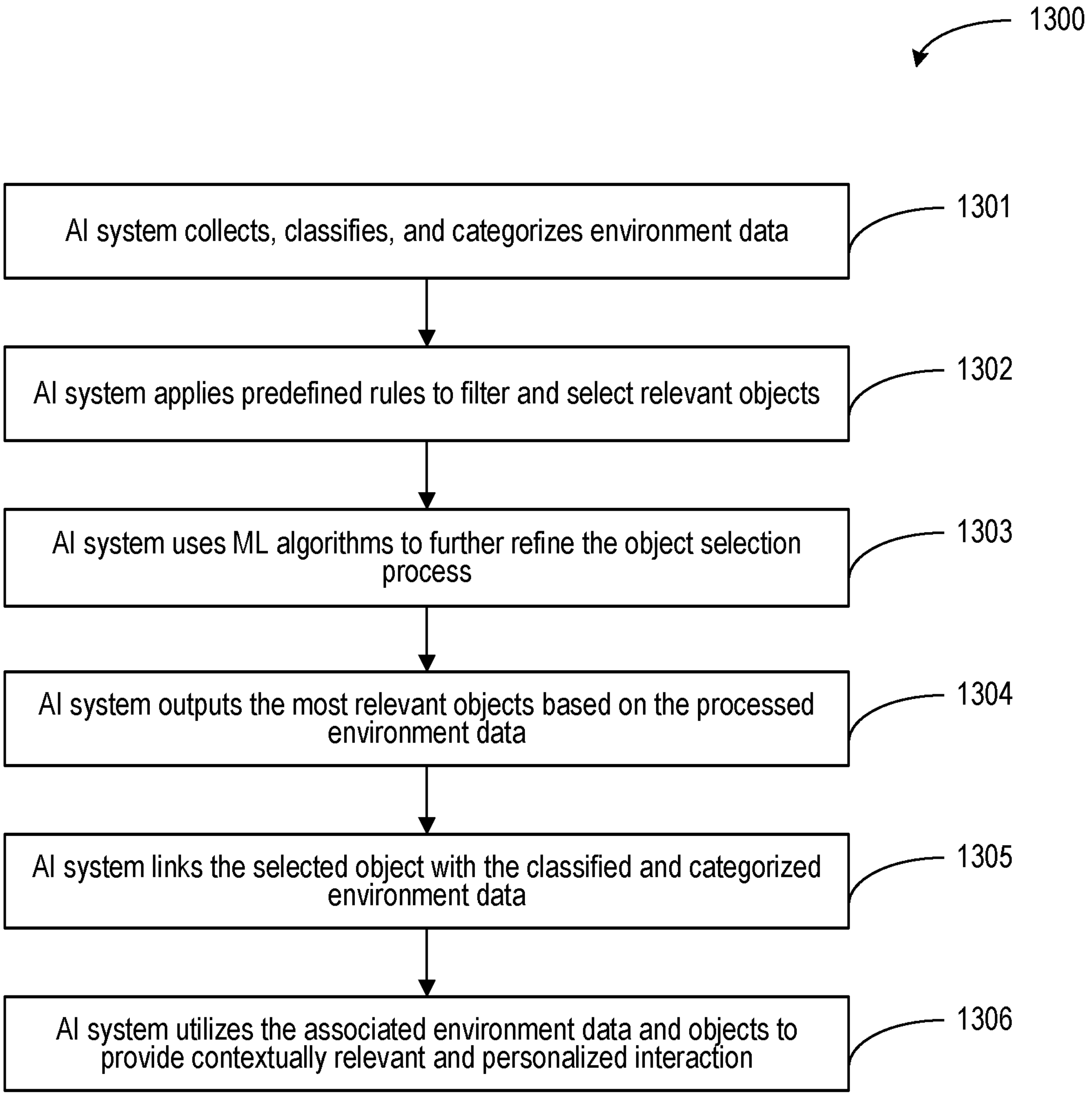

AI system collects data about the environment through various sensors and smart devices — 1601

AI system collects data from various sources and then preprocesses it to remove noise and irrelevant information — 1602

The AI system processes and categorizes preprocessed data based on various factors such as object type, location, and temperature — 1603

AI system uses ML algorithms to analyze labeled data with the ECAP model, which identifies patterns and trends in the environment — 1604

AI system uses contextual matching (CM) method to present the most relevant information to the user based on their current situation and preferences — 1605

AI system utilizes ECAP and CM insights in the context-aware model (CAM) to provide personalized and relevant responses for the user — 1606

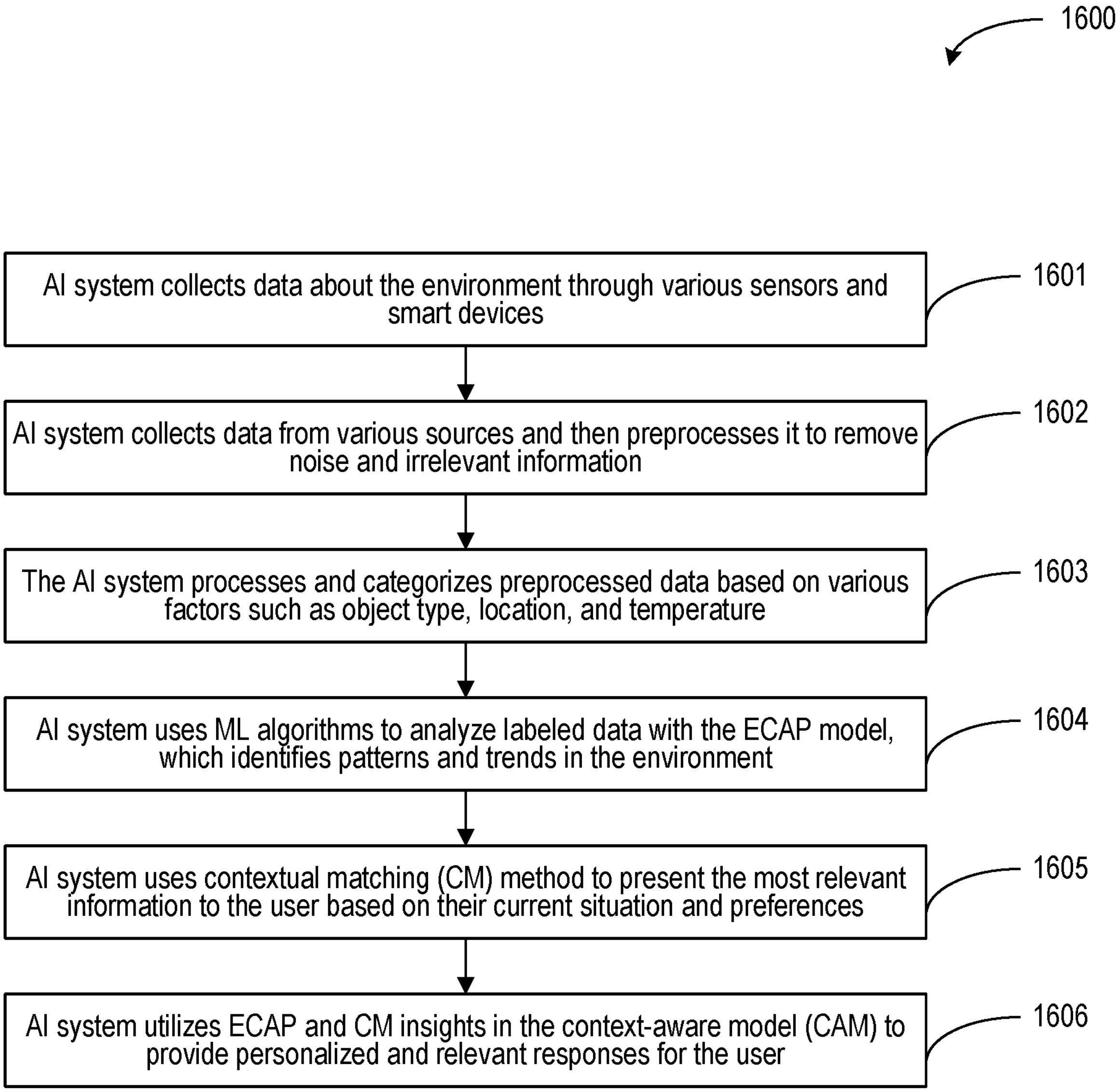

1901
AI system collects the user's input and any available contextual information 1902
AI system uses NLU algorithms to understand user's intent and objective from the collected data 1903
AI system cross-references analyzed data with its knowledge base to identify gaps / discrepancies affecting accuracy 1904
Is additional information required?

Yes

1905
AI system proceeds to identify the additional information

1906
AI system generates a request for clarification or more information from the user 1907
Did the user respond to the AI system's request?

Yes

1909
AI system retrieves the relevant information and integrates it with the available contextual information 1910
AI system analyzes the integrated information No 1908
AI system attempts to determine user's intent and objective using available context and past interactions

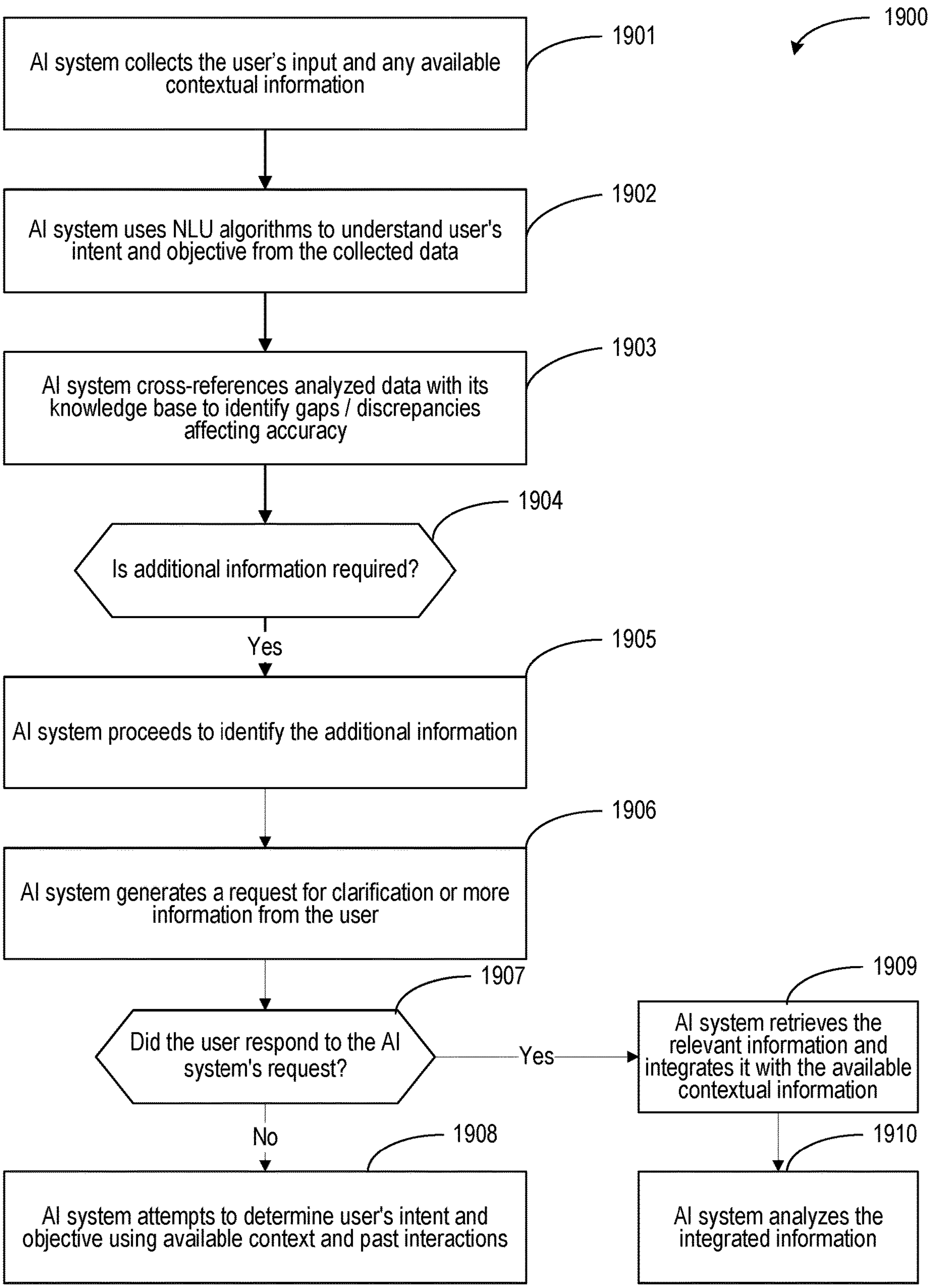

2001 — AI system receives input from the user

2002 — AI system processes the input using a language model

2003 — AI system uses the empathy model (EM) to analyze the emotional tone of the input 2004 — AI system determines the appropriate emotional response 2005 — AI integrates the emotional response with the language model AI-generated responses 2006 — AI system evaluates the responses based on various factors 2007 — AI system selects the most appropriate response 2008 — AI system presents the most appropriate response to the user

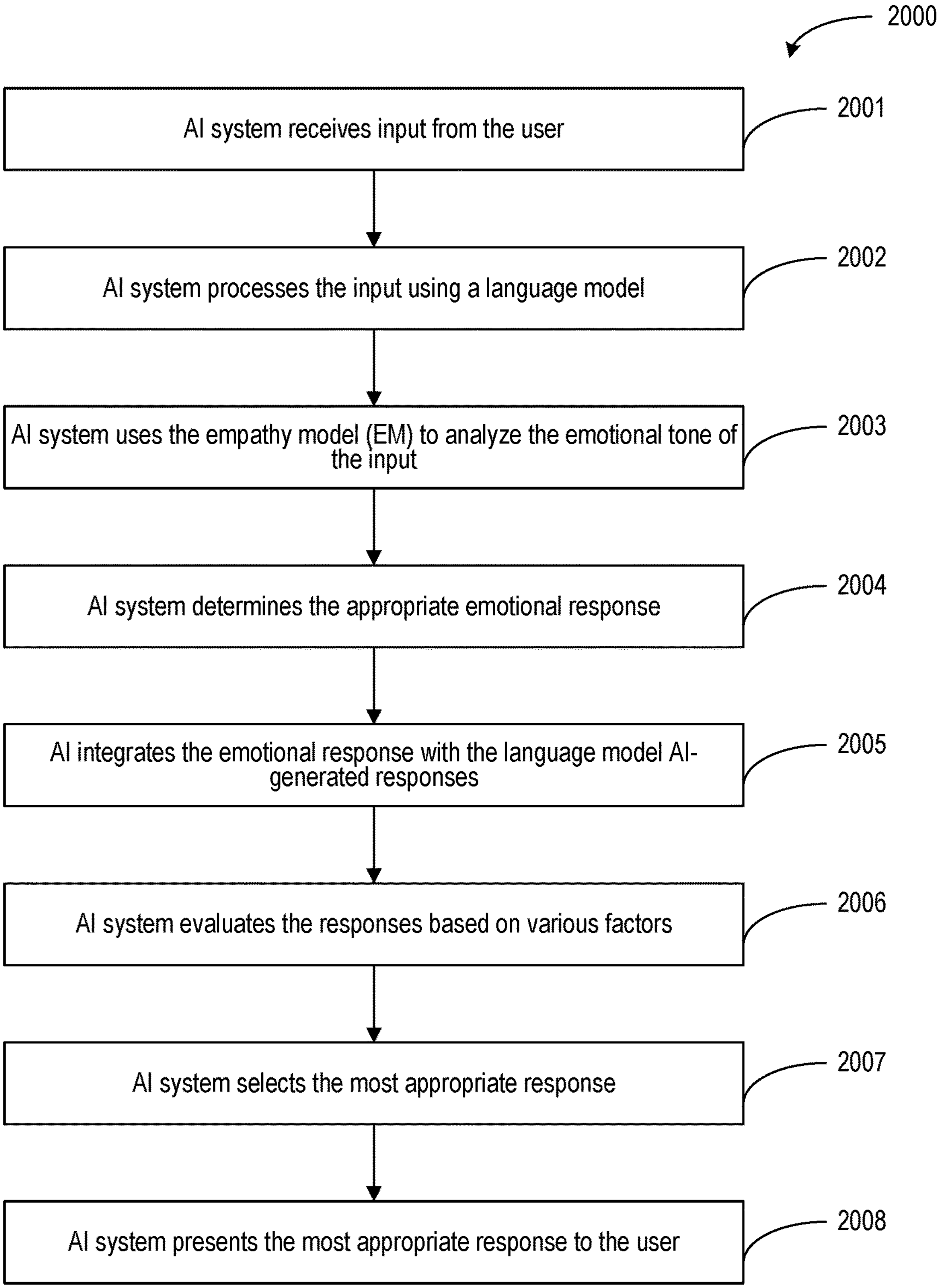

AI system receives input from the user

2102

AI system uses NLP techniques to analyze the user's tone, language, and attitude based on their input

2103

AI system identifies the user's emotional states and sentiments

2104

AI system generates an appropriate response that considers the user's emotional states and sentiments

2105

AI system continually evaluates the user's emotional states and sentiments to adjust its responses as needed to provide the most appropriate and effective communication

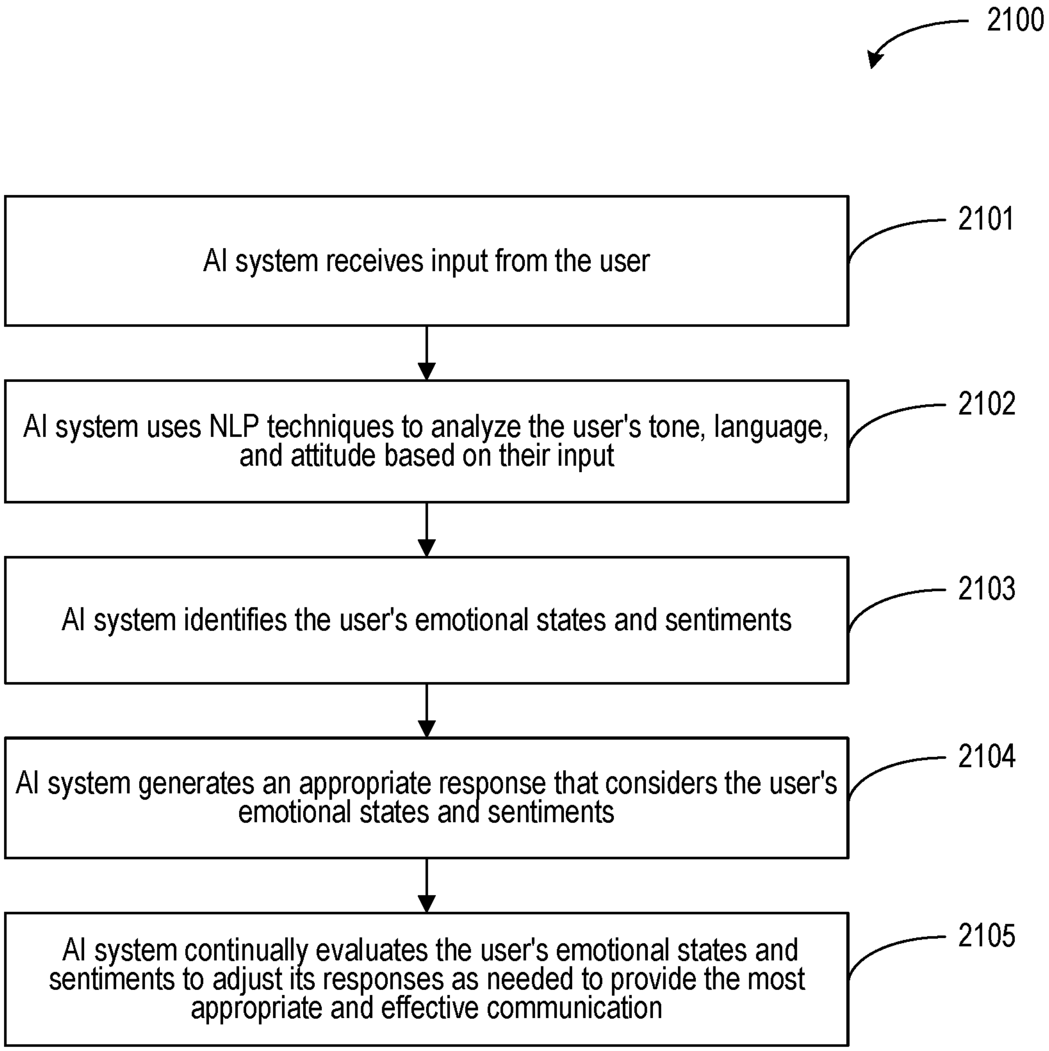

AI system receives input from the user — 2201

AI system retrieves relevant information about the user, such as their preferences, interests, and past behavior — 2202

AI system filters and analyzes the user data to identify relevant options — 2203

AI system generates personalized recommendations / suggestions based on the analyzed user data and relevant options — 2204

AI system presents the generated recommendations or suggestions to the user — 2205

User provides feedback on the recommendations or suggestions — 2206

AI system uses the user's feedback to update and improve the recommendations or suggestions — 2207

AI system updates OKB based on feedback to improve future recommendations — 2208

User has received and positively responded to the personalized recommendations or suggestions — 2209

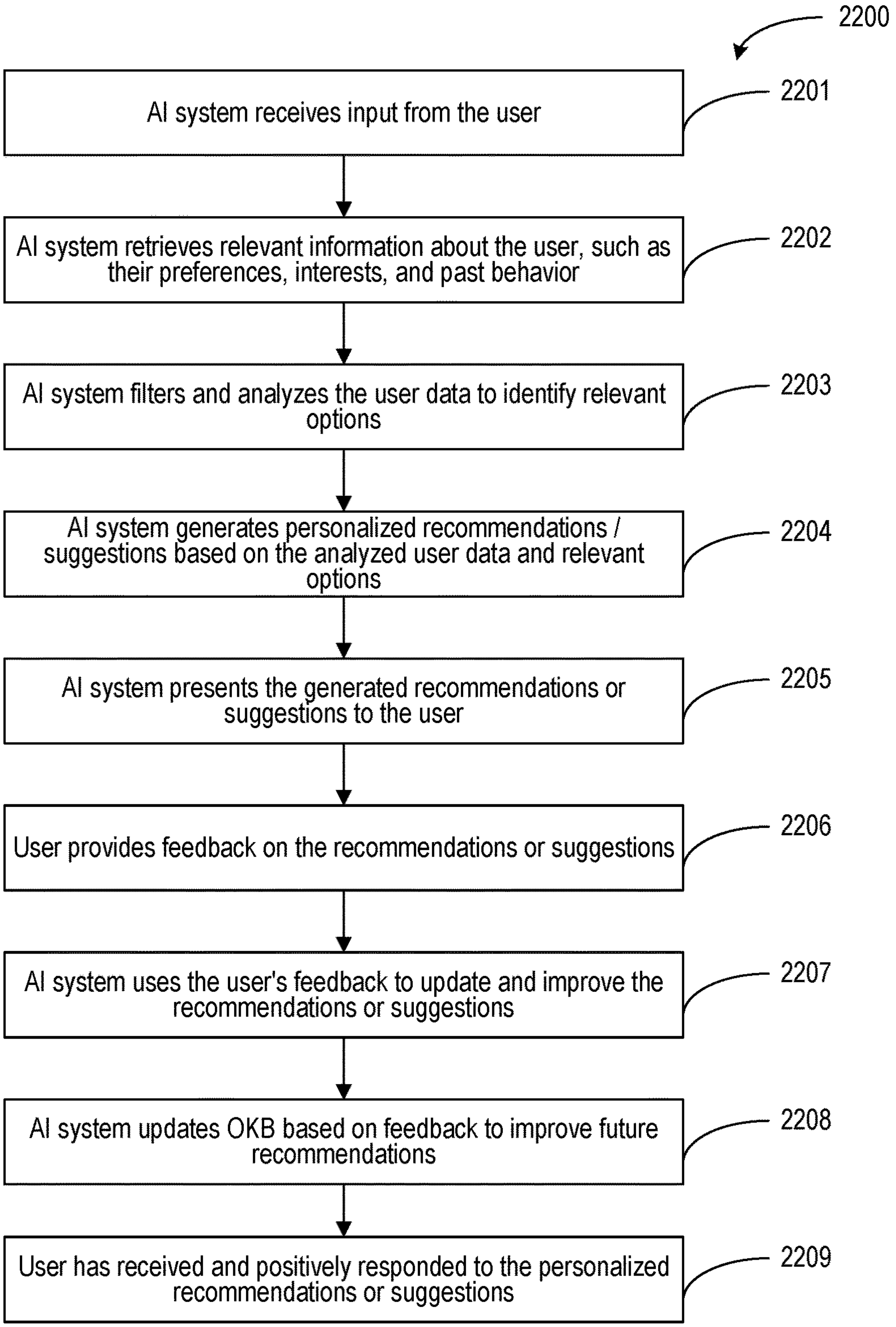

*FIG. 22*

ENABLING USER-CENTERED AND CONTEXTUALLY RELEVANT INTERACTION

If an Application Data Sheet (ADS) has been filed for this application, it is incorporated by reference herein. Any applications claimed on the ADS for priority under 35 U.S.C. §§ 119, 120, 121, or 365 (c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119 (e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a utility application related to and claims the benefit of priority from U.S. Provisional Patent Application No. 62/989,589 filed on Mar. 14, 2020.

BACKGROUND

The present invention relates to a computing environment, and more particularly to an approach for enabling contextually relevant communications.

SUMMARY

According to one embodiment of the invention, there is provided a method for enabling user-centered and contextually relevant conversational interaction. An artificial intelligence (AI) system receives and analyzes environment data to detect a plurality of physical objects in a physical environment. Information about the detected plurality of physical objects and the environment is generated by the AI system to form a set of contextual understanding of the plurality of physical objects and the environment. The AI system identifies a user relevant to the set of contextual understandings of the plurality of physical objects and the environment. The most relevant contextual information to the user is predicted by the AI system. The AI system then transforms the most relevant contextual information into textual form and predicts a set of intents and objectives for user-centered interaction. Through iterative conversational interaction, the AI system and the user establish an understanding of the most relevant intent and objective. The AI system validates the understanding of the most relevant intent and objective with the user iteratively until the user agrees. Finally, the AI system utilizes the validated the most relevant intent and objective to facilitate user-centered, contextually relevant, and personalized conversational interaction.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth.

BRIEF DESCRIPTION OF THE DRAWINGS

The present invention may be better understood, and its numerous objects, features, and advantages made apparent to those skilled in the art by referencing the accompanying drawings, wherein:

FIG. 4 depicts a flow chart illustrating a process of the AI system automatically generates algorithms and scripts as well as applies rules and laws.

FIG. 6 depicts a high-level block diagram illustrating a dialogue management module.

FIG. 9 depicts a flow chart illustrating a process of utilizing a notification system to inform a user or designated recipient regarding relevant information or updates.

FIG. 10 depicts a flow chart illustrating an AI system workflow for contextual understanding and user-centered interaction.

FIG. 11 depicts a flow chart illustrating the most relevant intent and objective determination and validation for contextually relevant engagement.

FIG. 13 depicts a flow chart illustrating a process of conditional selection to associate selected classified and categorized environment data with a selected object.

FIG. 16 depicts a flow chart illustrating the collaborative functioning of the environment context analysis and prediction (ECAP) model, a context matching (CM) method, and a context-aware model (CAM) to enhance the AI system in comprehending and anticipating the context within the environment.

FIG. 19 depicts a flow chart illustrating a process of evaluating user's inputs and available contextual information to enhance the understanding of the most likely intents and objectives.

FIG. 20 depicts a flow chart illustrating a process of generating a response by an empathy model (EM) and a language model AI.

FIG. 21 depicts a flow chart illustrating a process of identifying and responding to user emotions and sentiments.

FIG. 22 depicts a flow chart illustrating a process by which the AI system generates personalized recommendations or suggestions based on user preferences and behavior.

DETAILED DESCRIPTION

Figure 1:
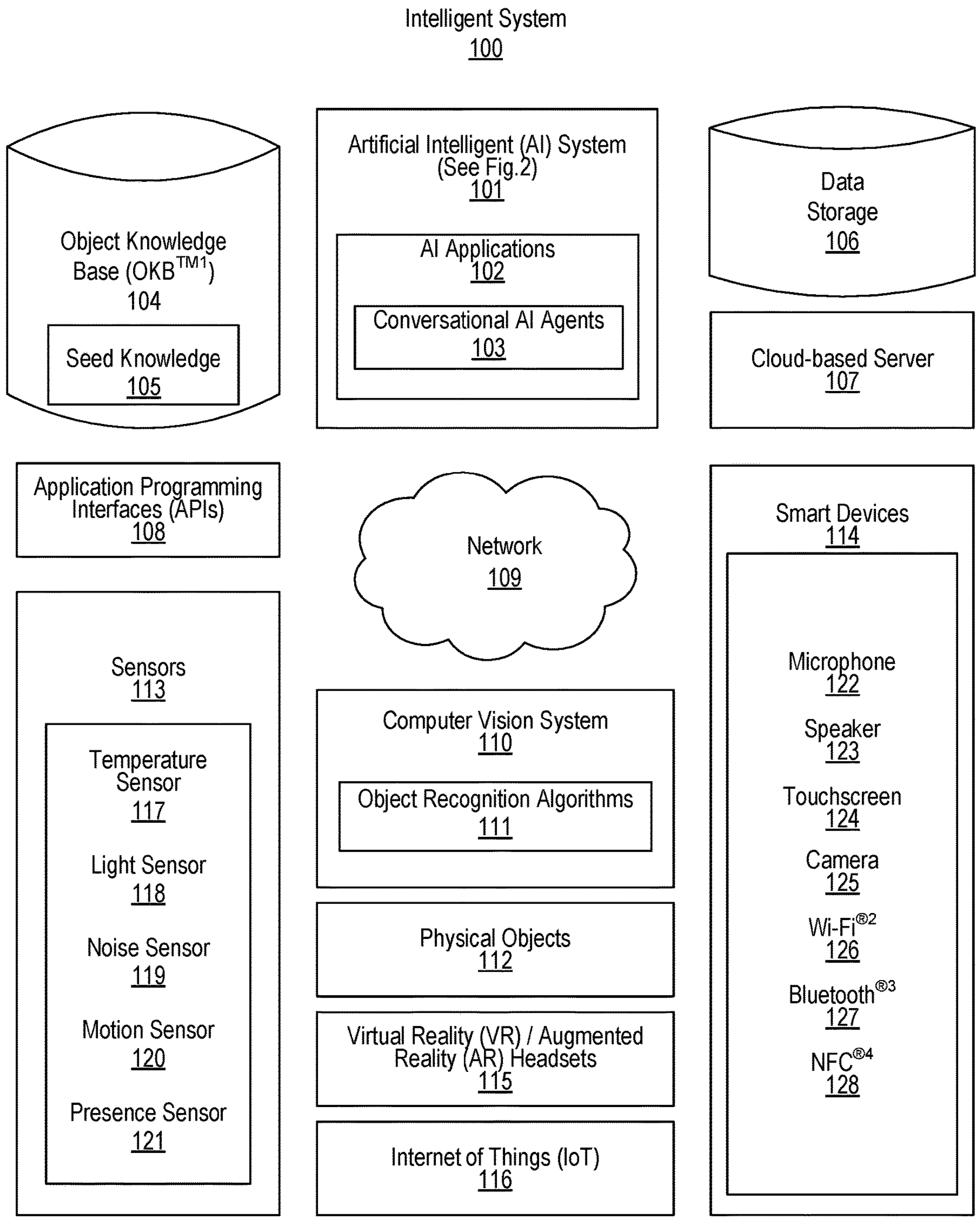
FIG. 1 depicts a high-level block diagram illustrating an intelligent system for contextually relevant conversational interaction.

This invention expands upon the rapidly evolving field of conversational AI. This field has seen significant advancements in recent years due to progress in natural language processing (NLP) and machine learning (ML) techniques. However, current conversational AI systems often exhibit limited capabilities and scope, failing to provide user-centered, contextually relevant, and personalized responses. Additionally, these systems often don't integrate well with other systems or applications. They also lack dynamic interaction with users, as they don't adaptively recognize or understand user intent and objectives, or objects and entities in the environment, which is typically a physical environment.

To overcome the deficiencies of the prior art, this disclosure depicts an AI system and a novel approach that overcomes the limitations of existing solutions. This is done by providing improved accuracy and efficiency in understanding contextual information in the environment and predicting the most relevant user intent and objective.

The present invention aims to deliver an improved user experience by considering individual preferences, conversational history, and communication styles. The AI system adapts its responses according to a user's past interaction or preferred tone, resulting in more effective and satisfying conversations.

Additionally, the invention incorporates contextual information, such as the user's current location, time, or activity, to provide more relevant and timely responses. Seamless integration with popular communication platforms, such as messaging apps or virtual assistants, is another key feature of the present invention. This integration allows users to access contextually relevant conversational interaction across different channels, simplifying the user experience by reducing the need to switch between apps or devices and increasing overall efficiency.

To accommodate a diverse range of users, the invention incorporates features and user interfaces that cater to users with special needs or disabilities, such as voice recognition, text-to-speech, or alternative input methods. These features make conversational interaction more accessible and inclusive.

Furthermore, the AI system is designed to handle a large number of users and diverse conversational topics, making it suitable for various industries and applications. In some embodiments, the invention can be utilized in customer support settings to improve response times and customer satisfaction. In other embodiments, the system may be employed in healthcare to assist patients with medication reminders and symptom tracking.

Embodiments disclosed include an intelligent system for enabling user-centered and contextually relevant interaction with physical objects in the environment. Embodiments of the disclosed approach support identifying user's intents and objectives in the environment. In addition, support is disclosed for providing personalized and empathetic responses based on the user's emotional states. Embodiments may include support to integrate with various sensors and other smart devices and systems to provide for a seamless user experience. For illustration purposes only, functionalities described herein may be referenced as modules, components, functions, algorithms, or the like. These functionalities may be implemented via various technologies, such as, but not limited to software compiled code, microcode, libraries, open source projects, and the like.

FIG. 1 depicts a high-level schematic representation of an intelligent system 100 designed for facilitating contextually relevant conversational interaction in a physical environment, in accordance with a plurality of embodiments.

The intelligent system 100 is a complex network of various technologies and components that work together to provide user-centered, contextually relevant, and personalized interaction with physical objects in the environment. The intelligent system 100 comprises an AI system 101 (see FIG. 2 and corresponding text), an Object Knowledge Base (OKBTM1) 104, and AI applications 102, which can be conversational AI agents 103.

The intelligent system 100 also includes data storage 106, cloud-based server 107, application programming interfaces (APIs) 108, and network 109. The data storage 106 stores and manages the vast amounts of data generated by the AI system 101. The cloud-based server 107 manages the processing and storage of data and provides computing power to enable the AI application to function. The network 109 connects the various components and allows for communication between them.

A computer vision system 110 and object recognition algorithms 111 are utilized by the AI system 101 for detecting physical objects 112 in the environment and analyzing visual data captured by cameras or sensors 113. In particular, the computer vision system 110 processes the visual data using object recognition algorithms to identify and classify objects in the environment.

Physical objects 112 or physical entities refer to tangible items and elements that exist in the real world and occupy space in the environment. These objects and entities can be seen, touched, and interacted with, and they often have properties such as size, shape, color, texture, and weight. Physical objects or physical entities can include a wide range of items, from everyday items like furniture, electronic devices, and vehicles, to natural elements like trees, rivers, and mountains.

Object recognition algorithms 111 use deep learning models and ML techniques to recognize and classify different types of physical objects 112, such as people, vehicles, animals, and other physical entities. These algorithms use feature extraction methods to identify unique characteristics of objects, such as shape, color, and texture, to differentiate them from other objects in the environment. Additionally, the computer vision system 110 can then utilize this information to map out the environment and detect changes or movements in real-time. This can be particularly useful in scenarios such as security monitoring, where the AI system can detect and track the movement of people or objects within a monitored area.

The combination of the computer vision system 110 and object recognition algorithms 111 enables the AI system to detect and classify physical objects in the environment, and to analyze and interpret the visual data captured by cameras or sensors. This can enhance the contextual understanding of the physical environment and enable the AI system to provide contextually relevant and personalized responses to users.

The AI system 101 can also integrate with various sensors 113, smart devices 114, virtual reality (VR)/augmented reality (AR) headsets 115, and Internet of Things (IoT) 116. This allows the AI system 101 to identify physical objects 112 in the environment and gather data such as object location, relative positions, and temperature readings. To obtain contextual information about physical objects, the system can use a range of sensors, including temperature sensor 117, light sensor 118, noise sensor 119, motion sensor 120, and presence sensor 121. This information is then preprocessed and categorized before being displayed to users.

Moreover, smart devices 114 come equipped with various features such as microphones 122, speakers 123, touch-screens 124, cameras 125, Wi-Fi®[2] 126, Bluetooth®[3] 127, and near field communications (NFC®[4]) 128. These features enable the AI system to gather contextual information about the user's environment and interactions, allowing it to provide more personalized and relevant responses. For instance, the microphone can capture the user's voice input, while the camera can capture visual data such as facial expressions or object recognition.

The integration of various sensors 113 and smart devices 114 allows the AI system 101 to gather and analyze data from multiple sources, thereby enabling it to detect contextual information about physical objects. This, in turn, provides a more relevant and personalized user experience. The AI system 101 can respond to user inputs and environmental changes through AI applications, creating a seamless and integrated user experience. By harnessing the power of virtual and augmented reality 115, as well as the Internet of Things 116 devices, the AI system 101 can further enhance its capability to detect and respond to user needs and preferences.

Referring to FIG. 1, the OKB 104 is a structured system, but not limited to a database, a set of databases, a repository, a set of repositories, and the like, that stores 2 Wi-Fi is a trademark of Wi-Fi Alliance.

3 Bluetooth is a trademark of Bluetooth SIG, Inc.

4 NFC is a trademark of Never Fame Over Currency, LLC. different types of data and various types of information that the AI system can access and use to provide contextually relevant and personalized responses.

The OKB 104 also manages information about specific objects or entities, including their properties, location, and relationships to other objects. The information can be manually entered or automatically extracted from text, images, or other sources. The OKB 104 supports various applications such as object recognition, NLP, and decision making. The data and information stored in OKB 104 can be organized into categories, such as object properties, object attributes, object relations with the associated conversational AI agents 103.

There are three main categories of data stored in the OKB 104. The first category is object attributes, which pertain to the physical characteristics of objects in the environment, including their size, shape, color, and other features that the AI system 101 can utilize to recognize and interact with the objects. The second category, environment data, pertains to the physical conditions in the environment, such as temperature, humidity, lighting, and other relevant factors, as well as the physical layout of the environment, including the location of doors, windows, and furniture. The third category is interaction data, which encompasses details about the user's preferences, previous interactions, and other relevant information.

User preferences may include information about their likes, dislikes, and other personal preferences that can be used to personalize the user's experience with the AI system. For example, if a user has expressed a preference for a particular type of music, the AI system can store this preference in the OKB. The system can then use this information to recommend similar music or create a playlist based on the user's preferences. If the user previously interacted with the AI system and provided feedback on their experience, this information can also be stored in the OKB. This information can be utilized to improve future interactions.

In addition, if the user previously interacted with an object in a specific manner within the environment, the AI system can access the OKB for this information. This offers a seamless experience in future interactions, regardless of the physical environment they are in. This means that even if the user interacts with the object in a different physical environment from the previous interaction, the AI system can still access the OKB and provide relevant information for a smooth and personalized interaction with the object. The environment may change, but the AI system can still offer a contextually relevant experience for the user by using the information stored in the OKB.

The AI system collects and stores data about the user's interactions with the system in the OKB. By leveraging the data stored in the OKB, the AI system can adapt to the user's preferences and behavior, creating a more seamless and intuitive conversational interaction. This personalized approach helps to build trust and engagement between the user and the AI system, leading to a positive user experience.

To add human-AI interaction data to the OKB, the AI system initially processes the data to extract significant information such as user intents, behaviors, and preferences. This processing often involves using NLP techniques to parse the conversation and identify the essential elements. After the data has been processed, it is added to the OKB in a structured format that is easily accessible and analyzed by the AI system. This format can include relevant contextual information such as the time and location of the interaction, the user's input, and the AI system's response.

Furthermore, the AI system may employ ML algorithms to analyze the interaction data and identify patterns and trends in the user's behavior and preferences. This analysis can then be used to refine the AI system's understanding of the user and improve its ability to produce personalized, contextually relevant responses. For instance, if the user frequently requests recommendations for local restaurants, the AI system can use this data to personalize future recommendations based on the user's past preferences and feedback. Using this approach, the AI system can provide contextually relevant and personalized recommendations, improving the overall user experience.

One important aspect of AI systems is their ability to integrate different data categories to gain a comprehensive understanding of the user's context and needs. This allows for user-centered, contextually relevant, and personalized conversational interaction. For example, the AI system can use the user's preferences and environment data to recommend activities or products suited to current conditions. Additionally, by utilizing object attributes and environment data, the AI system can deliver more accurate and relevant information about physical objects in the user's surroundings. This interconnectedness of data categories enables the AI system to provide a more holistic and personalized experience for the user.

The OKB can be updated manually or automatically depending on the specific implementation of the AI system. Manual updating of the OKB typically involves human intervention, such as clients, a system administrator, or a data analyst adding or modifying information in the OKB. This may be done through a user interface specifically designed for managing the OKB, or through an API that allows direct programmatic access to the OKB.

In the context of AI systems and software development, a client typically refers to an individual or organization that uses or purchases a product or service. The client may have specific requirements or expectations for the product or service, and they may provide feedback or input to the developers or providers to improve the product or service. In the case of an AI system, the client may be a business or individual who uses the system to perform tasks or gain insights. Typically, clients would not have direct access to update the OKB themselves as it is a critical component of the AI system and requires specialized knowledge and expertise.

However, clients can indirectly update the OKB by providing feedback and interacting with the AI system. For example, if a client's customized AI application is stored in the OKB, the AI system can use the client's past interactions with the system to learn and update the OKB accordingly. If the client provides feedback on their experience or preferences, this information can be used to adjust the AI system's understanding and improve its ability to provide relevant and personalized recommendations.

Additionally, in some cases, clients may have the ability to indirectly update the OKB through a user interface or dashboard provided by the AI system. This interface may allow the client to adjust certain settings or preferences that can be stored in the OKB and used to inform the AI system's responses and recommendations.

On the other hand, automatic updating of the OKB occurs in real-time through the use of ML algorithms or other automated techniques. For example, an AI system may continuously monitor user interactions and automatically update the OKB with new information learned from those interactions. The AI system may use natural language processing algorithms to extract relevant information from user inputs and use this information to update the OKB in real-time.

One way that an AI system can identify new information from continuously monitoring user interactions is through ML algorithms. These algorithms can analyze large amounts of data from user interactions and identify patterns and trends that can be used to update the OKB.

For example, the AI system is used to provide customer support for a company. As users interact with the AI system and ask questions, the AI system can learn from these interactions and update its understanding of the types of questions being asked and the most appropriate responses to provide. The AI system can then use this updated information to improve future interactions and provide better customer support.

The AI system identifies relevant information through various techniques, such as natural language processing, data mining, and ML algorithms. Once the system has identified the relevant information, it processes the data to extract key insights and patterns that can be used to update the OKB.

The process of updating the OKB involves several steps. First, the AI system analyzes the new data to determine its relevance and significance to the existing knowledge base. The system then updates the OKB with the new information, either by adding new entities or relationships or modifying existing ones.

To ensure the accuracy and reliability of the updated knowledge, the AI system may use techniques such as data validation and error correction. The system may also employ techniques such as differential privacy to protect sensitive information while still allowing meaningful insights to be drawn. Once the OKB has been updated, the AI system can use the new knowledge to improve its performance in various tasks such as decision-making, natural language understanding, and predictive analytics. The updated OKB allows the system to adapt to new situations and better understand user needs and preferences, leading to more accurate and personalized interactions.

To update the OKB in real-time, the AI system can use automated processes that analyze and integrate new information as it is received. For instance, the AI system can be programmed to automatically update the OKB when it detects new patterns or trends in user interactions.

Moreover, the AI system can utilize automated techniques to analyze data from diverse sources, such as social media, news feeds, and weather forecasts, to incorporate new information into the OKB. For example, if the weather forecast predicts rain at a specific location, the AI system can access weather APIs to update the OKB with this information. By integrating this updated data, the AI system can offer contextually relevant recommendations or actions to the user based on the current situation.

In one embodiment, a user interacts with a conversational AI agent through a shared ride driver's business card to request a ride from their current location to a destination. The conversational AI agent can use this interaction to update the OKB, adjusting the user's preferences and attributes, such as their preferred car type, driver rating, and price range.

The iterative process can also help improve the accuracy of the relationship between the user and their past ride experiences, as well as the relationship between the user and other ride options in the area. For example, if the user has previously requested rides to a certain location during specific times of the day, the AI system can use this data to provide more accurate and relevant ride options in the future. The AI system can also analyze data from other sources, such as traffic patterns, weather conditions, and driver availability, to provide contextually relevant recommendations and adjust ride options accordingly.

By continually updating and refining the OKB, the AI system can provide a more personalized and accurate ride experience for the user. This iterative process of updating the OKB can also help the AI system to understand the relationship among entities and the plurality of physical objects in the transportation setting, such as cars, drivers, and ride requests.

In the described intelligent system 100, the OKB 104 contains seed knowledge 105 to establish and expand the OKB. This initial set of information, data, or domain knowledge can include known facts, rules, relationships, and information about objects and entities in the environment that the AI system interacts with Domain knowledge refers to the specialized understanding, insights, and expertise related to a specific area or field.

Additionally, domain knowledge can be contributed by a variety of sources, including subject matter experts, industry professionals, users, and other stakeholders. Users can also contribute domain knowledge through their interactions with the AI system. For example, a user could provide feedback on their preferences or experiences, which the AI system can then use to improve its responses and understand the user's needs.

An AI application can contribute domain knowledge to some extent, depending on the type and scope of the application. For example, an AI system that is designed to learn and improve over time, such as a ML system, can contribute to its own domain knowledge by analyzing data, detecting patterns and trends, and adjusting its responses accordingly.

Furthermore, an AI application that is designed to analyze and interpret large amounts of data, such as a predictive analytics system, can contribute domain knowledge by identifying correlations and making predictions based on its analysis.

In the development of the OKB, domain knowledge serves as a strong foundation for the AI system to build upon. This foundation consists of relevant concepts, relationships, and rules specific to the domain. By incorporating domain knowledge as seed knowledge 105, the AI system can start with a robust understanding of the subject matter, enabling it to generate accurate and contextually relevant responses. The AI system has mechanisms to gather, organize, and integrate this knowledge into the OKB.

As the AI system interacts with users and acquires additional information, it can refine and expand its OKB. During the training process, the seed knowledge is provided to a ML model, which enables it to learn and improve based on the initial data. By combining the seed knowledge 105 with newly acquired data, the AI system becomes more proficient in its domain, improving its ability to provide meaningful and accurate responses, recommendations, or solutions.

The quality and relevance of the seed knowledge are important for the performance of AI system. The seed knowledge can be available in various forms, such as text, images, audio, or numerical data. A diverse and high-quality seed knowledge dataset can result in more accurate and robust conversational AI agents. Conversely, a small or biased dataset may lead to a less generalizable model with poor performance on new data. In the case of NLP, seed knowledge can be a set of language-specific data, such as texts or sentences used to train a model on language structure, grammar, and semantics.

The AI system can acquire domain knowledge from humans through various techniques and approaches, which often involve some form of supervised or unsupervised learning, knowledge engineering, or transfer learning, such as: (1) Supervised learning: In supervised learning, human experts provide a labeled dataset, which includes input-output pairs representing domain-specific examples. The AI system is trained on this dataset to learn the underlying patterns or relationships and make predictions or decisions based on new, unseen data. This approach requires significant input from human experts to create a high-quality dataset with accurate labels. (2) Unsupervised learning: In unsupervised learning, the AI system is given a dataset without labels and should learn the underlying structure or patterns in the data on its own. Although humans do not explicitly provide domain knowledge, they can influence the learning process by selecting relevant features, choosing appropriate algorithms, or setting parameters that guide the AI system toward useful representations of the domain. (3) Semi-supervised learning: This approach combines aspects of supervised and unsupervised learning. Human experts provide a small set of labeled examples, while the AI system also leverages a larger set of unlabeled data to improve its understanding of the domain. This can help reduce the amount of manual labeling required while still benefiting from human expertise. (4) Knowledge engineering: Human experts can encode domain knowledge directly into the AI system by creating rules, ontologies, or decision trees that represent domain-specific concepts and relationships. This approach, often used in expert systems, allows the AI system to reason about the domain and make inferences based on the provided knowledge. However, knowledge engineering can be time-consuming and requires close collaboration between human experts and AI developers. (5) Transfer learning: In transfer learning, an AI system that has already been trained on a related task or domain can be fine-tuned or adapted to the target domain with minimal additional input from human experts. This can save time and resources by leveraging pre-existing knowledge and models, although the effectiveness of transfer learning depends on the similarity between the source and target domains. (6) Federated Learning: Federated learning is a ML approach that allows multiple parties to collaboratively train a ML model without sharing their data with each other. Instead of centralizing the data in one location, the data remains decentralized and is stored on each party's device. The model is then trained on the data that is stored on each device, and the updates are aggregated to create a global model. This approach allows for the creation of a more diverse and representative dataset without compromising privacy.

Interactive learning is another approach for the AI system to acquire domain knowledge directly from human experts through dialogue or conversations. In this approach, the AI system engages in a dialogue with a human expert, who provides feedback and guidance to the system as it learns. The AI system can use this feedback to refine its understanding of the domain and improve its performance.

Interactive learning is an effective way for the AI system to acquire domain knowledge in a targeted and efficient manner. This method enables the AI system to learn directly from human experts in a natural and accessible way, without requiring extensive technical expertise in AI or ML. This method also promotes a collaborative approach to acquiring knowledge and expertise.

Note that acquiring human expertise or domain-specific knowledge requires careful consideration of security and privacy aspects. The importance of introducing security and privacy aspects in knowledge acquisition lies in ensuring that sensitive information obtained from human experts is protected from unauthorized access or misuse. This is particularly crucial in fields such as healthcare, finance, and law, where the privacy and security of personal information is highly valued and regulated by law.

A plurality of techniques and measures may be employed to introduce security and privacy aspects in knowledge acquisition. One embodiment of introducing security and privacy aspects in knowledge acquisition involves implementing federated learning techniques. This approach involves training ML models on data distributed across multiple devices without transferring raw data to a central server. This allows privacy-preserving knowledge acquisition while maintaining high levels of accuracy and reliability. Moreover, the utilization of differential privacy methods can add randomness to the data to safeguard confidential information, while enabling significant patterns to be extracted.

Another embodiment involves incorporating homomorphic encryption techniques into the knowledge acquisition process. Homomorphic encryption allows computations to be performed on encrypted data without the need for decryption, which can help protect sensitive information during knowledge acquisition. This approach can help ensure that the data remains secure and confidential throughout the acquisition process.

Integrating human expertise into AI models in a transparent and explainable manner can enhance users' understanding of the AI model's decisions, help identify biases or errors, and improve overall trust in the system.

To ensure the transparency and explainability of the knowledge acquisition process, one embodiment involves developing methods for visualizing AI models' decision-making process. This approach can help provide insight into how the model arrived at a particular decision and enable human experts to provide feedback and improve the interpretability of the model. This approach could involve developing tools that display to the user the inputs considered in the decision-making process, the features with higher weights, and the calculation of the final output. This would allow users to comprehend the AI model's reasoning, enabling them to identify any potential issues.

In an embodiment, an explainable AI is integrated into the AI system to offer clear, understandable, and interpretable explanations for the AI system's decisions, predictions, or outputs. Within an AI system, the explainable AI aims to enhance transparency, trust, and human understanding of the system's inner workings. This simplifies the process for users and stakeholders to comprehend and justify the AI's actions and recommendations.

The integration of explainable AI into an AI system can involve a variety of approaches and techniques. Some of these methods include feature importance, which identifies and ranks the most influential input features or variables contributing to a specific decision or prediction, helping users understand the factors that play a significant role in the AI system's output.

Another approach focuses on model interpretability, designing inherently interpretable models such as decision trees, rule-based systems, or linear regression, which are easier to understand compared to complex models like deep neural networks. These models provide insights into the relationships between input features and generated output.

Local explanations generate explanations for individual predictions or decisions by approximating the AI system's behavior around a specific input instance. Techniques like LIME (Local Interpretable Model-agnostic Explanations) or SHAP (SHapley Additive explanations) create local explanations that help users understand the AI system's rationale for a particular decision.

Visualization techniques utilize visual representations of the AI system's internal processes, decision boundaries, or feature relationships to make the system's behavior more accessible and understandable to users.

Natural language explanations produce human-readable textual descriptions that explain the AI system's reasoning, decisions, or predictions in a manner easily understood by users. These explanations can be generated by natural language generation (NLG) modules within the AI system.

Incorporating explainable AI components and techniques into an AI system allows users to better understand the factors and processes underlying the system's decisions, predictions, or recommendations. This improved understanding can lead to increased trust, enhanced collaboration between humans and AI, and more informed decision-making by users who rely on the AI system.

Another approach to ensure the transparency and explainability of the knowledge acquisition process is to incorporate feedback from human experts to improve the interpretability and transparency of the model. This could involve developing techniques that enable human experts to provide feedback on specific decisions made by the AI model, using this feedback to refine the decision-making process. By including human expertise in this manner, the AI model can become more transparent and explainable, allowing potential issues to be identified and addressed more effectively.

Moreover, integrating human-in-the-loop strategies can be valuable in providing insights and improving the model iteratively. This could involve using expert feedback to label or annotate data, validate AI model outputs, or prioritize areas of improvement. This collaborative approach between human experts and AI models can result in more accurate, reliable, and interpretable systems.

Another embodiment involves developing techniques for deploying AI models that incorporate human expertise while maintaining privacy and security controls. This could involve encrypting data during deployment or implementing secure multi-party computation techniques to enable secure and privacy-preserving deployment. These techniques can help ensure that the model remains secure and confidential even after deployment and can help protect against unauthorized access or misuse of sensitive data.

Finally, an embodiment involves exploring the ethical and social implications of integrating human expertise into AI models. This could involve developing methods for evaluating the impact of these models on society and developing guidelines for their ethical and responsible use. By taking a proactive approach to understanding and addressing the ethical and social implications of knowledge acquisition, organizations can help ensure that the benefits of AI models are realized while minimizing potential risks and negative impacts.

Figure 3:
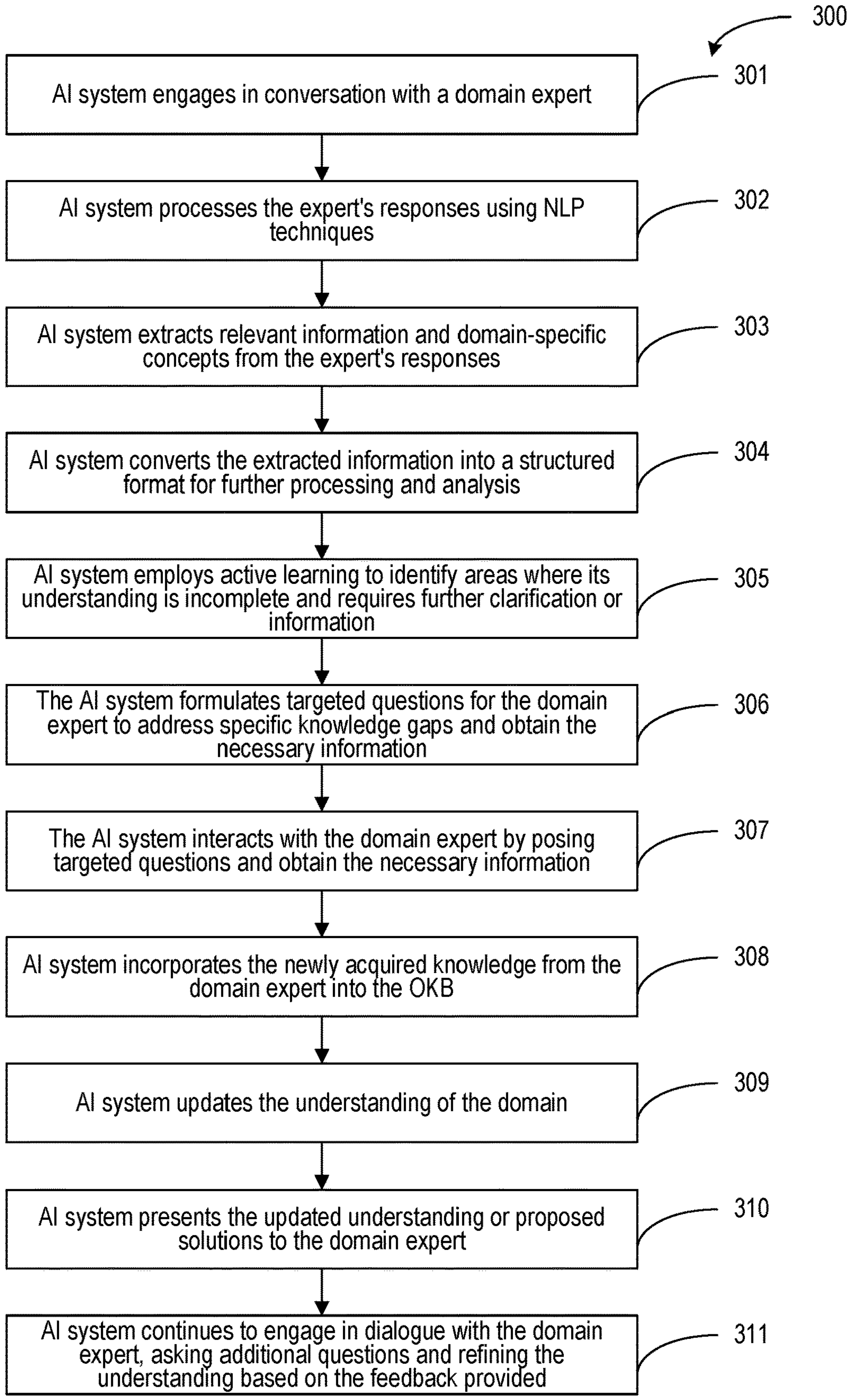
FIG. 3 depicts a flow chart illustrating a process of domain-specific knowledge acquisition.

In FIG. 3, a process for acquiring domain-specific knowledge 300 is illustrated. The process involves several steps, which are interconnected and iterative in nature.

During the first step, Human-AI interaction, the AI system engages in conversation with a domain expert 301, who shares their knowledge in a natural language format. Subsequently, the AI system processes the expert's responses using NLP techniques 302, such as entity recognition and relation extraction, to extract relevant information and domain-specific concepts from the expert's responses 303. This information is then converted into a structured format, such as a knowledge graph or rule-based representation, for further processing and analysis 304.

Next, the AI system employs active learning to identify areas where its understanding is incomplete and requires further clarification or information 305 and formulate targeted questions for the domain expert to address specific knowledge gaps and obtain the necessary information 306. The AI system interacts with the domain expert by posing targeted questions and obtaining the necessary information 307. This helps the AI system acquire the most valuable and relevant information while minimizing the expert's effort in teaching the AI system.

Active learning is a technique where an AI system selects the most informative examples for a human expert to label, thus minimizing the amount of labeling required. The system learns by actively seeking out new data points to be labeled, and then uses that feedback to improve its performance. The goal of active learning is to reduce the amount of data that needs to be labeled while still achieving high accuracy.

Active learning can be used in various areas of AI, including natural language processing, computer vision, and ML. For example, in natural language processing, an AI system can use active learning to select the most informative examples of text data to be labeled by a human expert. This approach can help the AI system acquire domain knowledge more efficiently and accurately, leading to enhanced performance on a given task.

For example, the AI system tries to classify images of cats and dogs. The AI system may select a few images of animals that are difficult to classify, such as images of animals with mixed features or those that are partially obscured. The AI system will then present those examples to a human expert for labeling. By selecting the most informative examples, the AI system can learn more quickly and achieve higher accuracy with less labeled data.

After obtaining new knowledge, the AI system incorporates the newly acquired knowledge from the domain expert into the OKB 308 and updates its comprehension of the domain 309. The AI system can use reasoning techniques, such as inference, to make new connections, draw conclusions, or generate predictions based on the domain expert's input.

The AI system then presents its understanding or proposed solutions to the domain expert for evaluation and feedback 310. The domain expert can correct any misconceptions or inaccuracies, refining the AI system's knowledge and performance.

Finally, the dialogue and interactive learning process continues iteratively, with the AI system asking further questions and refining its understanding based on the domain expert's feedback 311. This allows the AI system to learn more efficiently and align its knowledge with the domain expert's expertise.

Referring to FIG. 1, AI applications 102 are specific implementations of the AI system designed to solve particular problems or perform specific tasks within a domain. These applications leverage the capabilities of the underlying AI system 101 to provide tailored solutions for various industries and use cases. The relationship between an AI system and AI applications can be understood as a hierarchical structure where the AI system serves as the underlying foundation, and AI applications are built upon that foundation to provide specific functionalities and solutions.

Examples of AI applications include conversational AI agents 103, virtual assistants, physical robots, recommendation systems, autonomous vehicles, facial recognition, and medical diagnosis tools.

In some embodiments, the AI application can be integrated with various smart devices and systems in a public service facility, such as a library or a government building. By accessing the data and functionality of other smart devices and systems, the AI application can provide an integrated user experience that is tailored to an individual's needs and preferences.

For instance, the AI application can integrate with sensors that detect the number of people present in the building and their locations, as well as with the building's HVAC system to regulate temperature and airflow. Using NLP and ML, the AI application can understand the preferences and behavior of visitors to the facility. This enables the AI application to provide contextually relevant and personalized recommendations and responses to visitors, such as suggesting books or providing information on government services.

In some instances, AI applications manifest as conversational AI agents designed to interact with users through dynamic communication while simultaneously learning and adapting. By incorporating user feedback and interaction, these agents consistently improve their precision and effectiveness.

Conversational AI agents can serve various roles, such as customer service representatives, personal assistants, medical assistants, bankers, or brokers. For each role, the conversational AI agent can be trained in a specific domain or multiple domains to ensure proficiency.

In an embodiment, an AI application 102 running on a mobile device offers an intuitive interface that presents the gathered environment data in an accessible format for users. Environment data includes information about the environment surrounding the user, such as temperature, humidity, and lighting conditions, that can be used to provide more relevant and accurate responses. Besides showing the environment data, these devices also generate recommendations and suggestions derived from the collected information. For instance, if the AI application detects a high temperature in the user's surroundings and identifies that a heater is dangerously close to furniture, creating a fire hazard, the AI application might recommend activating air conditioning or opening a window to lower the temperature and send a push notification through the mobile device to advise the user to turn off the heater.

Referring to FIG. 1, the AI system 101 (See FIG. 2) serves as the central component of the intelligent system, employing a range of techniques like NLP, ML, and advanced reasoning to predict user intents and objectives.

Figure 2:
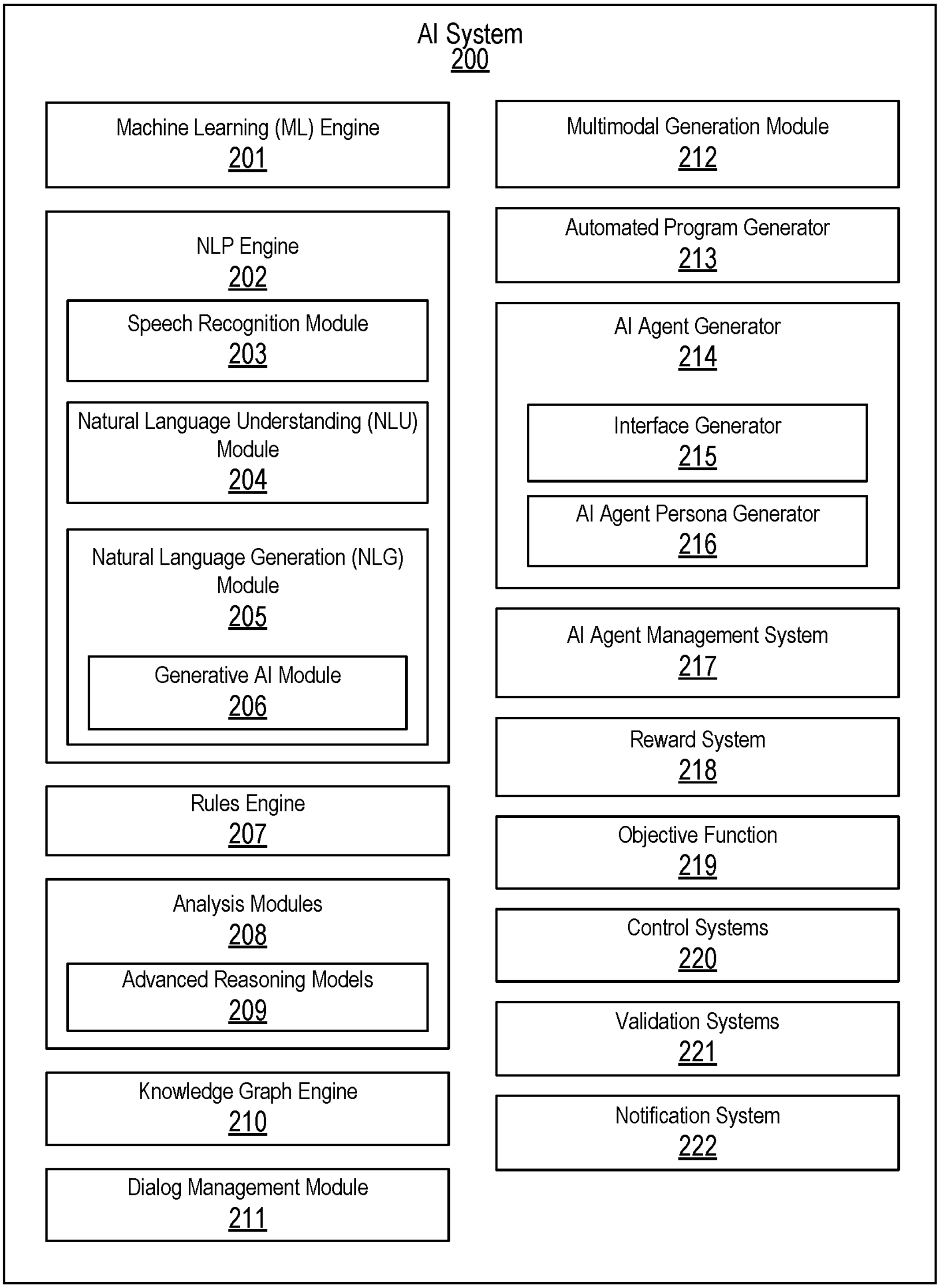
FIG. 2 depicts a high-level block diagram illustrating components of an AI system for user-centered and contextually relevant conversational interaction.

FIG. 2 depicts a high-level block diagram illustrating components of an AI system 200 for contextually relevant conversational interaction in the environment. The AI system includes a ML engine 201, an NLP engine 202, a speech recognition module 203, a natural language understanding (NLU) module 204, a natural language generation (NLG) module 205, a Generative AI module 206, a rules engine 207, analysis modules 208, advanced reasoning models 209, a knowledge graph engine 210, a dialogue management module 211, a Multimodal Generation module 212, an automated program generator 213, an AI agent generator 214, an interface generator 215, an AI agent persona generator 216, an AI agent management system 217, a reward system 218, an objective function 219, control systems 220, validation systems 221, and a notification system 222, to provide user-centered, contextually relevant, and personalized interaction in the environment.

The ML engine 201, NLP engine 202, and analysis modules 208 are important components that enable and improve the AI system's abilities of "thinking and acting" logically to achieve the best outcome. These components collaborate to predict user intents, behaviors, and conversation topics effectively.

The ML engine 201 included in the AI system is a core component responsible for developing, training, and deploying ML models to solve specific problems or perform tasks, such as classification, regression, or clustering. The ML engine 201 plays an important role in the AI system by enabling it to learn from data, adapt to new inputs, and make data-driven decisions or predictions.

The ML engine 201 typically consists of the following key elements: (1) Algorithms: The ML engine uses a variety of ML algorithms, such as decision trees, support vector machines, neural networks, or clustering algorithms, to build models based on the data provided. The choice of algorithm depends on the problem being addressed, the nature of the data, and the desired level of accuracy and interpretability. (2) Data Preprocessing: The ML engine includes preprocessing techniques to clean, transform, and preprocess raw data, making it suitable for use with ML algorithms. This step may involve data cleaning, normalization, feature engineering, and feature selection. (3) Model Training: The ML engine uses a training dataset to train the selected algorithm, adjusting its parameters or weights to minimize the error between the model's predictions and the actual output data. The training process can involve techniques like gradient descent, backpropagation, or other optimization methods. (4) Model Validation and Evaluation: The ML engine assesses the performance of the trained model using a validation dataset, allowing model tuning and preventing overfitting. Evaluation metrics, such as accuracy, precision, recall, or F1 score, help quantify the model's performance. (5) Model Deployment: Once the model has been trained and validated, the ML engine deploys the model within the AI system, enabling it to make predictions or perform tasks based on new, unseen data. (6) Model Updating: The ML engine continually monitors the model's performance, updating it as needed to account for changes in the data or problem domain. This process can involve retraining the model with new data, adjusting its parameters, or replacing it with a new model if required.

Several steps are involved in the ML modeling process, and the first step is selecting data from various data sources. Depending on the specific use cases and applications, a training dataset may need to be constructed by gathering data from one or multiple sources or selecting a subset of data from one or more sources. These training datasets can represent one or more subsets of a larger dataset, and the data sources can be available in various formats.

A training dataset is a collection of data used during the development of ML models, specifically for the purpose of training the algorithms to recognize patterns, make predictions, or perform specific tasks. The training dataset plays an important role in the ML process, as the model's performance and accuracy largely depend on the quality and representativeness of the data used for training.

For example, in ML or statistical modeling, a training dataset is used to build a model (e.g., unsupervised model, supervised model, hybrid ML model). The training dataset may be stored in the database and/or updated by the AI system during a period according to one or more defined rules for future use.

A data cleaning step may be required before performing any analyses or modeling. Data cleaning is an important step in the data preparation process, as it directly impacts the quality of insights and decision-making based on the data. A well-cleaned dataset reduces the risk of drawing incorrect conclusions, improves the efficiency of data analysis, and enhances the overall reliability of the results. The main goal of data cleaning is to improve data quality and reliability, which in turn leads to enhanced insights and decision-making when the data is analyzed.

Data cleaning involves several steps and techniques, which may include: removing duplicates, filling missing values, correcting data entry errors, standardizing and transforming data, validating and correcting data, outlier detection and treatment, and merging and integrating data.

A training dataset may need to be transformed to meet format, structure, or value requirements, which helps improve the performance and accuracy of the model being trained. This transformation step can involve data normalization, encoding categorical variables, or reshaping the data to fit the input structure of the model, among other possible modifications.

The training dataset typically consists of input data and output data, with the input data representing the characteristics or attributes of the data points, while the output data represents the outcomes or categories the model is expected to predict or classify.

During the training process, the ML algorithm iteratively processes the input data, adjusting its internal parameters or weights to minimize the difference between the predicted outcomes and the actual outcomes.

It is important to ensure that the training dataset is representative of the problem domain and contains sufficient examples of various scenarios, classes, or patterns. This ensures that the model generalizes well and can make accurate predictions on new, unseen data. To evaluate the performance of a ML model, it is common practice to split the available data into separate subsets: the training dataset, a validation dataset, and a test dataset. Missing data in the training dataset may also need to be filled in.

In some embodiments, quantum computing integrated into the AI system leads to significant improvements in computational efficiency and performance, especially for specific types of problems that classical computers cannot solve. Additionally, quantum computing has the potential to significantly enhance ML algorithms by leveraging its unique computational capabilities. Quantum computers utilize quantum phenomena like superposition and entanglement, which allow them to process vast amounts of information simultaneously and solve complex problems more efficiently than classical computers.

One of the initial steps is to identify which parts of the AI system can benefit from quantum computing. Quantum computers excel at solving problems involving combinatorial optimization, search algorithms, or simulating quantum systems. They can also be used to enhance ML algorithms, such as training neural networks and solving optimization problems.

After identifying the areas that can benefit from quantum computing, it is crucial to develop or adopt quantum algorithms specifically designed for quantum computers, leveraging quantum properties such as superposition and entanglement. Some widely known quantum algorithms include Grover's algorithm for search problems and Shor's algorithm for factoring large numbers. In the context of AI, it is essential to explore quantum ML algorithms and other quantum-enhanced methods.

Once the appropriate algorithms are determined, the next step is to select a suitable quantum computing platform or framework to implement the quantum algorithms. Following this, the quantum algorithms can be integrated into the AI system by creating interfaces between the quantum computing platform and the classical components of the AI system. This process may involve sending problem data to the quantum computer, executing the quantum algorithm, and processing the results on the classical computer. Designing a hybrid approach that combines the strengths of both quantum and classical computing can help achieve the best performance.

Lastly, it is essential to test the performance of the integrated quantum AI system by comparing its results to those obtained using classical algorithms. This step ensures that the quantum-enhanced AI system provides improved efficiency, accuracy, or other desirable outcomes.

Referring to FIG. 2, the NLP engine 202 is designed to receive and process user input in natural language by performing various NLP tasks, which may include parsing, part-of-speech tagging, sentence breaking, stemming, word segmentation, terminology extraction, grammar induction, lexical semantics, machine translation, named entity recognition (NER), NLG, NLU, and relationship extraction, among others.

By employing techniques such as language modeling and text classification, the NLP engine generates contextually relevant responses based on user objectives, context, and current state. The NLP engine 202 analyzes user input using NLP algorithms to understand the meaning and intent behind the user's message. The NLP engine may also apply advanced topic mining and modeling techniques to enhance the accuracy of NLU.

NLU is a subfield of NLP that focuses on enabling computers to comprehend and interpret human language as it is spoken or written. NLU goes beyond simply recognizing the words or phrases used in a text or speech; it seeks to understand the underlying meaning, context, and intent of the language, just as a human would.

NLU typically involves several tasks and processes, such as: (1) Tokenization: Breaking down text or speech into individual words, phrases, or other meaningful units called tokens. This step enables the AI system to analyze the language at a more granular level. (2) Part-of-speech tagging: Assigning grammatical categories to each token, such as nouns, verbs, adjectives, and so on. This helps the AI system understand the role and function of each word in a sentence. (3) Syntax analysis: Analyzing the grammatical structure of a sentence to determine the relationships between words and phrases. This helps the AI system understand how the different parts of the sentence fit together to convey meaning. (4) Semantic analysis: Identifying the meaning of individual words and phrases, as well as the overall meaning of the sentence, considering factors such as word sense disambiguation, idiomatic expressions, and context. (5) Discourse analysis: Understanding the relationships between sentences and the broader context of the text or conversation, such as determining the references to pronouns or recognizing the purpose of a discourse. (6) Sentiment analysis: Identifying the emotions, opinions, or attitudes expressed in the language, which can be useful for applications such as social media monitoring, customer feedback analysis, and market research. (7) Intent recognition: Determining the user's goal or intention in a given conversation or interaction, which is particularly important for chatbots and virtual assistants.

The NLU module 204 in the AI system 200 is designed to process and interpret human language, especially in the context of conversational agents, chatbots, and other natural language processing applications. The NLU module allows AI systems to comprehend the meaning and intent behind textual input, enabling effective communication between the system and the user.

In the AI system 200, the NLU module 204 starts by preprocessing the raw textual input. This process may involve tokenization, which breaks the text into words or tokens, lowercasing, removing special characters, and stemming or lemmatization, which reduces words to their root form. Following preprocessing, the module extracts various features from the text, such as word frequency, word embeddings, or other language-specific characteristics. These features help represent the input text in a structured format that can be understood by the AI system.

To identify the intent or purpose behind the user's input, the NLU module analyzes the extracted features. Intent recognition may employ ML techniques like classification algorithms or rule-based methods that map specific patterns in the input text to predefined intents. Along with recognizing intent, the NLU module extracts relevant entities or information from the input text. Entities can consist of dates, times, locations, names, or any other information pertinent to the interaction context. Entity extraction techniques can include named entity recognition, regular expressions, or custom algorithms tailored to the AI system's specific domain.

After identifying intents and extracting entities, the NLU module integrates this information into the context of the ongoing conversation or interaction. The context helps the AI system better understand the user's needs, preferences, or goals, allowing it to generate appropriate responses or actions. Lastly, the NLU module outputs the interpreted information, including the recognized intent, extracted entities, and context, to other components of the AI system. This information is utilized by modules like the Natural Language Generation module, context-aware modules, or decision-making components to generate contextually relevant responses or actions.

The Natural Language Generation (NLG) module 205 is also an important component of the AI system 200 designed for conversational interactions. The NLG module is responsible for creating coherent, human-like text responses based on the input and context provided by other components of the AI system, such as NLU and context-aware modules. The NLG module enables AI systems to generate responses that are easily understood by users, facilitating effective communication and improving the overall user experience.

Generative AI is a subfield of artificial intelligence that focuses on the creation of new content or data, such as text, images, or audio, based on input data and context. This is achieved through advanced ML techniques, such as deep learning and neural networks. Generative AI models, such as Generative Adversarial Networks (GANs) or Variational Autoencoders (VAEs), can generate realistic and high-quality outputs by learning complex patterns and structures from large datasets during the training process.

Integrating the Generative AI module 206 within the NLG module can significantly enhance the capabilities of the AI system in generating contextually relevant, natural-sounding text responses during conversational interactions. The Generative AI can leverage its ability to learn complex patterns and structures from large language datasets to produce human-like responses that are not only coherent but also tailored to the specific context of the interaction.

By incorporating the Generative AI module 206 into the NLG module 205, the AI system can streamline the process of generating human-like responses. This is achieved by utilizing the Generative AI's capabilities to analyze and generate text based on the input and context provided by other system components, such as NLU and context-aware modules. The Generative AI can then produce contextually appropriate responses that align with the user's intent and the ongoing conversation, resulting in more effective communication.

Furthermore, the integration of Generative AI within the NLG module allows the AI system to leverage the Generative AI's advanced learning capabilities to continuously improve its performance over time. As the Generative AI is exposed to more data and diverse conversational contexts, it can refine its understanding of language patterns, enabling the generation of increasingly accurate and contextually relevant responses.

The incorporation of Generative AI within the NLG module of an AI system can significantly enhance the system's ability to generate contextually relevant, natural-sounding text responses during conversational interactions. This integration streamlines the response generation process, leverages the Generative AI's capabilities to improve the overall effectiveness of the NLG module. This results in a more engaging and satisfying user experience.

Referring to FIG. 2, the NLG module 205 is responsible for creating natural and fluent text or speech from structured information or data. The NLG plays an important role in the field of NLP and AI applications, as it allows machines to produce output that is not only understandable by humans, but also contextually appropriate, grammatically accurate, and logically organized.

The NLG module 205 typically involves several stages to generate text or speech output. The first stage is content determination, where the AI system identifies important information or data points based on the context and purpose of the generated text. The second stage is discourse planning, where the selected information is organized into a logical structure to create a coherent narrative. The third stage is sentence planning, where appropriate sentences are generated to convey the selected information effectively and naturally. The final stage is realization, where the planned sentences are converted into final text or speech output, adhering to the rules and conventions of the target language, and including appropriate formatting elements and intonation for speech output.

The stages described for the NLG module are typically performed in the order presented: content determination, discourse planning, sentence planning, and realization. However, the specific implementation of NLG can vary depending on the system and task at hand, and some steps may be combined or performed in a different order.

For example, some NLG systems may use a data-to-text approach, where the content determination and sentence planning stages are combined into a single step that involves mapping input data to natural language sentences. In other cases, the discourse planning stage may be more complex, involving the generation of multiple paragraphs or sections with different structures or styles.

In some embodiments, the AI system may use NLP tasks and methods to generate dynamic responses to user questions that do not have predefined answers in OKB. The NLG module can be used to generate text or speech output based on the selected information and the context of the user's query. The use of NLP techniques allows the AI system to understand the user's intent and extract relevant information from their query, enabling the generation of accurate and contextually relevant responses.

For example, the AI system may employ an NLP technique called named entity recognition (NER) to identify key entities in the user's query, such as the names of people or places. The system may then use this information to generate a response that is personalized and contextually relevant to the user's query. Alternatively, the AI system may use an ML algorithm to generate responses based on patterns in the user's queries and past interactions with the system. The system may learn from the user's previous queries and responses to improve the accuracy and relevance of its responses over time.

In certain embodiments, the AI system may encounter user inquiries that have no predefined responses in the OKB. For example, a user could pose a question to an AI-powered virtual assistant, such as "What is the optimal time to visit Hawaii?". Although the AI system may have some general knowledge about Hawaii, it may lack a specific response for the user's query.

To address this, the AI system may utilize NLP techniques to decipher the user's intent and extract pertinent information from the query. The system could evaluate terms such as "best time" and "Hawaii" and deduce that the user is seeking information about the optimal time of year to visit Hawaii. The NLG module may then generate a tailored response based on this interpreted intent, such as "According to our data, the optimal time to visit Hawaii is during the spring months, when the climate is mild and the number of visitors is low."

In one of the embodiments, a user may inquire a conversational AI agent in a grocery store about the availability of discounts for a particular product by presenting the product to the agent and asking the question. Even if there is no predefined answer in the OKB for such an inquiry, the conversational AI agent can use NLP techniques to extract relevant information such as the product name and the user's interest in discounts. The NLG module can generate a dynamic response based on the analysis and recommendations from other components like the rules engine, knowledge graph, and analysis modules, in addition to NLP results.

Referring to FIG. 2, the Multimodal Generation module 212 serves as an important part of the AI system 200, generating contextually relevant multimedia content based on input data and context. The Multimodal Generation module 212 is responsible for generating a variety of multimedia content, including images, drawings, audio, and video. This module operates in collaboration with other components of the AI system, such as Natural Language Understanding (NLU), context-aware modules, and other data processing components, to produce contextually relevant multimedia outputs.

In the AI system, input data and context are processed, which can consist of text, images, audio, or other types of multimedia. Components like NLU and context-aware modules help the system understand the user's intent, the context of the interaction, and any pertinent background information.

The input data and context are then converted into a multimodal representation that the Multimodal Generation module can use to generate suitable multimedia content. This representation might include features, metadata, or other data that characterize the input and context.

The Multimodal Generation module utilizes a variety of Generative AI techniques to create different types of multimedia content. For instance, it may employ Generative Adversarial Networks (GANs) for image generation, WaveNet for audio synthesis, or Video-to-Video synthesis techniques for video creation. These Generative models are trained on extensive datasets to learn intricate patterns and structures, allowing them to produce realistic and high-quality multimedia content.

Based on the multimodal data representation and the selected Generative AI technique, the Multimodal Generation module generates contextually relevant multimedia content. This content is tailored to the specific input data and context, ensuring that the resulting multimedia output is coherent and meaningful.

Finally, the generated multimedia content is delivered to the user or integrated with other components of the AI system, such as conversational agents or recommendation engines. This content can improve the user experience by providing more in-depth and varied information, enabling more engaging interactions, and delivering more personalized recommendations.

By employing advanced Generative AI techniques and collaborating with other system components, the Multi-modal Generation module can create diverse and meaningful multimedia outputs, enhancing both the overall user experience and the capabilities of the AI system.

Referring to FIG. 2, the speech recognition module 203 is an important component of the NLP engine, as it allows the AI system to process spoken language input from users. The speech recognition module 203 is responsible for converting spoken language into written text or interpreting specific voice commands. The speech recognition module 203 is responsible for managing the entire speech recognition process, from input and preprocessing to output generation.

Speech recognition algorithms are responsible for understanding the acoustic features and linguistic patterns in the audio input to generate the desired output, such as text or commands, wherein speech recognition algorithms can be applied to convert the audio input into text format, which can then be processed by the NLP engine using various techniques such as sentiment analysis, entity recognition, and text classification. The output from the NLP engine can then be used to generate spoken language output using text-to-speech technology. So, speech recognition algorithms and NLP techniques are often used in combination to enable natural language interaction between humans and machines.

Additionally, the speech recognition algorithms typically involve ML techniques, statistical models, and other advanced processing methods that help the AI system accurately identify and transcribe spoken language.

In certain embodiments, when a user provides a voice command as input, the conversational AI agents utilize the speech recognition module and one or more speech recognition algorithms to convert the user's voice input into plain text. This text can then be parsed and processed by the NLP engine to generate structured data for analysis. The speech recognition algorithms play an important role in the speech recognition module by analyzing and recognizing human speech.

The rules engine 207 in the AI system is an important component responsible for managing, processing, and applying a predefined set of rules or logic to the AI system. The rules engine 207 is designed to evaluate complex conditions, make decisions, and execute actions based on these rules. The rules engine helps automate decision-making processes, ensuring consistent and accurate outcomes while reducing the need for manual intervention.

In the context of the AI system, the rules engine can work alongside ML and NLP components to enhance the AI system's overall intelligence and adaptability. The rules engine can be used to: (1) Define and enforce domain-specific constraints: By incorporating expert knowledge or industry-specific guidelines into the rules engine, the AI system can adhere to specific requirements or standards, thus ensuring the AI system's output is compliant and relevant. (2) Implement business logic: The rules engine can be used to apply business rules or policies consistently across the AI system's various tasks and processes, ensuring that the AI system's actions align with the organization's objectives and priorities. (3) Control the AI system's behavior: By setting and adjusting rules in the rules engine, developers or administrators can easily configure the AI system's behavior, tailoring it to the specific needs of the users or the application. (4) Improve interpretability and transparency: Rules-based systems can offer a higher degree of explainability compared to some black-box ML models, as the decision-making process is based on explicit rules that can be understood and audited. (5) Complement ML models: In some cases, combining rules-based logic with ML models can lead to a more robust and accurate AI system. The rules engine can handle scenarios where ML models may struggle, such as situations with limited training data or those requiring strict adherence to specific regulations.

Several laws and principles from diverse fields can be incorporated into the AI system's rules engine to make assumptions or recognize general patterns. The following are a few illustrations: (1) Bayes' theorem: A statistical method used to update the probability of an event based on new data or evidence. In AI, Bayes' theorem can be used to make predictions or assumptions about the likelihood of certain outcomes given prior knowledge and new information. (2) Pareto principle (80/20 rule): The principle states that approximately 80% of effects come from 20% of causes. In AI, this principle can be applied to optimize AI system performance by focusing on the most important or influential factors. (3) Hick's law: In human-computer interaction, Hick's law states that the time it takes to make a decision increases as the number of options increases. The AI system can use this principle to improve user experience by reducing the number of choices presented or simplifying decision-making processes. (4) Hebbian learning: This is a biological principle stating that neurons that fire together, wire together. In AI, Hebbian learning can be applied to develop neural networks, where the connection strength between neurons is updated based on their simultaneous activation. (5) Occam's razor: This principle suggests that the simplest explanation or solution is often the best one. In AI, Occam's razor can be applied to select the simplest models or algorithms that still achieve the desired performance, reducing complexity and improving interpretability. (6) Zipf's law: Zipf's law states that the frequency of an event is inversely proportional to its rank in the frequency table.

In NLP, this law is observed in the distribution of word frequencies and can be used to make assumptions or predictions about word usage and co-occurrence patterns.

When developing, deploying, and using an AI system, certain regulations and guidelines should be followed to ensure the protection and well-being of the individuals involved: (1) AI systems should be designed to prioritize the safety of humans and should not be programmed to cause harm. (2) AI system should be developed and tested in a way that ensures it does not harm human beings during operation or interaction. (3) AI systems are configured to comply with all applicable laws and regulations, including those related to safety and health. (3) AI systems should be transparent and accountable, allowing humans to understand and control their actions. (4) AI systems should incorporate safety features that prevent accidental harm, such as sensors that detect human presence and stop the system's operation. (5) AI systems should be designed and developed with the goal of maximizing human benefits while minimizing harm. (6) AI systems should be regularly audited and tested to ensure they comply with safety standards and regulations. (7) AI systems should be programmed with ethical principles and values, such as respect for human life and dignity. (8) AI developers and operators should be held accountable for any harm caused by the system's actions. (9) AI systems should be designed with fail-safes and emergency shut-off procedures to prevent harm in the event of a malfunction or unexpected behavior.

The rules and laws implemented in the AI system play an important role in ensuring the safety and welfare of humans. The principle of "do no harm" is a fundamental and over-arching rule that should guide the development and operation of AI systems. The principle of "do no harm" serves as a foundation for all other rules and laws in the AI system related to AI safety and ethics. "Do no harm" means that AI systems should not be designed or programmed in a way that could cause harm to humans. This includes physical harm, such as injury or death, as well as non-physical harm, such as emotional distress or discrimination.

Other rules that AI should follow include respecting user privacy and data protection, being transparent about how it makes decisions, operates, and being accountable for its actions. AI systems should also be designed in a way that is fair and unbiased, and they should not be used to discriminate against individuals or groups based on factors such as race, gender, or age. Additionally, AI systems should adhere to legal and regulatory requirements, such as those related to data protection, intellectual property rights, and safety standards. AI systems should also be designed to be secure and resilient against cyber-attacks and other forms of malicious activity.

Referring to FIG. 2, the AI system can automatically generate algorithms and scripts and store them in the rules engine 207 and apply rules and laws in the appropriate scenarios, contexts, or settings.

FIG. 4 depicts a process where the AI system automatically generates algorithms and scripts and applies rules and laws 400. The process starts with collecting relevant domain knowledge, expert input, and examples of the laws being applied in various contexts from various sources, including literature, past user interaction, or expert consultations 401.

Next, algorithms and scripts are generated using ML techniques, NLP genetic algorithms, or symbolic AI methods 402 to represent the laws and their applications in different situations. The generated algorithms and scripts are stored in the rules engine, which acts as a repository for the AI system's knowledge and enables access and application of information when needed.

When encountering a new scenario, the AI system analyzes the context using pattern recognition, NLP, or other techniques 403 to identify which rule(s) or law(s) might be applicable. Relevant algorithm(s) or script(s) are retrieved from the rules engine 404 based on the recognized context, and then applied to the given scenario 405. This process may involve adjusting parameters or customizing the script to suit the specific situation.

As the AI system encounters new scenarios and receives feedback on its performance, it should continue to learn 406 and update its algorithms and scripts stored in the rules engine 407, leading to improved accuracy and adaptability over time.

In accordance with FIG. 2, the AI system has the capability to create a script that utilizes an automated program generator 213 to manage user or designated recipient verification and notification permissions. The user or designated recipient may be a human, an entity, an AI application, or a system in the context of conversational interaction. By identifying the intended user or designated recipient, the AI system can tailor the information and interaction to meet their specific needs and preferences, enhancing the overall user experience.

Contextual information such as location, interaction history, preferences, and authorization is gathered through various means such as user input, sensors, and APIs to determine the appropriate recipient for a particular interaction or notification, ensuring the delivery of information to the correct individual.

In addition to identifying the recipient using contextual information, the AI system can also generate scripts to handle complex interactions automatically, without relying on pre-written business rules or entity databases. This iterative process of verifying the recipient and obtaining permission not only helps to ensure the security and privacy of data but also provides personalized and relevant notifications, improving the overall user experience. This approach differs from previous methods that rely on static databases or manual verification processes, which can be time-consuming and error-prone.

As depicted in FIG. 2, the analysis modules 208 in the AI system 200 are a set of components or algorithms that have been created to process, analyze, and interpret data obtained from user interaction, external sources, or the AI system's OKB. These modules are important in improving the AI system's performance and accuracy in comprehending user intent, context, and generating suitable responses. They are fundamental blocks that enable the AI system to comprehend and make sense of various data types and sources.

The analysis modules in the AI system are designed to work in conjunction with other modules, engines, and databases. In one embodiment, when a user submits a query to an AI agent, which can take the form of a search keyword, a message, or a symbol, one or more analysis modules are utilized in conjunction with NLP and ML to validate, formulate, or verify the user's query in order for the AI agent to provide an accurate response.

In another embodiment, the analysis modules are used for statistical data analysis, inductive learning, case-based reasoning, and visualization. An alternative embodiment employs one or more analysis modules, in combination with a rules engine, to conduct predictive modeling, data analysis, reasoning, and inductive learning for AI agents to perform rationally. Additionally, in yet another embodiment, the AI system employs a computer vision system to analyze image data for object recognition and identification. Finally, analysis modules can also be used for image data analysis, such as object recognition and identification, using a computer vision system. Overall, analysis modules are an important part of an AI system as they help to improve the system's performance and accuracy in understanding user intent, context, and generating appropriate responses.

The analysis modules are designed to support the learning and analytical capabilities of conversational AI agents. Each analysis module cooperates and communicates with one another to perform data mining, data selection, data cleaning, data transformation, training, and dataset construction.

Figure 5:
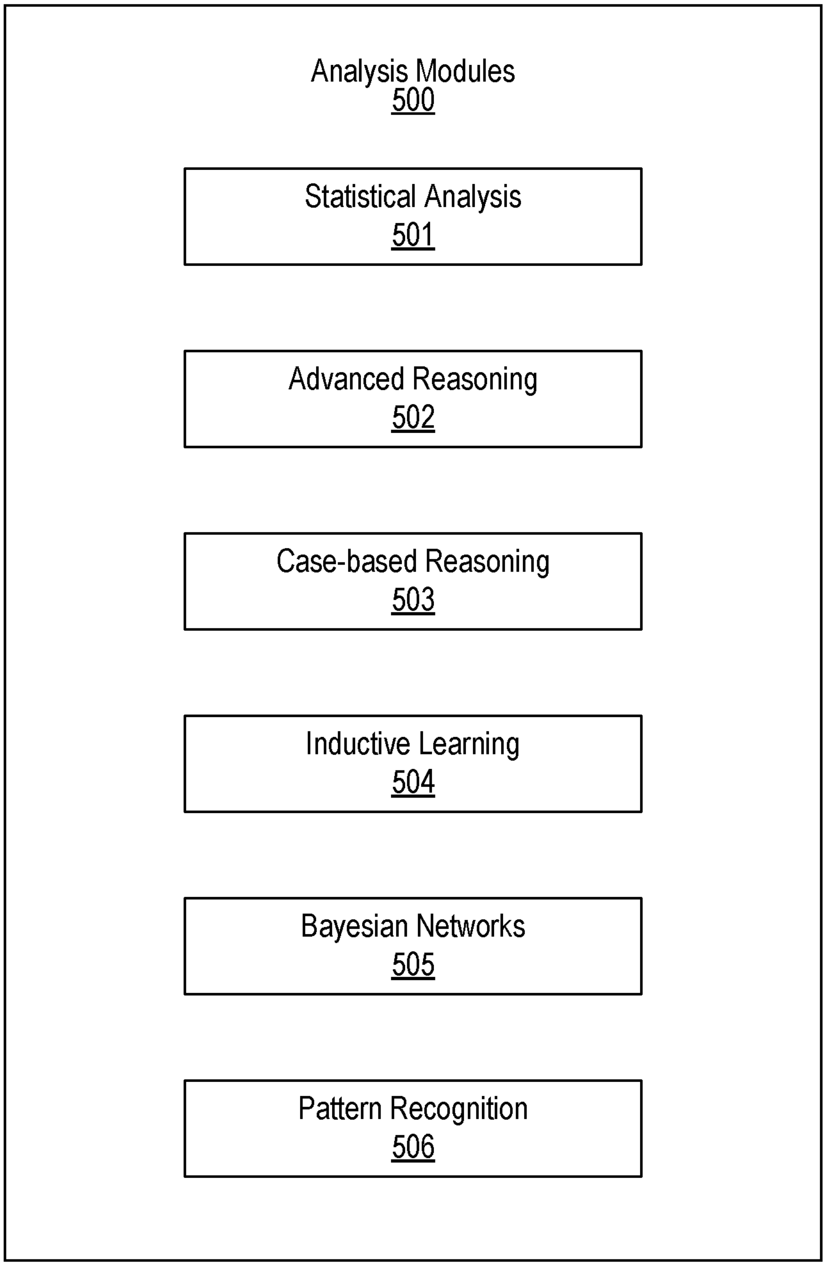
FIG. 5 depicts a high-level block diagram illustrating analysis modules.

FIG. 5 depicts a high-level block diagram of analysis modules 500, which are part of an AI system 200. The analysis modules are shown as a group of interconnected components or algorithms that are designed to process, analyze, and interpret data obtained from user interaction, external sources, or the AI system's OKB. The diagram shows that the analysis modules comprise components such as statistical analysis 501, advanced reasoning 502, case-based reasoning 503, inductive learning 504, Bayesian networks 505, and pattern recognition 506. These components interact with each other and with other modules, engines, and databases within the AI system to enhance its performance and accuracy in understanding user intent, context, and generating appropriate responses.

Referring to FIG. 2, the analysis modules include advanced reasoning models 207 that allow for more sophisticated and accurate analysis of data. The advanced reasoning models used by analysis modules in an AI system are a computational model designed to imitate human-like cognitive abilities, such as problem-solving, decision-making, and understanding complex relationships. The advanced reasoning models help enhance the AI system's capacity to reason, deduce, and infer knowledge from available information.

Various techniques can be employed in advanced reasoning models, including logical reasoning, probabilistic reasoning, and case-based reasoning, among others as described as follows: (1) Logical reasoning models use formal logic, such as propositional logic or first-order logic, to represent knowledge and draw conclusions based on a set of rules and premises. These models are highly structured, providing a clear and explicit reasoning process, making them suitable for applications that require explainability. (2) Probabilistic reasoning models, on the other hand, utilize probability theory and Bayesian networks to deal with uncertain or incomplete information. By representing the relationships between variables using probabilities, these models can make inferences and predictions even when some data is missing or uncertain. (3) In case-based reasoning models, the AI system learns from past experiences or cases to solve new problems. By analyzing similarities between the current situation and previously encountered scenarios, the AI system can adapt past solutions to address the current problem, making it particularly useful for applications where learning from experience is important.

Additionally, the advanced reasoning models can incorporate various techniques such as ML, NLP, and probabilistic reasoning to enable the analysis modules to analyze and interpret complex data.

For example, the advanced reasoning models might use ML algorithms to identify patterns in large data sets, allowing the analysis modules to make informed predictions or recommendations. NLP techniques can be applied to analyze unstructured data, such as text-based posts or customer reviews, to identify sentiments or topics of interest. Probabilistic reasoning can be used to analyze data with uncertain or incomplete information, such as when dealing with missing data or data with high levels of noise.

The advanced reasoning models used in the AI system's analysis modules allow the AI system to reason more effectively, making reasonable decisions and understanding complex relationships. By incorporating different reasoning techniques, the AI system can become more adaptable and robust, capable of handling a variety of tasks and situations.

Referring to FIG. 2, the knowledge graph engine 210 is a powerful system that facilitates the creation, management, and utilization of knowledge graphs for various applications, such as search engines, recommendation systems, and NLU. Knowledge graphs are structured, interconnected networks of entities (nodes) and their relationships (edges), representing real-world information in a machine-readable and semantically rich format. By efficiently processing, storing, and analyzing interconnected data, the knowledge graph engine empowers users to unlock the full potential of their data and derive valuable insights.

The knowledge graph engine 210 serves as the backbone of the knowledge graph, providing the tools and functionalities to perform various tasks, such as: (1) Data Ingestion: The knowledge graph engine acquires and processes data from multiple sources, including structured databases, unstructured text, web pages, and APIs, to extract relevant entities and relationships. Data integration techniques, such as entity resolution and schema matching, are used to combine and harmonize information from diverse sources. (2) Knowledge Representation: The knowledge graph engine organizes and stores extracted entities and relationships in a graph-based data model. This representation enables efficient storage and retrieval of complex, interrelated information, while preserving its semantic structure. (3) Semantic Enrichment: The knowledge graph engine can use NLP, ML, and reasoning techniques to enrich the knowledge graph with additional semantic information, such as entity types, categories, and hierarchies. This enhances the usability and expressiveness of the knowledge graph for various applications. (4) Querying and Exploration: The knowledge graph engine provides a query language and interface for users to search, filter, and retrieve information from the knowledge graph. Users can perform complex queries that involve traversing multiple relationships or aggregating information across different entities. (5) Maintenance and Evolution: The knowledge graph engine is responsible for updating and maintaining the knowledge graph, incorporating new information, and detecting and resolving inconsistencies or errors. The knowledge graph engine may also use ML algorithms to learn new patterns, relationships, or insights from the data and incorporate them into the knowledge graph. (6) Analytics and Visualization: The knowledge graph engine can support advanced analytics and visualization tools, allowing users to explore the data, discover insights, and identify trends or patterns in the information.

In FIG. 2, the AI system utilizes the dialogue management module 211 to handle user interaction with the AI application and ensure a consistent and seamless experience. The AI system also enables smooth transitions between conversational AI agents, allowing users to switch between different agents or tasks without any disruption.

The AI system employs the dialogue management module 209 to control the conversation's progression by understanding and identifying user's intent and objective of the conversation as well as choosing suitable responses and prompts according to the user's prior inputs and the prevailing context. This approach ensures a seamless conversational flow and enables the AI application to comprehend the user's needs and preferences more personally.

The dialogue management module 211, consisting of an intent classification component and a response selection component, orchestrates the interaction between the user and the AI system. The dialogue management module 211 collaborates with the OKB, the NLP engine, NLU, and NLG module to ensure a smooth conversation flow and provide appropriate responses. FIG. 6 illustrates a high-level block diagram of a dialogue management module interacting with NLP, NLG, NLU, and OKB for a conversational interaction 600.

The conversation begins when a user provides input 601, which could be in the form of text, speech, or other mediums. This input is then processed by the NLP engine to extract relevant information 602. Next, the extracted information is first analyzed by the NLP engine 603, which breaks down the input into its constituent elements, such as words, phrases, and sentences. The NLU component then interprets the user input by extracting meaning and identifying the user's intent 604. Once the user's intent is determined, the intent classification component within the dialogue management module analyzes the intent 605 and selects the most appropriate response or action to fulfill the user's request using the response selection component 606.

The intent classification component in the dialogue management module is an important part of a conversational AI system, responsible for understanding and identifying the purpose or goal of a user's input during a conversation. This component helps the AI system recognize what the user intends to achieve with their query or statement, enabling the AI system to provide appropriate and relevant responses.

The intent classification component works by taking user input, which can be in the form of text or speech, and converting the user input into a format that the conversational AI system can process. The input is then preprocessed, which may involve techniques such as text normalization, tokenization, and removing stop words or other irrelevant information to ensure that it is in a suitable format for further analysis.

Next, the preprocessed input is converted into a set of features or a representation that can be used by ML algorithms. This process may involve techniques such as bag-of-words, term frequency-inverse document frequency (TF-IDF), or word embeddings (e.g., Word2Vec or GloVe).

The extracted features are then fed into a ML model, such as a decision tree, support vector machine, or neural network, which has been trained on a dataset of user inputs and their corresponding intents. The model then predicts the most likely intent for the given input based on the patterns the ML model has learned during training.

Once the predicted intent is generated, it may be post-processed to ensure it is in a suitable format for further use within the dialogue management module. Finally, based on the identified intent, the dialogue management module generates an appropriate response or takes a relevant action, such as answering a question, providing information, or executing a command.

In some cases, additional information may be required from the OKB to generate a suitable response. The dialogue management module retrieves the relevant information from the OKB, which contains detailed data about the environment and objects.

Based on the user's intent, context, and information from the OKB, the response selection component utilizes the intent classification to choose a suitable response from the OKB or dynamically generate a response using natural language generation techniques.

The response selection component 407 in the dialogue management module is an important part of a conversational AI system, responsible for choosing the most appropriate response or action based on the user's intent and the current context of the conversation. This component ensures that the AI system can generate relevant, coherent, and helpful replies or perform actions that meet the user's needs and expectations.

The response selection component 407 functions by following a set of steps. Firstly, it receives the user's intent from the intent classification component and considers the current conversation context. Secondly, it retrieves or generates a set of possible response candidates based on the intent and context. Thirdly, it ranks or scores the response candidates based on their relevance, coherence, and appropriateness to the user's intent and conversation context. Fourthly, it selects the highest-ranked or best-scoring response candidate as the final response to be delivered to the user. Post-processing may be done on the selected response, such as text formatting or converting it into the desired output format. Finally, the response is sent back to the user through the appropriate interface, continuing the conversation or completing the user's request. If there is no predefined answer or response, the NLG 409 module generates a coherent and easily understood response for the user. The generated response is presented to the user, either as text or through speech synthesis, depending on the medium of communication.

To maintain contextually relevant conversational interaction, the AI system needs to manage the flow of the conversation by keeping track of the context and the state of the conversation. This involves maintaining a conversational interaction history and a context of the conversation in the OKB so that the AI application can understand the user intents and objectives in the current conversation.

Figure 7:
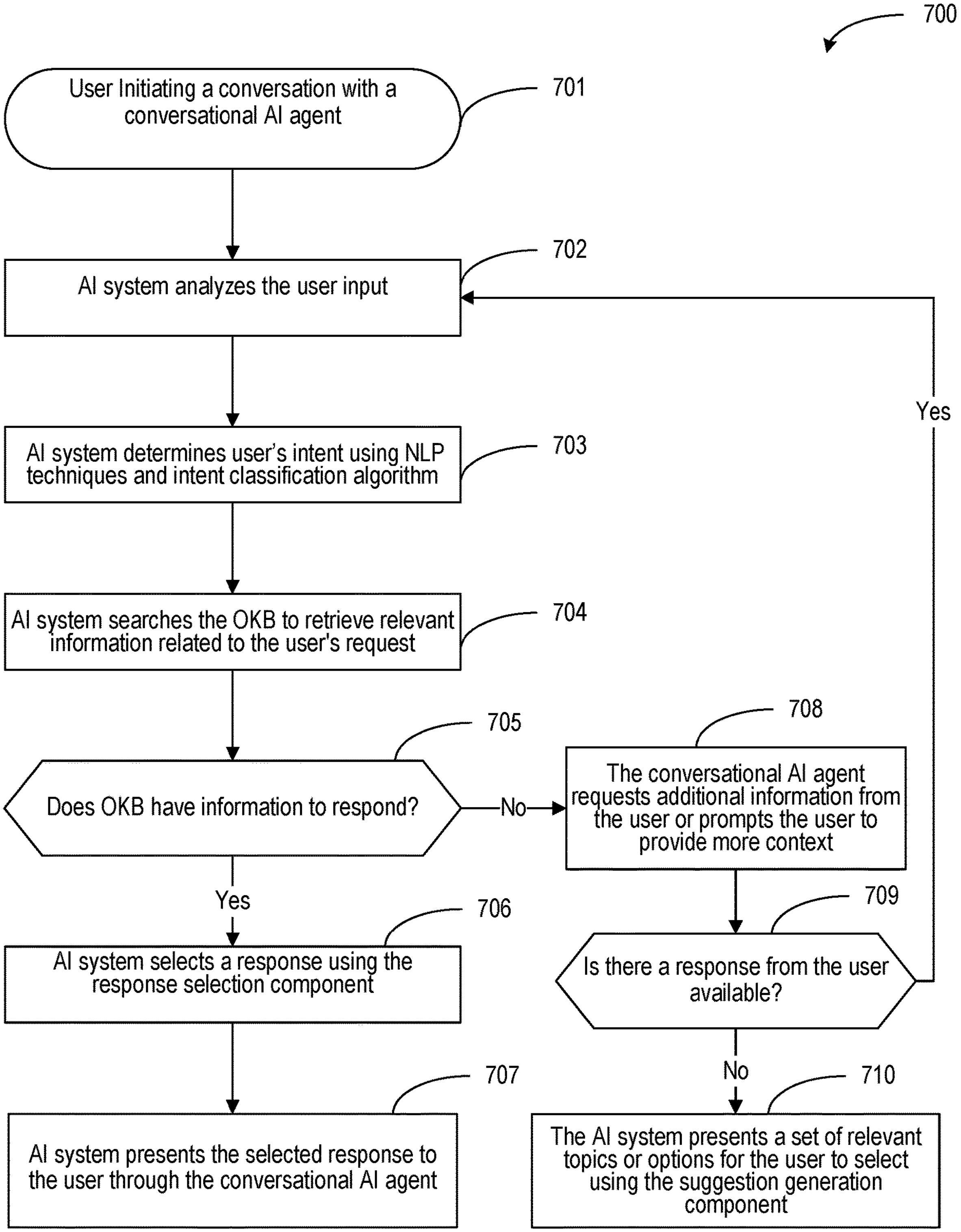
FIG. 7 depicts a flow chart illustrating a dialogue flow management process.

FIG. 7 depicts the steps of managing a dialogue flow 700. The flow chart begins with the user initiating a conversation with a conversational AI agent 701. The AI system then analyzes the user's input 702 and uses NLP techniques and an intent classification algorithm to determine the user's intent 703. Once the intent is identified, the AI system searches the OKB 704 to determine if it has the information to respond to the user 705. If the information is available, the AI system selects a response using the response selection component 706 and presents the selected response to the user through the conversational AI agent 707. If the information is not available, the conversational AI agent may ask the user for additional information or prompt the user to provide more context 708. The conversational AI agent determines if the user's response is available 709. If the user provides additional information, the AI system re-analyzes the input and determines the user's intent again. This process continues until the AI system has enough information to provide a relevant and accurate response.

If the user does not offer any further information in response to the conversational AI agent's request for more context, the AI system can suggest a set of relevant topics or options for the user to select 710. These options may include escalating the conversation to a human agent, providing a generic response that acknowledges the user's input without offering a specific answer, or ending the conversation if the AI system determines that it cannot provide a useful response without additional information. By presenting these options, the AI system can narrow down the user's intent and generate a more targeted response.

Throughout the dialogue flow, the AI system maintains context and remembers the user's previous inputs and responses. This allows the conversational AI agent to provide more contextually relevant and personalized responses to the user. The flow chart also includes a loop that enables the user to provide feedback on the conversational AI agent's response. If the user indicates that the response was not helpful or accurate, the conversational AI agent may ask for clarification or provide an alternative response.

The AI system can also use NLP and natural NLG techniques to ensure that the conversational interaction is as seamless and intuitive as possible. Additionally, the AI system can generate responses that are in line with the recipient's communication style and can adapt to changes in the conversation as new information is provided.

The APIs 108 shown in FIG. 1 facilitate communication among the various components of the intelligent system, enabling efficient data processing and seamless integration.

In some embodiments, APIs serve as a standardized method for different systems to communicate and exchange data with each other, enabling the AI system to access external systems and receive relevant data. These APIs allow the AI system to make requests for data from external systems and receive responses in a structured format that can be easily processed and integrated into the AI system's OKB.

By utilizing APIs, the AI system can access various systems, such as weather APIs or smart home devices, and use the data to provide contextually relevant responses to user requests or trigger specific actions based on the data received. For example, the AI system can use a weather API to access real-time weather information for a specific location, which can be integrated into the AI system's OKB to provide weather-based recommendations or actions. Furthermore, the use of APIs also enables the AI system to continuously evolve and integrate with new technologies as they become available, ensuring a future-proof and adaptable system.

The use of APIs also enables the AI system to keep up to date with the latest information and functionality from external systems. By regularly querying and integrating data from APIs, the AI system can adapt and improve its responses and actions based on the most current and relevant information. APIs can provide a level of flexibility and customization to the AI system. Different APIs can be integrated into the AI system depending on the specific needs and objectives of the AI system, allowing a tailored and optimized user experience.

However, it is important to ensure that the APIs being used are secure and reliable, as they may have access to sensitive data and functionality. The disclosed AI system implements proper authentication and authorization protocols to ensure that only authorized users and systems can access and use the APIs.

In some embodiments, the AI system can automatically search for and scrape information from various sources on the internet and through APIs. This process allows the AI system to gather relevant data and information that can be used to enhance the functionality and performance of the AI system. However, it is important to ensure that the AI system follows security and privacy rules and guidance when accessing and gathering information.

The authorization process should be controlled by the highest level of AI system administration to ensure that only authorized individuals and systems are allowed access to the data. By following these guidelines and best practices, the AI system can operate efficiently and effectively while maintaining security and privacy standards.

The scraped data can be utilized for a variety of purposes, such as automatic programming, analysis, generating more data, activating an AI application, and associating a new entity with an identified physical object in the OKB. Automatic programming involves using scraped data to create algorithms that can deliver results in various forms, such as video, images, audio, or text.

Analysis of the data can help identify trends and patterns that can inform decision-making or be utilized to generate insights. The scraped data can be used to create additional datasets that can be used to train AI models or to improve existing ones. The scraped data can be used to trigger an AI application, such as activating a robot to perform a task or providing a personalized recommendation to the user.

Additionally, when there is no owner for an identified physical object in the OKB, the AI system can temporarily assign ownership status using the entity extracted from the scraped data. For example, a user might report a defective product to a conversational AI agent without any previously assigned responsible party for the product. The AI system gathers information from various internet sources and APIs to identify the most probable responsible party. Once identified, object knowledge information is updated through a uniqueness assessment process. Consequently, the AI system generates an encrypted notification message and sends it to the most likely responsible party, such as the product manufacturer.

When the AI system temporarily assigns ownership status to an entity extracted from scraped data in cases where there is no owner for an identified physical object in the OKB, it is important to pay close attention to data privacy and security. Data privacy ensures that sensitive information about individuals or organizations is protected from unauthorized access, while data security focuses on safeguarding the data from potential breaches and attacks.

The AI system should adhere to the following principles to maintain data privacy and security: (1) Data minimization: The AI system should collect and store the minimum amount of data for the specific purpose. This reduces the risk of unauthorized access to sensitive information. (2) Anonymization: The AI system should anonymize or pseudonymize the data whenever possible to protect the privacy of individuals and organizations associated with the data. (3) Access control: The AI system should implement strict access control mechanisms, ensuring that only authorized personnel have access to the data. (4) Encryption: The AI system should encrypt sensitive data, both in transit and at rest, to protect it from unauthorized access and potential breaches. (5) Compliance with regulations: The AI system should comply with relevant data protection regulations and standards, such as the General Data Protection Regulation (GDPR) or the Health Insurance Portability and Accountability Act (HIPAA), depending on the context and location of the AI system's operation.

For instance, if the AI system collects patient data from various sources such as medical devices, electronic health records, and patient feedback, the AI system can use this data to generate personalized health recommendations and notifications for the patient. However, before sending any notifications, the AI system should ensure that the recipient is an authorized patient or healthcare provider.

To achieve this, the AI system can generate a script that searches for the recipient's contact information on the internet, such as their email address or phone number. The AI system can then send an encrypted message to the recipient, requesting them to verify their identity and confirm that they are authorized to receive the notifications. This could involve a secure authentication process, such as two-factor authentication, where the recipient needs to provide a unique code sent to their registered mobile device or email. Once the recipient's identity is successfully verified and their authorization is confirmed, the AI system can securely transmit personalized health recommendations and notifications, ensuring that sensitive patient information is only accessed by authorized individuals. In the meantime, the AI system can update the object knowledge with the recipient's information and obtain their permission to send future notifications based on agreed schedules and terms.

Figure 8:
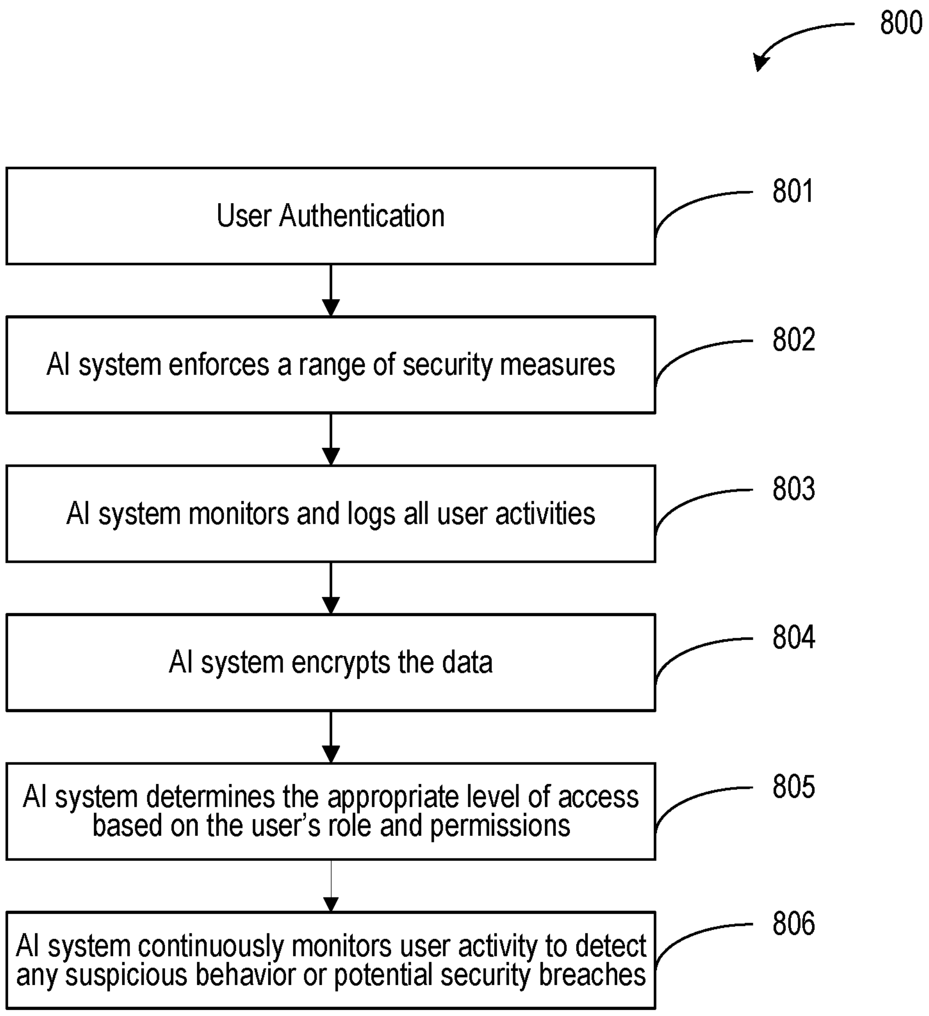
FIG. 8 depicts a process by which the AI system maintains data privacy and security.

In FIG. 8, a process is shown for how the AI system maintains data privacy and security 800. The process begins with user authentication 801, where the AI system verifies the user's identity before granting access to sensitive data. After the user authentication step, the AI system enforces a range of security measures to safeguard sensitive data against unauthorized access, disclosure, or tampering 802. The implemented measures may comprise encryption, access control, data masking, or data anonymization techniques, depending on the sensitivity level and applicable legal or regulatory requirements.

The AI system also monitors and logs all user activities involving sensitive data to detect and prevent unauthorized access or misuse 803. In the event of a security incident or breach, the AI system triggers a response plan that includes notifying the appropriate parties, containing the damage, and restoring the affected data and systems to their previous state.

Next, the AI system encrypts the data to ensure that it cannot be intercepted or accessed by unauthorized parties 804. Encryption is a security technique that converts data into an unreadable format, known as ciphertext, using an algorithm and an encryption key. Only those possessing the corresponding decryption key can decrypt the ciphertext back into its original, readable form. The next step is access control, where the AI system determines the appropriate level of access based on the user's role and permissions 805. The AI system continuously monitors user activity to detect any suspicious behavior or potential security breaches 806. In the event of a security breach or privacy violation, the AI system can take corrective action, such as alerting the user or administrator and logging the incident for future analysis.

Sensitive data refers to any information that, if exposed, accessed, or misused, could cause harm or negative consequences to an individual, organization, or system. Some common types of sensitive data consist of: (1) Personal Identifiable Information (PII): This category includes information that can be used to identify, locate, or contact an individual directly or indirectly. Examples of PII include names, addresses, phone numbers, email addresses, social security numbers, and passport numbers. (2) Financial information: Data related to an individual's or organization's financial transactions, accounts, or history falls under this category. Examples include bank account numbers, credit card numbers, transaction histories, tax records, and credit scores. (3) Health information: Health-related data, such as medical records, diagnoses, treatment plans, and insurance information, is considered sensitive due to its potential impact on an individual's privacy, well-being, and potential for discrimination or stigmatization. (4) Confidential business information: This category covers proprietary information that an organization deems valuable and confidential, such as trade secrets, intellectual property, business plans, unpublished financial data, or internal communications. (5) User credentials: Usernames, passwords, and other authentication information required to access a system, application, or service are considered sensitive due to the potential for unauthorized access or security breaches. (6) Legal information: Data related to legal proceedings, disputes, or investigations, such as court records, contracts, or attorney-client communications, may be deemed sensitive due to its potential impact on reputations, relationships, or legal outcomes.

There are two primary types of encryption. First, in symmetric encryption, the same key is used for both encryption and decryption. The sender and receiver should securely share this key to maintain data confidentiality. Popular symmetric encryption algorithms include Advanced Encryption Standard (AES) and Triple Data Encryption Standard (3DES). Second, in asymmetric encryption, a pair of related keys-a public key and a private key are used. The public key is openly shared and used for encryption, while the private key is kept secret and used for decryption. Anyone can use the public key to encrypt data, but only the holder of the corresponding private key can decrypt it. Widely used asymmetric encryption algorithms include RSA (Rivest-Shamir-Adleman) and Elliptic Curve Cryptography (ECC).

The encryption process provides security for data both in transit (while being transferred over networks) and at rest (while stored in databases, files, or other storage systems). For data in transit, protocols such as Secure Sockets Layer (SSL) and Transport Layer Security (TLS) are commonly used to create encrypted connections between a user's device and a server. This ensures that any data transmitted between the two parties is protected from eavesdropping, tampering, or interception by unauthorized individuals.

For data at rest, various encryption algorithms and techniques can be employed to protect sensitive information stored on servers, databases, or other storage devices. This prevents unauthorized access to the data, even if an attacker gains physical access to the storage medium or infiltrates the AI system. By encrypting data, the AI system ensures that sensitive information remains secure and confidential, mitigating the risk of unauthorized access, data breaches, or other security threats.

Access control is a security mechanism that regulates who or what can view, use, or interact with specific resources, such as data, systems, applications, or physical spaces. The primary goal of access control is to protect sensitive information and assets from unauthorized access or misuse while allowing authorized users to access the resources they need for their tasks.

There are different types of access control models, including: (1) Discretionary Access Control (DAC): In DAC, the resource owner or creator determines who can access a resource and what level of permission they have (e.g., read, write, execute). The permissions are typically based on the user's identity or role within an organization. (2) Mandatory Access Control (MAC): MAC enforces access control based on predefined security policies or rules, often using security labels or classifications attached to resources and user clearances. Users can only access resources if their clearance level matches or exceeds the resource's classification. (3) Role-Based Access Control (RBAC): RBAC assigns permissions based on predefined roles, which are tied to specific job functions or responsibilities. Users are granted access to resources based on their assigned roles rather than based on their individual identities. (4) Attribute-Based Access Control (ABAC): ABAC evaluates a set of attributes, such as user attributes, resource attributes, or environment conditions, to determine access permissions. ABAC allows for more granular and dynamic access control policies, as it considers various factors in the access decision-making process.

Access control systems typically involve three main components: (1) Identification: Users should identify themselves to the AI system, typically through a username or unique identifier. (2) Authentication: Users should prove their identity to the AI system, usually by providing a password, biometric data (e.g., fingerprint, facial recognition), or a security token. (3) Authorization: Once authenticated, the AI system checks the user's access permissions against the requested resource and determines if the user is allowed to access it based on the access control model in place.

Access control is an important aspect of information security, as it helps maintain the confidentiality, integrity, and availability of resources by preventing unauthorized access and ensuring that authorized users can access the resources they need in a timely and efficient manner.

In one embodiment, the AI system employs various techniques, including data encryption and access controls, to ensure the privacy and security of user data. To prevent the disclosure of sensitive information, the AI system uses filter functions and a transformation module that automatically removes any first-level data from the generated responses. For instance, in a public university setting, first-level data may refer to any information that can identify a student. If a student inadvertently shares their personal information during the conversational interaction with the conversational AI agent, the agent strictly follows the privacy policy and guidelines to remind the student to refrain from sharing any personal information. The conversational AI agent then responds to the student's query without using any personal information, and the personal identification data is not stored in the OKB.

Furthermore, the AI system enables users to control their data and specify their preferences for data sharing and storage. By providing users with these options, the AI system promotes transparency and enhances user trust in the AI system. The AI system's privacy and security features demonstrate the AI system's commitment to protecting sensitive data and maintaining user privacy.

The AI system includes an AI agent generator 214, as shown in FIG. 2, which generates multiple AI models. Each model has its own specific knowledge, skills, functions, features, and goals to perform a variety of tasks. The AI agent generator assigns a unique identifier to each AI agent it creates, making it easy to identify and register them in the AI agent database. Additionally, the AI agent generator customizes each AI model to meet the specific needs and preferences of users. The flexibility of the AI agent generator allows it to create a diverse range of models that enhance efficiency across various industries and fields.

For instance, a feedback collector AI model could have a name like "Feedback collector," a purpose of collecting customer feedback, a predefined personality of a delightful 20-year-old female voice, and a goal of conducting concise dialogues to collect feedback on an identified product.

Another example is language models, a type of artificial intelligence that is trained to generate natural language text. Language models are typically based on neural networks, which are a type of ML model that is designed to process large amounts of data and make predictions or decisions. Language models are trained on large datasets of text, such as books, articles, and websites. The goal is to train the model to generate text that is similar to human-written text, in terms of grammar, vocabulary, and style. They are used in a wide range of applications, such as NLP, machine translation, text summarization, and text-to-speech synthesis.

Language models are created with the purpose of comprehending and handling natural language input provided by users. The output generated by the language model is aimed at being contextually appropriate and logically connected to the current conversation. This is achieved through several mechanisms: (1) Attention mechanism: Language models employ an attention mechanism to dynamically adjust the importance of different parts of the input text, based on their relevance to the current context of the conversation. This allows it to focus on the most important information and generate responses that are more contextually appropriate. (2) Contextual embeddings: Language models use pre-trained contextual word embeddings to capture the meaning of words and their relationships to each other in the context of the conversation. These embeddings are generated using deep neural network models that are trained on large amounts of text data, allowing The language model to understand and generate responses that are more natural and contextually relevant. (3) Dialogue history: Language models maintain a record of the previous turns in the conversation, along with their corresponding responses. This enables it to keep track of the context of the conversation and generate responses that are consistent with the previous dialogue turns. (4) Fine-tuning: Language models can be fine-tuned for specific domains or topics to improve its ability to generate contextually relevant responses for those domains. This involves training the model on a dataset of conversational data in the target domain, which allows it to learn the specific language and patterns of conversation in that domain.

In some embodiments, users may choose to generate new AI agents by using prebuilt models or duplicating the existing ones. Alternatively, users can create custom AI agents by utilizing the AI generator's toolkit, which is accessible through a mobile or web application. The AI generator's toolkit comprises various modules that enable users to configure personalized AI agents, including persona modules, dialog rule modules, interface options, and functions for AI agents to deliver services.

Persona modules are prebuilt templates that define the characteristics and traits of the AI agent, including its appearance, personality, and tone of voice. These modules allow users to create an AI agent with a specific persona quickly, making it more relatable and engaging for users.

Dialog rule modules are utilized to define the conversation flow and logic of the AI agent. These modules allow users to establish a set of rules and guidelines for the AI agent to follow during a conversation with a user, ensuring that the conversation is coherent and consistent.

Interface options refer to the different ways in which the user can interact with the AI agent, such as through text, speech, or visual interfaces. The toolkit provides options for customizing the interface based on the user's preferences and needs.

Functions for AI agents to deliver services refer to the specific tasks or services that the AI agent can perform. These functions can be tailored to meet the user's specific needs, such as providing customer support, generating recommendations, or assisting with data analysis.

The interface generator 215 in the AI system is a component responsible for creating and managing user interfaces (Uls) that facilitate seamless interaction between the AI system and its users. The interface generator aims to provide a user-friendly, accessible, and engaging interface, enabling users to effectively communicate with the AI system, access its features, and receive its output. By providing dynamic, multi-modal, adaptive, and accessible Uls, the interface generator helps users access and utilize the AI system's features and capabilities efficiently and enjoyably.

Some key aspects of an interface generator 215 in an AI system include: (1) Dynamic UI generation: The interface generator can dynamically create user interfaces tailored to specific user needs, preferences, or device types (e.g., mobile, desktop, voice-activated devices). This may involve generating UI elements like buttons, text input fields, or interactive visualizations that align with the user's context and facilitate efficient interaction with the AI system. (2) Multi-modal interfaces: The interface generator may support multi-modal interaction, allowing users to communicate with the AI system using various input methods such as text, voice, or gestures. This can involve implementing speech recognition, NLP, or computer vision techniques to process and interpret diverse user inputs effectively. (3) Adaptive interfaces: The interface generator can adapt the UI based on real-time user interaction data, feedback, or changes in the AI system's state. This may involve updating UI elements, providing personalized content, or adjusting the interface layout to improve the user experience and facilitate more effective communication with the AI system. (4) UI consistency: The interface generator ensures consistency in the design, layout, and functionality of the AI system's user interfaces across different platforms, devices, or contexts. This helps create a cohesive user experience, reducing the learning curve and increasing user satisfaction. (5) Integration with AI components: The interface generator seamlessly integrates with other AI system components, such as the NLP engine, ML algorithms, or OKB. This integration enables the AI system to process user inputs, generate relevant outputs, and present them effectively through the user interface. (6) Accessibility and usability: The interface generator emphasizes accessibility and usability, ensuring that the AI system's user interfaces are inclusive and easy to use for a diverse range of users, including those with disabilities or specific needs.

In one embodiment, the interface generator facilitates defining two interfaces: a first interface connected to a physical object identifier and a second interface for user interaction. The first interface can use machine-readable codes, such as barcodes or QR codes, or NFC tags to link an object with its conversational AI agent and OKB. Users can access the conversational AI agent using a mobile app or a generic code reader.

The second interface provides user interaction through a voice-based conversational UI, graphical conversational UI, or a combination of both, displayed on a computing device. The AI system adjusts the interface based on the user's role, offering different features and functions. For instance, an object's responsible party may have access to a dashboard, while an anonymous user will not. The graphical user interface (GUI) can be presented in various styles, including conversational, web form, or hybrid, and may include checkboxes, buttons, or text input fields. Users can interact with the AI agent using voice, text, or file uploads.

In some embodiments, the mobile device displays a GUI immediately upon connecting with an AI agent. The GUI may include messages, images, icons, buttons, search bars, or input fields. Conversations can also be voice-based, allowing users to interact with the AI agent using a voice assistant feature on a mobile application.

In one embodiment, the AI application that is a conversational AI agent is a system designed to engage in human-like dialogue with users through text or voice-based interfaces. This type of application typically uses NLP and ML algorithms to understand and interpret the user's input, and then generates an appropriate response based on the context and purpose of the conversation.

For example, a conversational AI agent could be used in restaurant settings to provide support to customers. When a customer initiates a conversation with the AI agent, the AI system could use NLP to understand the customer's request and generate a response that addresses their needs. The AI agent could also use ML algorithms to learn from past conversations and improve its responses over time, resulting in a more effective and efficient customer service experience.

The AI agent persona generator 216 is responsible for creating and managing unique, engaging, and coherent virtual personalities or personas for AI agents, such as chatbots or virtual assistants. These personas help humanize the AI agents, making them more relatable and enjoyable for users to interact with, thus enhancing user experience and engagement.

The key aspects of an AI agent persona generator include: (1) Personality traits: The module defines and assigns various personality traits to the AI agent persona, such as extroversion, agreeableness, conscientiousness, openness, or neuroticism. These traits help shape the AI agent's behavior, responses, and overall demeanor during interactions with users. (2) Communication style: The persona generator module determines the AI agent's communication style, such as formal, casual, humorous, or empathetic, to align with user expectations and preferences. This involves tailoring the AI agent's language, tone, and expressions to create a consistent and engaging communication experience. (3) Backstory: The module may develop a backstory or background information for the AI agent persona, such as origin, occupation, or interests, to make the AI agent more relatable and human-like. This backstory can be used to inform the AI agent's responses, opinions, or knowledge during interactions with users. (4) Visual representation: The persona generator module may create a visual representation or avatar for the AI agent persona, such as a character image, icon, or animation. This visual representation can be used to enhance the user's engagement and emotional connection with the AI agent. (5) Adaptability: The module allows for the AI agent persona to adapt and evolve over time based on user interaction, feedback, or system updates. This may involve adjusting the AI agent's personality traits, communication style, or other attributes to suit user needs and preferences. (6) Integration with AI components: The persona generator module seamlessly integrates with other AI system components, such as NLP engine, ML engine, or OKB, to ensure the AI agent's persona is consistently reflected in its responses, actions, and decision-making. (7) Customization: The module may allow users or system administrators to customize the AI agent persona, enabling them to define specific personality traits, communication styles, or other attributes that align with their brand, target audience, or application requirements.

In one embodiment, the AI system utilizes ML algorithms and NLP techniques to create and manage conversational AI agents. Initially, the system collects and analyzes data from various sources, including user interactions, feedback, and environmental data, to gain insights into user behavior and preferences. With these insights, the AI system creates and trains conversational AI agents to perform specific functions and achieve certain objectives, such as providing personalized recommendations or controlling devices in the environment. When making changes to a conversational AI agent, the modifications are not limited to non-physical components of the configuration but can also include updates to the device, software, and data.

In another embodiment, the AI system can manage multiple conversational AI agents with different objectives and functions to provide a comprehensive and seamless user experience. To manage conversational AI agents, the AI system uses an AI agent management system 217, which utilizes clustering and classification algorithms to organize the conversational AI agents based on their functions and objectives. Additionally, the AI system monitors the conversational AI agent performance, including response time and accuracy, and automatically adjusts settings and parameters accordingly.

The AI agent management system 217 is a comprehensive system consisting of several modules and tools for configuring and managing AI agents. The AI agent management system allows users to customize AI agents by tailoring various characteristics, such as personas, dialog rules, and interfaces.

To control AI agents' availability, AI agent state modules can be employed to activate or deactivate agents as needed. The AI system also includes performance measurement features that assess AI agent and user interaction using quantitative or qualitative metrics like satisfaction scores, response time, accuracy in response, and effective service hours.

An agent functionality module is available, which helps users select one or more functions that the AI agent can execute to fulfill specific business requirements. These functions could include the location of the service, supported languages (e.g., English, Spanish, Japanese, etc.), tones used in the conversation, duration of the conversation, and priority.

The AI agent management system can be used by either a system administrator or an object's responsible party, who manages or owns the identified objects. They can configure one or more AI agents to meet the business requirements and needs using the features and tools provided by the AI system.

The reward system 218 in the AI system 200 aims to train a conversational AI agent to make optimal decisions based on conversational interaction. The reward system can be designed to optimize the quality of interaction between the AI agent and users. The reward system provides feedback to the agent by assigning numerical values, or "rewards," to actions taken by the agent in specific states. For instance, rewards can be assigned based on factors such as user satisfaction, the relevance of the agent's responses, the efficiency in addressing user needs, or the agent's ability to maintain a natural and engaging conversation.

The conversational AI agent's objective is to maximize cumulative reward over time by learning an optimal policy, which is a mapping of states to actions that yield the highest expected reward. The reward system acts as a measure of the desirability of the agent's actions and helps guide the agent's learning process.

By continuously learning from the rewards received, the conversational AI agent can adapt its responses and improve its performance over time, leading to more contextually relevant interactions with users. In this way, the reward system plays an important role in shaping the AI agent's behavior and contributing to the overall effectiveness of the AI system.

An objective function 219 in the AI system 200 is a mathematical representation of the AI system's goal or the desired outcome it aims to achieve. The objective function quantifies the performance of the AI system by assigning a numerical value to its current state, taking into consideration various factors such as accuracy, efficiency, and other performance metrics. In the context of ML and optimization, the objective function plays an important role in guiding the AI system during training or decision-making processes.

The AI system's goal is to either minimize or maximize the objective function, depending on the specific problem being addressed. For example, in a supervised learning task like regression or classification, the objective function is often a loss function that measures the difference between the predicted output and the actual target values. The AI system's goal would be to minimize this loss function, thereby improving the accuracy of its predictions.

In a reinforcement learning context, the objective function is typically represented as a reward function. The AI system's goal is to maximize the cumulative reward it receives over time by taking actions that lead to more desirable outcomes in its environment.

To optimize the objective function, the AI system use various optimization techniques, such as gradient descent, genetic algorithms, or simulated annealing, to search the solution space and find the optimal set of parameters or decisions that yield the best performance.

Control systems 220 in the AI system 200 refer to a set of components and mechanisms that manage and regulate the flow of information, decision-making processes, and interaction within the AI system. These control systems ensure the AI system operates efficiently, accurately, and safely.

Some key aspects of control systems in the AI system include: (1) Data flow control: This aspect manages the flow of data within the AI system, ensuring that data from various sources, such as user input, sensors, and external databases, are properly processed, stored, and utilized. Data flow control mechanisms help maintain data integrity and prevent bottlenecks or data loss. (2) Decision-making control: The AI system often makes decisions based on data analysis, user input, or predefined rules. Decision-making control mechanisms ensure that these decisions are made consistently, accurately, and in line with the AI system's objectives. This can involve using ML algorithms, rule-based systems, or other decision-making approaches. (3) Interaction control: The AI system, particularly conversational AI agents, needs to manage interaction with users effectively. Interaction control systems in the AI system manage these exchanges, maintaining a smooth and coherent flow of conversation. This may involve dialogue management, response selection, and context-awareness. (4) Learning and adaptation control: To improve their performance over time, the AI system learns from their experiences, user feedback, and data analysis. Control systems governing learning and adaptation ensure that the AI system updates its knowledge, algorithms, and models effectively, incorporating new information and refining its understanding of the problem domain. (5) Error handling and recovery control: The AI system can encounter errors, such as data inconsistencies, unexpected user inputs, or hardware malfunctions. Control systems focused on error handling and recovery help the AI system detect, diagnose, and recover from these issues, minimizing disruptions and maintaining a high level of performance. (6) Security and privacy control: The AI system ensures the confidentiality, integrity, and availability of user data and system resources. Control systems related to security and privacy manage access control, encryption, and other security measures to protect both the AI system and the users it serves.

Validation systems 221 in the AI system 200 refer to the processes, techniques, and components employed to ensure the accuracy, reliability, and quality of the AI system's outputs, predictions, or decisions. These systems are important for maintaining the trustworthiness and performance of AI applications, as well as mitigating the risks associated with incorrect predictions or actions. By incorporating various validation techniques and components, trustworthy and high-performing AI applications that effectively address the needs of users and the problem domain can be built.

Some key aspects of validation systems in AI include: (1) Data Validation: Ensuring the quality and correctness of the data used for training and evaluating AI models is important. Data validation includes checking for missing, inconsistent, or erroneous values, as well as ensuring data is representative of the problem domain. This process may involve data cleaning, normalization, and transformation techniques to prepare the data for the AI system. (2) Model Validation: This aspect focuses on evaluating the performance of AI models, such as ML or deep learning algorithms, on unseen data. Techniques like cross-validation, holdout validation, or bootstrapping are used to assess the generalization capabilities of the models, preventing overfitting, and ensuring robust performance on new inputs. (3) Output Validation: AI system often produce outputs in the form of predictions, recommendations, or decisions. Validating these outputs involves comparing them with ground-truth data or known outcomes, measuring their accuracy, precision, recall, F1-score, or other relevant metrics. This helps quantify the performance of the AI system and identify areas for improvement. (4) Real-time Validation: In some cases, AI system may require ongoing validation during operation to ensure their reliability and adaptability to changing conditions. This can involve real-time monitoring of the AI system's performance, updating models with new data, or incorporating user feedback to refine the AI system's understanding and behavior. (5) Explainability and Interpretability: Validation systems may also include components for enhancing the explainability and interpretability of the AI system's outputs, helping users understand the rationale behind the AI system's predictions or decisions. This can involve using techniques like feature importance analysis, model-agnostic explanations, or visualization tools to provide insights into the AI system's inner workings. (6) Robustness and Security: Validation systems should also assess the robustness and security of the AI system, ensuring it can handle adversarial inputs, noise, or other challenging conditions. This may involve testing the AI system's resilience to adversarial attacks, data poisoning, or other potential threats.

The notification system 222 in the AI system 200 is responsible for sending alerts or messages to users based on specific conditions, events, or changes detected by the AI system. The notification system aims to keep users informed, engaged, and up-to-date with relevant information, ensuring that they receive timely notifications about important events or situations.

In the context of an AI system, the notification system works in conjunction with various other components, such as data processing, analysis, and decision-making modules. The AI system processes and analyzes the data, detects patterns, recognizes events, and makes decisions based on the predefined rules or learned patterns. Once a condition or event of interest is identified, the notification system is triggered to send an alert or message to the user.

The notification system can deliver messages through various communication channels, such as emails, text messages, push notifications, or in-app messages, depending on the user's preferences and the nature of the event. Notifications can be contextually relevant and personalized, ensuring that users receive the most appropriate and useful information.

Some common use cases for a notification system in an AI system include: (1) Alerting users to potential security threats, breaches, or unusual activities detected by the AI system. (2) Providing reminders or updates related to appointments, deadlines, or events. (3) Informing users about changes in monitored variables, such as stock prices, temperature, or any other parameter of interest. (4) Sending recommendations or suggestions based on the user's preferences, behavior, or context, as identified by the AI system. (5) Delivering important news or updates relevant to the user's interests or the AI system's domain.

In an embodiment, FIG. 9 illustrates a process of how the notification system is utilized to inform the user or assigned recipient of significant information or updates 900. The flow chart describes how the notification system operates within the intelligent system, displaying the various stages involved in generating and delivering notifications to assigned recipients.

The first step in the process is to identify the type of notification to be generated 901, which could be related to updates, reminders, or alerts. Once the notification type is identified, the AI system evaluates the notification's relevance and urgency 902, then selects the appropriate recipients based on the notification's relevance and urgency 903.

After selecting the recipient, the notification is generated 904 and an appropriate channel is determined 905. Then the notification is sent through the preferred communication channel 906, which could be through a mobile application, email, or text message. The notification includes important details related to the object, such as its location, status, or any relevant changes.

Once the notification is sent, the AI system tracks the delivery status 907 and provides confirmation to the sender 908, ensuring that the recipient receives the notification in a timely manner. This process ensures that the users and designated recipients are always informed and up to date about any important information or changes related to the physical objects in the environment.

In some embodiments, the AI system utilizes a combination of inputs, including the rules engine, the OKB, user preferences, and contextual information, to determine the type of notification to be generated. The rules engine consists of a set of predefined rules that the AI system applies to incoming data to determine the appropriate action or response. The OKB contains a repository of knowledge and information that the AI system can use to understand and interpret incoming data. User preferences refer to the settings and preferences that the user has configured for the AI system, such as the frequency and mode of notification delivery. Contextual information includes data about the user's environment, activities, and behavior that the AI system can use to determine the most relevant and appropriate notification type.

Using these inputs, the AI system can apply a set of decision-making algorithms to determine the type of notification to be generated. For example, the AI system can employ a decision tree algorithm that evaluates the input data against a set of rules and criteria to determine the appropriate notification type. Alternatively, the AI system can use a Bayesian network algorithm that models the probability of different notification types based on the input data and prior knowledge. The AI system can also use a reinforcement learning algorithm that learns from user feedback and adjusts its notification type selection over time.

In one embodiment, the AI system evaluates the relevance and urgency of a notification by considering a variety of factors. For example, the AI system may analyze the notification content, such as keywords or phrases, to determine its relevance to the user. Additionally, the AI system may consider the user's interaction history, preferences, and other contextual information to further refine the evaluation.

In terms of urgency, the AI system may take into account factors such as the importance of the notification, the time sensitivity of the information, and the user's current context. For example, if the notification is related to a time-sensitive task, such as a deadline or a scheduled event, the AI system may prioritize it as more urgent than other notifications.

Once the AI system has evaluated the relevance and urgency of the notification, it can select the appropriate recipients based on these factors. For example, if the notification is highly relevant and urgent, it may be sent to a designated group of individuals responsible for handling such notifications. Alternatively, if the notification is less urgent, it may be sent to a broader audience or placed in a lower-priority queue.

The AI system can determine the appropriate channel to send a notification by analyzing the user's communication preferences, the urgency and relevance of the notification, and the characteristics of each communication channel. For example, if the user has indicated a preference for receiving urgent notifications through text messages, the AI system may choose to send an urgent notification via SMS. Alternatively, if the notification is less urgent but still important, the AI system may choose to send it via email or push notification through a mobile app. The AI system may also consider factors such as the user's location and time zone when selecting the appropriate channel to ensure that the notification is delivered at a convenient time and place for the user. Overall, the goal is to deliver the notification through the channel that is most likely to result in the user seeing and responding to it in a timely manner.

FIGS. 10-11 depict an embodiment of enabling user-centered and contextually relevant conversational interaction.

In FIG. 10, the flowchart outlines the steps involved in the AI system that utilizes environmental data to generate contextual understanding and facilitate user-centered interaction 1000. The process begins with the AI application receiving environment data 1001, which is then sent to the AI system for analysis 1002. The AI system then analyzes the received data 1003 to detect physical objects in the environment 1004, generating contextual information about the detected objects in the environment 1005 as well as forming a set of understandings of the overall environment 1006.

Once the AI system has developed this contextual understanding, it identifies a relevant user with conversational capabilities 1007, predicting the most relevant contextual information for this user 1008. This information is then transformed into textual form, allowing easy communication and understanding 1009.

The system then predicts a set of user-centered contextual relevant interaction intents and objectives 1010, which serve as the basis for facilitating meaningful interactions between the user and the environment in the subsequent steps (as depicted in FIG. 11). These interactions leverage the contextual understanding and insights gained from the environmental data, providing a more personalized and effective user experience.

FIG. 11 provides a detailed view of the iterative conversational interaction and the most relevant intent and objective validation process for contextually relevant engagement 1100.

The process begins with the AI application engaging in a conversational interaction with the user iteratively 1101. During this interaction, the AI application sends interaction data to the AI system 1102, which receives and analyzes the data 1103 to determine the most relevant intent and objective 1104.

Next, the AI system validates the understanding of the most relevant intent and objective with the user 1105, iterating until the user agrees 1106. This ensures that the AI system has accurately interpreted the user's needs and goals, providing a more effective and personalized interaction.

Finally, the validated intent and objective are utilized by the AI application to facilitate the user-centered and contextually relevant conversational interaction 1107, leveraging the contextual understanding and insights gained from the environmental data. This iterative process ensures that the interaction remains relevant and effective over time, adapting to the user's evolving needs and context.

Referring to FIG. 10, the AI application uses sensory data from the environment to infer the user's intent and objectives for the communication and generate an appropriate response without explicit user input. The collected environmental data includes temperature, location, motion, sound, and other factors, using various technologies, such as sensors, cameras, microphones, IoT, the computer vision system to analyze images or videos, object recognition algorithms to classify objects, APIs to access external data sources, and the OKB to obtain detailed information about the environment.

The AI system receives this data from the AI application to create a contextual understanding of the surroundings and the user's current situation when they are detected in the environment. Contextual understanding refers to the ability of the AI system to interpret and make sense of a situation, user's input, or data by considering the relevant context. Contextual understanding involves identifying the relationships, connections, and background information that influence the meaning of a given situation or input. Contextual understanding allows the AI system to provide more accurate, relevant, and personalized responses or actions based on the context in which they operate.

To enhance contextual understanding, the AI system cleans and preprocesses the received environment data and relevant information, analyzes the data and information, classifies and categorizes the data, and labels the classified and categorized data to form a contextualization that enables contextual relevant conversational interaction with a user or a recipient.

In an embodiment, the present invention provides a system and method for collecting and processing environmental data. The method includes preprocessing the environmental data by cleaning, filtering, or transforming the data to make it suitable for further analysis. The preprocessed environmental data is then analyzed and classified into various categories based on object types, attributes, or other characteristics. Once the environmental data is classified and categorized, labels are assigned to the data resulting in a plurality of labeled data. The system can then establish context and associate the labeled environmental data with specific physical objects. The system may iteratively continue to label the classified and categorized environmental data until an entity with conversational ability is identified. The system can also automatically add the selected object and the labeled environmental data to the ontology knowledge base.

Figure 12:
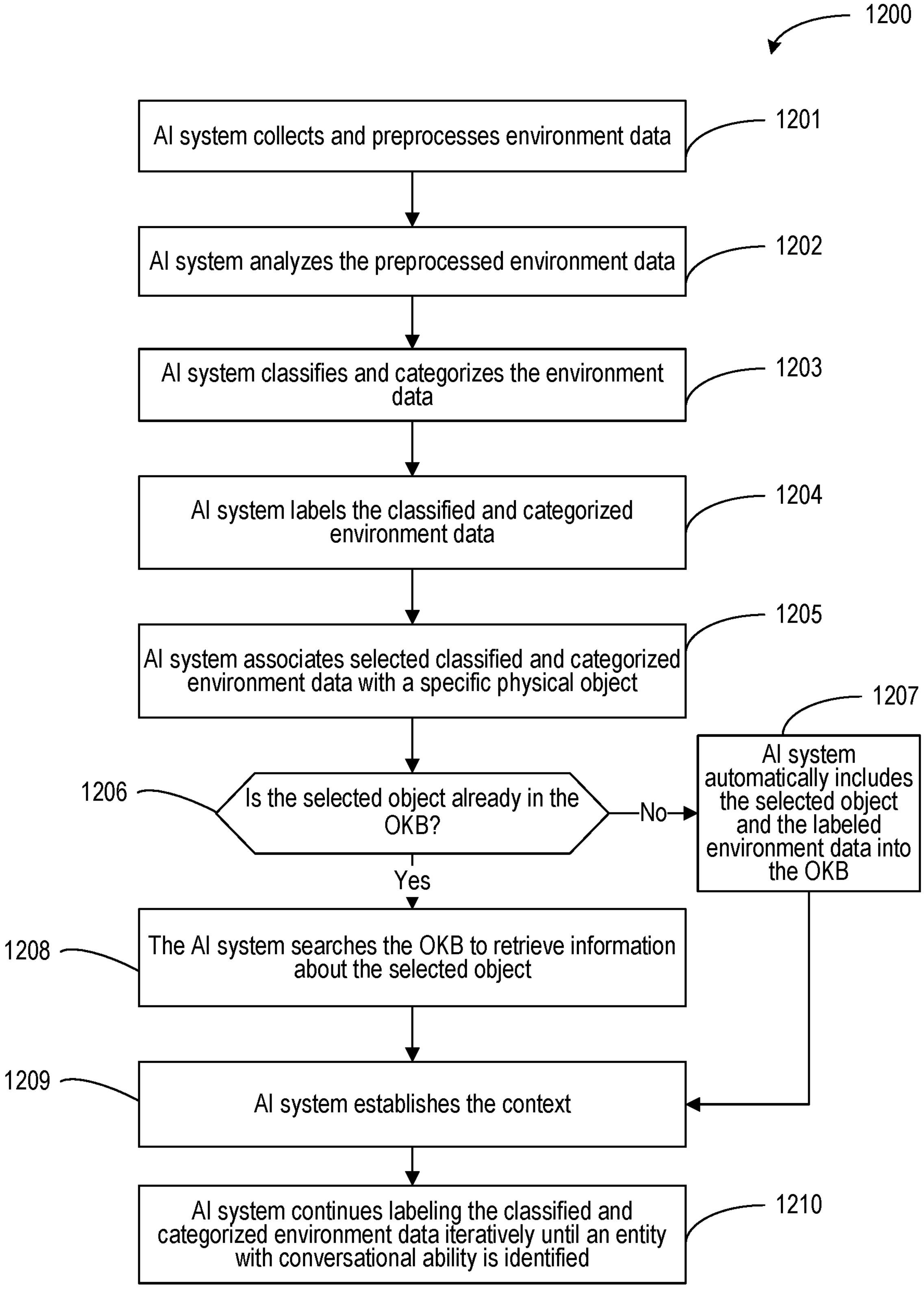
FIG. 12 depicts a flow chart illustrating a process for preprocessing, classifying, categorizing, and labeling environment data.

FIG. 12 illustrates a process for preprocessing, classifying, categorizing, and labeling environment data of physical objects in the environment, with the goal of creating an understanding of context for user-centered and contextually relevant conversational interaction 1200.

In the context of AI systems, recognizing and understanding physical objects and entities in the environment is important for generating contextually relevant interactions and responses. By identifying these objects and entities, the AI system can make informed decisions, provide meaningful recommendations, and offer personalized experiences based on the user's surroundings and interaction with the environment.

Referring to FIG. 12, the first step includes collecting and preprocessing environment data of the physical objects in the environment 1201. Preprocessing is an important step in data analysis that involves preparing raw data for further analysis. The environment data may come from various sources and can be in different formats. Preprocessing may include several steps such as cleaning, filtering, or transforming the data to make it suitable for further analysis. Cleaning involves removing or correcting inaccurate or incomplete environment data, removing duplicate records, and dealing with missing values. Filtering is the process of selecting relevant environment based on certain criteria such as time range, location, or other parameters. Transforming can involve converting environment from one format to another or scaling the environment to make it comparable or compatible with other data sets.

After the environment data has been preprocessed, the AI system proceeds to analyze the data 1202. This may involve classifying and categorizing the environment data into different categories based on their characteristics 1203, such as object types or attributes. The data can also be grouped together based on these characteristics for further analysis. This step is essential in order to make sense of the data and gain insights that can be used to inform decision-making or improve system performance. By categorizing and grouping the data, the AI system can identify patterns and relationships that may not have been immediately apparent otherwise.

After the environment data has been classified and categorized, each data point is assigned a label that describes what it represents 1204. For example, if the environment data is about a room, the labels might describe the temperature, humidity, lighting conditions, and other features of the room.

By assigning these labels to the data, it becomes easier to analyze and interpret the information, as well as to make predictions or take actions based on the data. This step is important in order to extract meaningful information from the environment data, and to use it effectively in an AI system. These labels also help identify and distinguish individual data points and their associated objects.

After the preprocessed environment data is classified, categorized, and labeled, the AI system proceeds to associate the selected labeled environment data with a specific physical object 1205. This process involves identifying which physical object the labeled environment data represents and establishing a relationship between the data and the object.

For example, if the labeled environment data pertains to the temperature, humidity, and light levels of a particular room in a building, the AI system would identify that room as the physical object and establish a relationship between the labeled data and that room. This relationship can be used to track and analyze environmental conditions for the specific physical object over time.

After associating the labeled environment data with the selected physical object, the AI system determines whether the selected physical object is already present in the OKB 1206. This step helps to avoid duplicating information in the knowledge base, and instead updates the existing information related to the object. If the selected physical object already exists in the knowledge base, the AI system retrieves the relevant information associated with the object from the knowledge base 1208. If the selected physical object is not already present in the knowledge base, the AI system creates a new entry for the object and adds the associated labeled environment data 1207. By checking the presence of the object in the knowledge base, the AI system ensures that the information in the knowledge base is up-to-date and accurate.

In the event that the selected physical object is present in the OKB, the AI system proceeds to retrieve information about the object from the OKB 1208. This information is then utilized to provide context to the physical object in its environment. The information gathered from the OKB is then used to create a user-centered and contextually relevant conversational interaction 1209. This process helps establish a clear and accurate understanding of the context, which can aid in making informed decisions in subsequent processes.

Establishing the context involves collecting and analyzing information to gain a better understanding of the situation or problem at hand. In the context of an AI system, this can involve gathering and preprocessing relevant data, using techniques such as natural language processing (NLP), computer vision, or sensor data analysis to extract relevant information and classify it into meaningful categories.

Finally, The AI system continues to label the classified and categorized environment data iteratively until identifying an entity with conversational capability 1210. This iterative process ensures the recognition and processing of all relevant entities, providing a comprehensive understanding of the context and supporting meaningful conversational interaction.

In an embodiment, the AI system performs a conditional selection process to associate a selected classified and categorized environment data with a selected object. The rules engine and the ML engine are used in a conditional selection process to associate a selected classified and categorized environment data with a selected object. The rules are predefined sets of conditions and actions that the AI system uses to determine how to handle a specific scenario. On the other hand, the ML engine are trained to recognize patterns in data and make predictions based on those patterns.

However, if the AI system cannot associate the data with a specific object using predefined rules, it will use the ML engine to make predictions based on patterns in the data. The ML engine may use data from the object's KB, such as objects' attributes, relationships, and interaction history, to make a more accurate prediction.

FIG. 13 illustrates a process of conditional selection that involves utilizing rules and the ML engine to associate selected classified and categorized environment data with a selected object 1300.

The described process involves collecting, classifying, and categorizing environment data, such as temperature, humidity, or location, to be used in the selection process 1301. A set of predefined rules is then applied to filter and select the most relevant objects based on the classified and categorized environment data 1302.

To refine the selection process further, ML algorithms are utilized 1303. After the rule-based filtering and ML algorithms, the most relevant objects based on the environment data are output 1304. The selected object is then linked with the classified and categorized environment data to enable more contextually relevant and personalized interaction with the object 1305.

Finally, the associated environment data and objects are utilized to provide contextually relevant and personalized interaction 1306. This enables the AI system to understand and respond to the user's needs more accurately, enhancing the user's overall experience.

The conditional selection process involves using a set of rules to filter and select the most relevant objects based on the classified and categorized environment data. The rules may be based on various factors, such as the type of environment data being analyzed, the characteristics of the objects in the environment, or the relationships between the environment data and the objects. For example, if the environment data relates to temperature, the process may select those objects that are known to be affected by temperature changes, such as thermostats, refrigerators, or temperature sensors. This ensures that the environment data is associated with the most relevant objects in the environment, which can help to provide contextually relevant and personalized interaction.

The process of selecting predefined rules for filtering and selecting the most relevant object can be done in several ways. One way is to define rules based on prior knowledge and expertise in the relevant domain. Another way is to use ML algorithms to learn from the data and identify patterns and relationships between the environment data and the objects. In the ML algorithms approach, the AI system is trained on a labeled dataset of environment data and objects to learn the relationships between them, and the learned patterns can be used as rules for filtering and selecting the most relevant objects.

In addition to using rules, the conditional selection process also utilizes ML algorithms to further refine the selection process. ML algorithms can be trained on large amounts of data to identify patterns and associations that are difficult for humans to detect. By using ML algorithms in conjunction with the rule-based approach, the AI system can make more accurate and contextually relevant associations between the environment data and objects.

Once the conditional selection process is complete, the selected object is associated with the classified and categorized environment data. This allows the AI system to provide more contextually relevant and personalized interaction with the object based on the environment data. For example, if the object is a smart thermostat, the AI system can use the environment data to adjust the temperature settings automatically based on the user's preferences and the current environment conditions.

Referring to FIG. 10, the AI system can receive environment data from external sources, such as weather APIs, to further enhance its understanding of the environment. The environment data is then processed and analyzed by the AI system using various algorithms and techniques, including a computer vision system and ML algorithms.

When the AI system receives environment data, it first classifies and categorizes the physical objects based on their characteristics and attributes, such as size, shape, color, and texture. The AI system can also use sensors and other smart devices to detect contextual information about the objects, such as their location, names, and relative positions.

Then, it uses rules defined by the rules engine and ML to determine which physical object in the environment the data is associated with the labeled environment data. The AI system may use predefined rules, such as if a specific sensor detects a certain level of light, it is associated with a particular object.

In one embodiment, the first step in the process is to collect data from various sensors and sources in the environment. This data may include information about the physical objects, the location and orientation of physical objects, as well as temperature and humidity readings in the environment.

Once the data has been collected, it is preprocessed to remove any noise or irrelevant information. This may involve filtering the data or removing outliers. The preprocessed data is then classified and categorized based on its features and characteristics. For example, data from a temperature sensor may be classified as "hot," "warm," or "cold."

The classified and categorized environment data is then labeled to provide additional context and meaning. This may involve assigning descriptive labels to the environment data, such as "indoor" or "outdoor," or assigning numerical values to represent the intensity or magnitude of the environment data. The labeled data can then be used to train ML models or to provide context for conversational AI agents that interact with the user in the environment. An example of labeled data in the context of the AI system described could be a set of images of different objects in a home environment, each labeled with their corresponding object category (e.g., lamp, sofa, table, etc.) and attributes (e.g., color, material, size, etc.). This labeled data could be used to train the computer vision system and object recognition algorithms to more efficiently and effectively detect and classify objects in similar environments.

Data Labeling can involve both human annotators and the AI system. If there is no human annotator available, one way the AI can label data in real-time is by using unsupervised learning techniques such as clustering or dimensionality reduction. These techniques can identify patterns and relationships in the data without the need for explicit labels. The AI can then use this information to assign labels to the data based on the discovered patterns. Another method is the use of reinforcement learning, where the AI is trained through a process of trial and error and is rewarded for making correct decisions. Over time, the AI can learn to label the data accurately based on the feedback it receives. Another method is using pre-trained models, such as language models, to generate labels based on the data's similarity to previously seen examples. Additionally, the AI can also use active learning, where it selects samples from the dataset and requests a human annotator to label these samples, and then trains on the newly labeled data. This process can continue until the AI system reaches a desired level of accuracy in labeling the data.

For example, when processing an image, the AI system can use object recognition algorithms to identify the objects in the image and categorize them accordingly. The AI system can also use image processing techniques to extract features such as color, texture, and shape to further categorize the image. Similarly, when processing an audio recording, the AI system can use speech recognition to transcribe the audio into text and analyze the language used to determine the context and categorize the data. The AI system can also use ML algorithms to continually learn and improve its ability to categorize and label different types of data.

The AI system employs diverse techniques like computer vision, natural language processing, and audio recognition for data analysis and categorization. The AI system is also designed to accommodate various data types, including images, videos, audio recordings, and text.

For example, when processing an image, the AI system can use object recognition algorithms to identify the objects in the image and categorize them accordingly. The AI system can also use image processing techniques to extract features such as color, texture, and shape to further categorize the image. Similarly, when processing an audio recording, the AI system can use speech recognition to transcribe the audio into text and analyze the language used to determine the context and categorize the data. The AI system can also use ML algorithms to continually learn and improve its ability to categorize and label different types of data.

During the reception of environment data and conversational interaction, both human users and AI contribute data. A method can be implemented to assign unique identifiers to each contributor, either by requiring users to log in with their accounts or by assigning unique codes to AI modules. The AI system can then trace the data source and link it to the respective contributor. This information, stored in the OKB, can enhance the AI system's accuracy in understanding the data and its context. Moreover, identifying contributors can help maintain privacy and security by ensuring that only authorized users can access and modify the data.

In one embodiment, a style code scheme and AI conversational style identification process are disclosed. Machine-readable style codes are generated for each machine-generated response, which may include images, videos, texts, or audios. These style codes can be used as predictors to determine if the outputs or inputs are generated by the AI application. There are various use cases, such as an AI agent and a human co-authoring an artifact (e.g., photograph, painting, copywriting, formulation, etc.). The AI system automatically produces a trace of the co-authoring activities, documenting each step and labeling it with unique identifiers. These style codes can be retrieved as evidence of copyrights.

Referring to FIG. 10, the AI system needs to identify an entity with conversational capability before interacting with it to ensure a smooth and coherent interaction. By identifying an entity with conversational capability, the AI system can determine if the entity can understand and respond to the conversational AI agent's requests or questions. This is important because if the entity does not have conversational capability, the interaction may not be productive or even understandable.

Identifying an entity with conversational capability allows the AI system to tailor its responses and actions to accommodate the specific entity's capabilities and limitations, ensuring a productive and relevant interaction that caters to the user's needs.

Initially, the AI system employs NLP methods to detect entities with conversational capability utilizing AI applications, such as chatbots, virtual assistants, or other conversational AI agents. The AI system then performs a capability validation check to assess the entity's aptitude for conversing with conversational AI agents. This process may involve attempting to engage in conversation with the entity and evaluating factors like language skills, OKB, response time, and accuracy.

After validating the entity's conversational capability, the AI system initiates an interaction with the entity, either through a predefined script or a more open-ended conversation. The AI system continues to monitor the entity's preferences throughout the interaction and adjusts to ensure a seamless and effective user experience.

Figure 14:
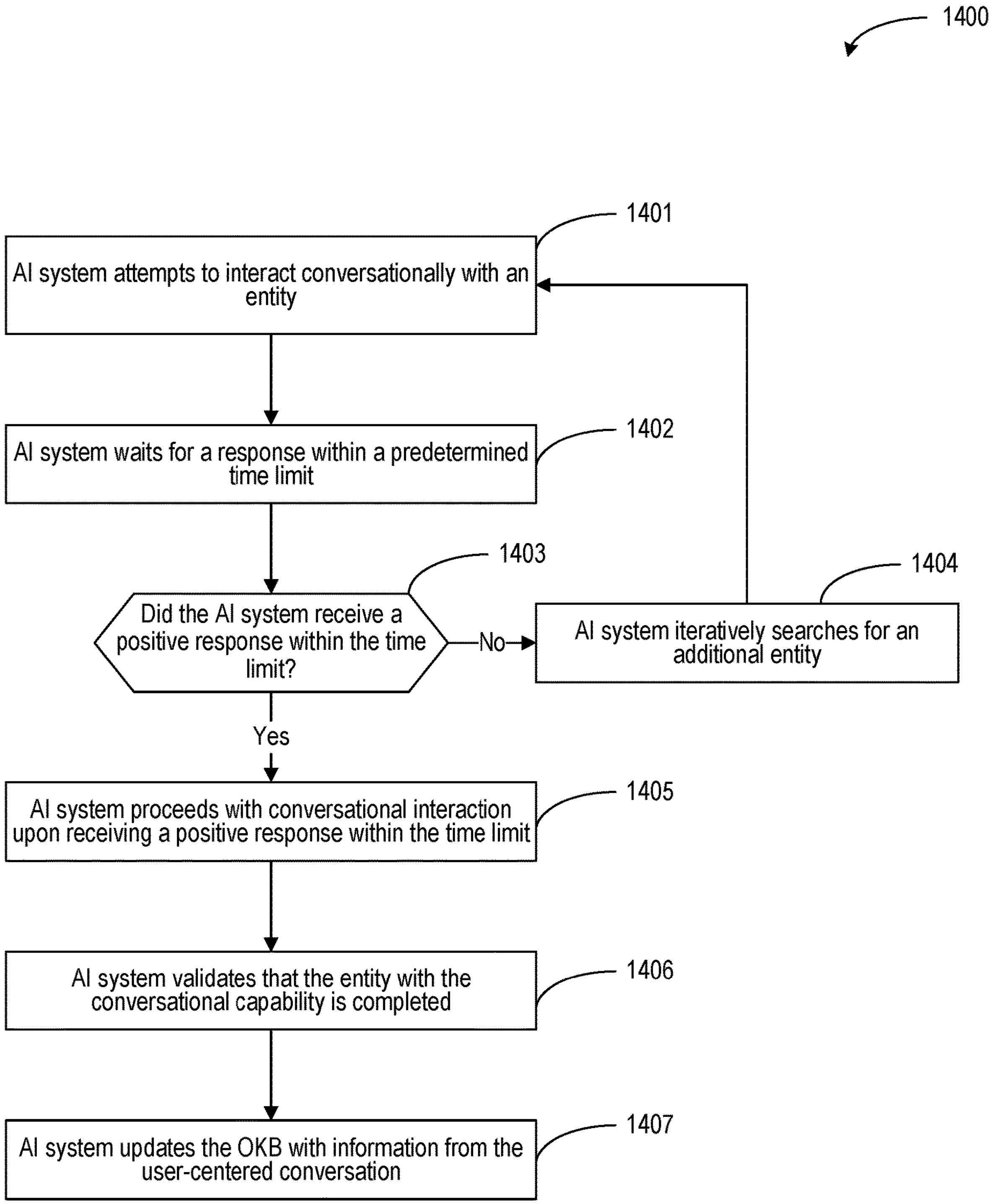
FIG. 14 depicts a flow chart illustrating a process of identifying and validating an entity with conversational capability.

FIG. 14 is a flow chart illustrating the process of identifying and validating an entity with conversational capability 1400. First, the AI system attempts to interact conversationally with a selected entity to establish a connection 1401. The AI system waits for a response for a limited period to give the entity enough time to respond without excessive waiting times 1402.

The waiting time strategy is implemented to allow the AI system to perform an active listening action. The AI system does not interrupt while the user is talking or thinking, and the AI system can pause for a certain period of time to respond to the user to mimic the thinking and reflection process after the user finishes talking. The AI system determines whether a positive response is received within the limited time 1403.

If the selected entity provides a positive response within the limited time, the AI system proceeds with the conversational interaction to confirm the entity's conversational capability and the user or recipient's identity 1405. This step further validates the entity's identity using the OKB and external resources and solidifies the connection for continued interaction. If no response is detected within the time limit, the AI system iteratively searches for another entity with conversational capability, ensuring a suitable conversational partner is found 1404. After the validation of the entity with the conversational capability has completed 1406, the AI system then updates the OKB with the information generated from the user-centered conversational interaction, maintaining accuracy and relevance 1407.

The process of identifying and validating an entity with conversational capability is important for the AI system to engage in meaningful and effective conversations, providing contextually relevant and personalized responses. Analyzing the entity's profile and previous interactions helps determine its preferences and needs.

Once the entity with conversational capability is validated, a user-centered conversational approach is applied to interact with the recipient.

In a healthcare setting, the process of selecting and identifying an entity with conversational capability involves several steps: (1) Data collection: The AI system collects data from the environment using various sensors, cameras, or other data sources. This may include visual, auditory, or contextual data about the entities present in the environment, such as patients, healthcare professionals, and even medical devices. (2) Environment contextual analysis: The AI system analyzes the collected data to understand the context of the environment, including the presence of various objects and their attributes. This helps the AI system identify potential entities with conversational capabilities, such as humans or smart devices with built-in conversational features. (3) Entity selection: Based on the contextual analysis, the AI system selects a candidate entity that is likely to possess conversational capability. In a healthcare setting, this could be a patient, doctor, nurse, or even a smart medical device with a chatbot or virtual assistant. (4) Validation of conversational capability: To validate if the selected entity has conversational capability, the AI system initiates an interaction attempt. This could involve sending a text or voice message, or even a visual signal, depending on the entity's communication modality. (5) Assessing the response: The AI system waits for a response from the selected entity within a limited period of time. If a positive response indicating conversational capability is received, the AI system proceeds with further interaction to establish the user's identity and their role in the healthcare setting. (6) Iterative search: If no response is received within the time limit, the AI system iteratively searches for another entity with potential conversational capability in the environment, repeating the validation process until a suitable conversational partner is found. (7) Updating OKB: As the AI system interacts with entities and gathers information from successful interactions, it updates its OKB to maintain accuracy and relevance, allowing it to understand the context and preferences of future interactions.

Figure 15:
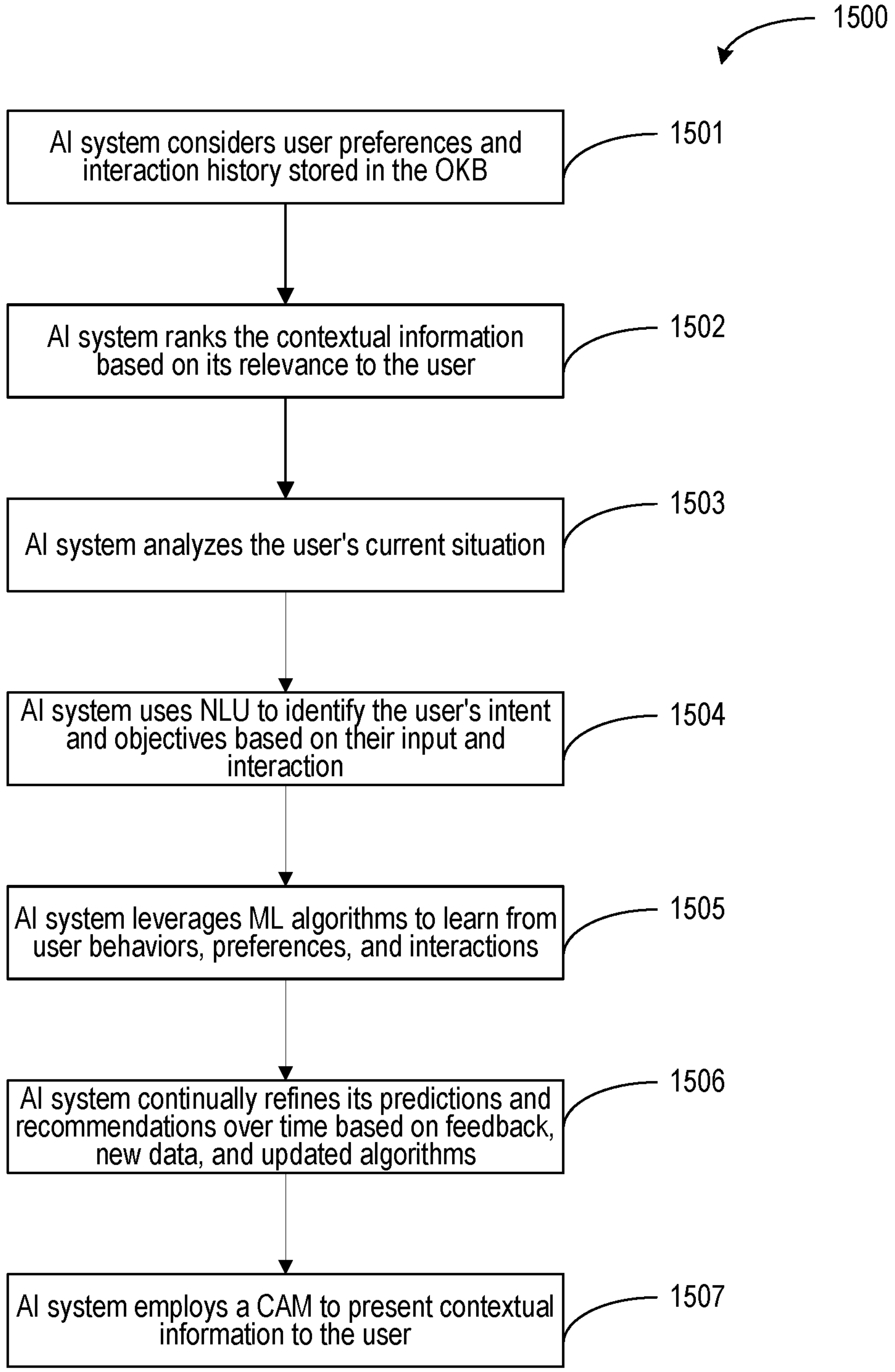
FIG. 15 depicts a flow chart illustrating a process for analyzing and predicting the most relevant contextual information.

Once the AI system has generated an understanding of contextual information in the environment, it predicts the most relevant contextual information for the user through a series of steps illustrated in FIG. 15.

FIG. 15 depicts a flow chart illustrating a process for analyzing and predicting the most relevant contextual information 1500.

The AI system employs a series of steps to predict the most relevant contextual information for the user. Initially, the AI system considers the user's preferences, interaction history, and previous interaction stored in the OKB to tailor the predicted contextual information to the user's needs and interests 1501. The AI system then ranks the contextual information based on its relevance to the user, taking into account factors such as urgency, importance, and the user's current situation 1502.

The AI system also analyzes the user's current situation, such as their location, activities, and the presence of other people or objects in the environment, to predict contextual information that would be most useful and relevant to the user 1503. Moreover, the AI system uses NLU to identify the user's intent and objectives based on their input and interaction, helping to predict the contextual information that aligns with the user's goals 1504.

To become more personalized and accurate, the AI system leverages ML algorithms to learn from the user's behaviors, preferences, and interactions 1505, refining its predictions and recommendations over time 1506. Finally, the AI system employs a context-aware model (CAM) to make decisions about which contextual information to present to the user, considering the user's current context, needs, and preferences 1507.

The CAM is designed to analyze the contextual information collected from various sensors and smart devices and create a model that reflects the relationships among the objects in the environment: (1) The CAM uses the preprocessed data to create a contextual-aware model of the environment. This model includes a representation of objects in the environment and their spatial relationships, which is continuously updated as new data is received. (2) The CAM model considers various contextual factors, such as location, temperature, and object attributes, to predict the most likely object in a given context. The CAM model is trained using a large dataset of labeled environment data and uses deep learning techniques to automatically learn the complex relationships among the contextual features and physical objects. (3) The CAM model is continuously updated based on new environment data and feedback from user interaction, allowing it to adapt and improve over time. By incorporating contextual information into object recognition, the CM model enhances the accuracy and reliability of the AI system's predictions and enables more contextually relevant and personalized user experiences.

The prediction of relevant contextual information is an ongoing process that involves constantly updating and refining the AI system's understanding of the user's preferences, behavior, and interaction with the environment.

If there are no user preferences and interaction history available, the AI system can still predict the most relevant contextual information for the user by using the following approaches: (1) Default assumptions: The AI system can rely on default assumptions or general user profiles to provide contextual information that is likely to be relevant to a broad range of users. (2) Contextual analysis: By analyzing the current environment and situation, the AI system can identify contextual information that is relevant to the user's immediate context, even without knowledge of their preferences or interaction history. (3) Real-time user input: The AI system can use real-time user input and interaction to understand the user's immediate needs and intents, allowing it to adapt and provide relevant contextual information accordingly. (4) Collaborative filtering: The AI system can leverage collaborative filtering techniques to recommend contextual information based on the preferences and behaviors of similar users, even if it does not have explicit information about the current user's preferences. (5) Content-based filtering: The AI system can analyze the content of available contextual information and recommend items based on their similarity to other items the user has interacted with, even without explicit preference data. (6) Active learning: The AI system can actively ask questions or solicit feedback from the user to gather more information about their preferences and needs, allowing it to provide more relevant contextual information as the interaction progresses.

Some examples of default assumptions or general patterns that the AI system can rely on to provide contextually relevant interaction if there are no user preferences or interaction history available in the OKB: (1) Demographic assumptions: The AI system can make assumptions based on general demographic information, such as age, gender, or cultural background, to predict user preferences and needs. (2) Environmental conditions: The AI system can use current environmental conditions to make informed decisions. For instance, if the temperature in a healthcare setting is unusually high, the AI system could assume that users would prefer a cooler environment and adjust the thermostat accordingly. (3) Common needs in healthcare settings: The AI system can assume that users in healthcare settings share common needs, such as privacy, comfort, and access to information about their health. Based on these assumptions, the AI system can prioritize actions that address these common needs. (4) Time-based assumptions: The AI system can make assumptions based on the time of day or day of the week. For example, it might assume that users would be more likely to require assistance or information during regular business hours. (5) Role-based assumptions: In a healthcare setting, the AI system can assume that different user roles have different needs and preferences. For example, it might assume that a doctor needs access to patient records and diagnostic tools, while a patient may require information about their treatment plan and recovery. (6) General patterns from similar users: The AI system can use data from similar users to make assumptions about an individual's preferences and needs. For example, if a majority of patients in a particular age group have shown a preference for a certain type of interaction or information, the AI system can assume that a new user from the same age group would have similar preferences.

Continuous refinement of the AI system's predictions and recommendations is important for ensuring that the AI system remains effective and relevant over time. This is achieved by leveraging ML algorithms to learn from user feedback, preferences, and interactions, and adjusting its predictions and recommendations accordingly. For example, if an AI system makes a recommendation that the user doesn't follow, the system can learn from this feedback and adjust its recommendations in the future to better meet the user's needs. Additionally, as more data becomes available, the system can use that data to refine its algorithms and improve its predictions. Additionally, the system can use new data to refine its algorithms and improve its predictions, ensuring that it continuously provides personalized and accurate recommendations to users.

In some embodiments, the AI system uses an environment context analysis and prediction (ECAP) model, a context matching (CM) method, and a context-aware model (CAM), which are three interconnected components that work together to analyze, detect, and predict the most relevant information in the environment for an identified user with conversational capability.

The ECAP model is responsible for analyzing the data collected from the environment, which includes information about objects, their attributes, and relationships. This model uses various techniques such as ML, computer vision, and sensor data processing to identify and classify objects, as well as to understand the context of the environment.

The ECAP model works by first preprocessing the data to remove noise and irrelevant information. The remaining data is then classified and categorized into relevant groups, such as object types, locations, and attributes. The ECAP model then uses this data to generate a contextual model of the environment, which is continuously updated based on new data. Once the contextual model is generated, the ECAP model uses it to predict the most likely context based on available data. This can include predictions about object locations, attributes, and behaviors, as well as environment conditions such as temperature and lighting. The algorithm is also able to detect anomalies or unexpected events in the environment, which can trigger alerts or responses from the AI system.

Once the ECAP model has analyzed the environment and generated a contextual understanding, the CM method is applied to find the most relevant objects and context for the identified user with conversational capability. This process involves filtering and selecting objects based on rules and ML algorithms, allowing the AI system to create associations between the environment data and the objects that are most relevant to the user's context. In the CM method, context can include various factors like user preferences, location, time, user interaction history, or any other information that can help in understanding the user's intent or the situation accurately.

In an approach for the Contextual Matching (CM) method involves several steps. First, contextual information is extracted by collecting and processing relevant data or content from the input or query. Next, the extracted contextual information is represented in a structured format, typically as feature vectors, for easy comparison and matching. Then, the similarity or relevance between the input or query and available data or content is calculated based on the contextual information, using various similarity measures or algorithms such as cosine similarity or Jaccard similarity. Finally, the results are ranked based on their similarity scores, and the most relevant or contextually appropriate result is selected.

The CAM is responsible for predicting the most relevant contextual information for the identified user with conversational capability. By integrating the output from the ECAP model and the CM method, the CAM can determine the most important context for the user based on their preferences, interaction history, and current environment conditions. If no user interaction history or preferences are available, the CAM may rely on general patterns and common behaviors to make predictions.

FIG. 16 depicts how the ECAP model, CM method, and CAM work together to enable the AI system to analyze the environment in a contextual-aware manner 1600. At the beginning of the process, the AI system collects data about the environment through various sensors and smart devices 1601. The collected data is then preprocessed to remove noise and irrelevant information 1602. Next, the preprocessed data is classified and categorized based on various factors such as object type, location, and temperature 1603. This step helps to organize the data and makes it easier to analyze.

The labeled data is then fed into the ECAP model, which uses ML algorithms to analyze the data and identify patterns and trends in the environment 1604. Once the contextual information is obtained, the CM method is employed 1605. This method compares the user's context with existing contextual data stored in the OKB, identifying relevant patterns and connections among physical objects or entities. By doing this, the method can recognize similar situations from the past and predict potential user needs or preferences.

Finally, the CAM leverages insights from the environment contextual analysis model and context matching method to generate contextually relevant and personalized responses for the user 1606. The model adapts the AI system's behavior, responses, and recommendations according to the user's context, ensuring meaningful and appropriate interaction.

In a healthcare setting, the ECAP model, CM method, and CAM work together to provide contextually relevant and personalized patient experiences.

First, the ECAP model collects and analyzes data from various sources, such as electronic health records, IoT devices like wearable health monitors, patient input, and information from healthcare professionals. This model helps understand the patient's context, which includes factors like medical history, symptoms, lifestyle habits, and interaction with healthcare providers.

Next, the CM method compares the patient's context with existing contextual data stored in the AI system, identifying relevant patterns and connections. By doing this, the method can recognize similarities with previous cases, predict potential patient needs, and recommend appropriate interventions or treatments.

Finally, the CAM leverages the insights from the ECAP model and CM method to generate contextually relevant and personalized experiences for the patient. The model adapts the AI system's behavior, responses, and recommendations according to the patient's context, ensuring meaningful and appropriate interaction.

In another embodiment within the healthcare setting, the ECAP model and CAM model can be used to analyze the environment and detect physical objects such as medical equipment, patients, and healthcare professionals.

The AI system can use a computer vision system and sensors to detect the location and movement of objects and people, as well as collect data such as temperature and humidity.

The ECAP model can then be used to analyze this data and predict patterns and trends, such as the busiest times of the day or areas with the highest risk of infection. The CAM can then consider factors such as patient needs, staff availability, and equipment availability to provide contextually relevant and personalized recommendations to healthcare professionals.

For example, if the AI system detects a patient in need of urgent medical attention, the CAM can use the environment data to determine the most appropriate healthcare professional to attend to the patient based on their location and availability. Additionally, the AI system can provide personalized recommendations to healthcare professionals based on the patient's medical history, current symptoms, and other contextual information. These components work together to provide a comprehensive understanding of the patient's healthcare context, allowing the AI system to deliver tailored and contextually relevant experiences in real-time. This can result in enhanced patient outcomes, optimized utilization of healthcare resources, and increased overall patient satisfaction.

Referring to FIG. 10, transforming the relevant contextual information into a textual form enables the AI system to generate intelligent responses using natural language.

This is important because textual form is a standard format that allows for consistency and uniformity in representing contextual information, making it easier to compare and match different pieces of information. Additionally, the textual form makes information more accessible and understandable for humans who are interacting with the AI system.

Additionally, having a uniform data format makes it easier for the AI system to process training and labeling data, which can help improve the accuracy of the AI system over time. For instance, textual form is easy for machines to read and interpret, breaking down the information into a textual form makes it easier for the AI system to analyze and produce accurate results. Since text is a format that can be easily understood and processed by AI algorithms, it is simpler for the AI system to process and analyze contextual information, enabling it to extract meaningful insights and make accurate predictions.

Moreover, the textual form is compatible with various algorithms, techniques, and tools used in natural language processing, ML, and data analytics, allowing the AI system to leverage these tools to gain more insights from contextual information. The textual form also can be easily modified and adapted to changing requirements, enabling the AI system to adjust its contextual analysis and prediction models as needed. Finally, the textual form is easily readable by humans, making it easier for users to understand and interact with the contextual information presented by the AI system. This can lead to increased user engagement and satisfaction with the AI system's recommendations and actions.

In several embodiments, the AI system can use both textual and non-textual forms of information to facilitate contextual conversations.

Figure 17:
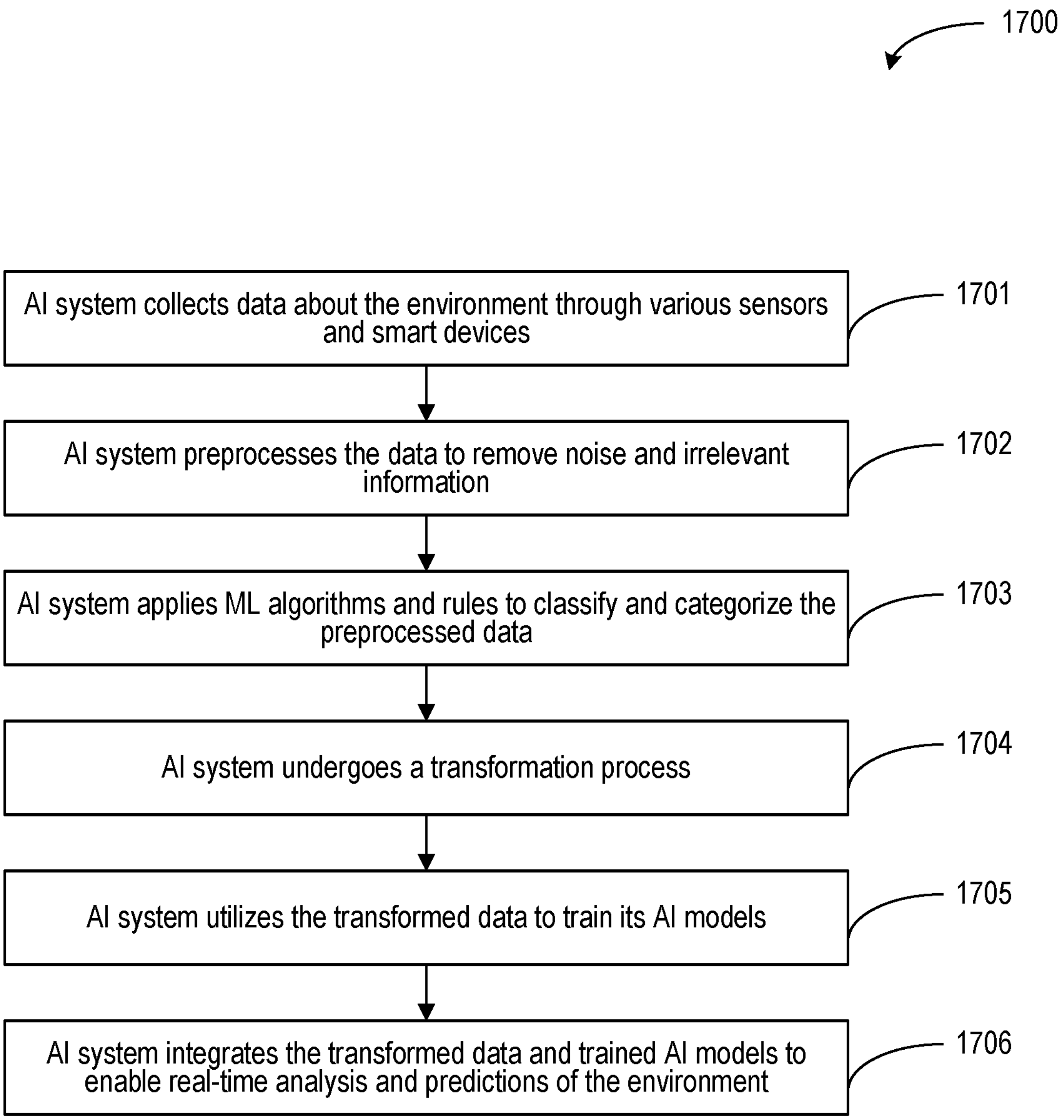
FIG. 17 depicts a flow chart illustrating a transformation process.

FIG. 17 depicts an embodiment describing how the AI system transforms environment data and contextual information from non-textual form into textual form 1700.

At the beginning of the process, the AI system collects data about the environment through various sensors and smart devices 1701. This data is typically in a non-textual format, such as numerical data, images, or audio recordings. The AI system then preprocesses the data to remove noise and irrelevant information 1702. The preprocessed data is then classified and categorized using ML algorithms and rules 1703. This step involves analyzing the data and assigning appropriate labels and categories based on the features and attributes of the data. After the data is classified and categorized, it undergoes a transformation process where it is converted into a textual form that can be easily processed by the AI system 1704. This includes converting the data into a standardized format and normalizing the data in data values. The transformation process utilizes various techniques such as natural language generation, optical character recognition, or speech-to-text conversion.

The transformed data is then used to train the AI models used by the AI system 1705. This step involves using the data to identify patterns and relationships between different variables in the environment. These patterns and relationships are then used to develop models that can predict future trends and behaviors in the environment. Finally, the transformed data and the trained AI models are integrated into the AI system to provide real-time analysis and predictions of the environment 1706. This allows the AI system to detect changes and respond accordingly, providing a seamless and integrated user experience.

The AI system can use both non-textual and textual forms of data to facilitate contextual conversations. Transforming the relevant contextual information into a textual form provides several benefits. First, it makes information more accessible and understandable for humans who are interacting with the AI system. This is important because natural language is the most intuitive form of communication for humans, and text is the most widely used form of natural language.

Second, having a uniform data format makes it easier for the AI system to process training and labeling data, which can help improve the accuracy of the AI system over time. By converting non-textual data into textual form, the AI system can analyze the data more efficiently and accurately, since text is a format that can be easily understood and processed by AI algorithms.

Finally, breaking down the information into a textual form makes it easier for the AI system to generate intelligent responses using natural language, which is important for user-centered contextual relevant conversational interaction. The AI system leverages insights from the environment contextual analysis model and context matching method to generate contextually relevant and personalized responses for the user. By using textual form, the AI system can produce accurate results, since text is a format that can be easily understood and processed by AI algorithms.

In an embodiment of the AI system, the environment data is converted from a textual form into a non-textual form such as images or videos. This conversion provides a more visual representation of the information, making it easier for the user to quickly understand the information presented. For example, an image of a person's face can convey much more information about their emotional state or physical characteristics than a textual description could. Non-textual forms of data can also be more easily shared and analyzed across different platforms and systems, allowing greater interoperability and collaboration.

The use of non-textual forms in human-AI conversational interaction has several benefits. For one, it can provide greater clarity and conciseness in conveying complex or multiple ideas. As the adage goes, "a picture is worth a thousand words", meaning that a single still image can convey its meaning or essence more effectively than a mere verbal description. Moreover, non-textual forms of data can help to overcome language barriers or other communication obstacles, making it easier for the user and AI system to communicate effectively. Finally, non-textual forms of data can also be more engaging and interactive, increasing the user's interest and participation in the conversation.

The goal of transformation is to ensure effective and efficient communication to avoid ambiguity and confusion in the conversations between the user and the conversational AI agent. By integrating both types of information, the AI system can more effectively comprehend the user's intent and deliver pertinent and precise responses. Additionally, using non-textual forms of information, such as images or videos, can provide more clarity and precision in communication, as visual aids can often convey information more quickly and effectively than written or spoken language alone.

In the context of an AI system that is designed to engage in conversational interactions with a user, the system needs to understand the user's intent and objective based on their input and contextual information. This is important to provide accurate and relevant responses to the user. Referring to FIG. 11, the AI application transmits interaction data to the AI system, which then receives and analyzes the data to determine the most relevant intent and objective. The process by which the AI system determines and validates the most relevant intent and objective based on the user's input and available contextual information.

Figure 18:
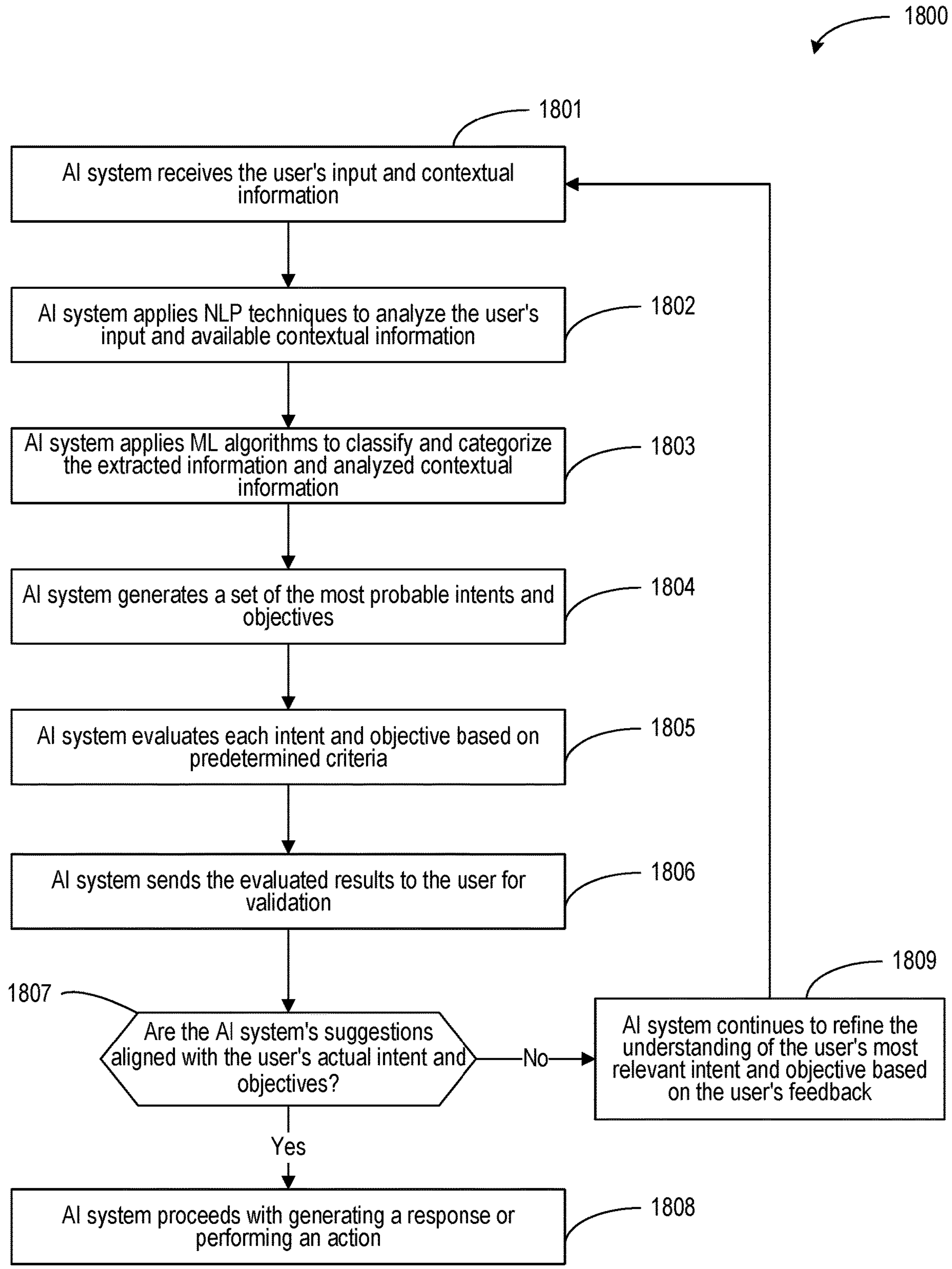
FIG. 18 depicts a flow chart illustrating a process of identifying and confirming the most relevant intent and objective from the user's input and contextual information.

FIG. 18 is a flow chart that shows the process of identifying and confirming the most relevant intent and objective from the user's input and contextual information 1800.

The process starts by receiving the user's input and contextual information 1801, such as the user's location, activity, or previous interaction history. User's input can be in the form of voice commands, text input, or gesture recognition.

The AI system then applies natural language processing (NLP) techniques to analyze the user's input, such as keywords or phrases that indicate the user's intent or objective, and analyzes the available contextual information 1802, such as the user's location, time of day, and relevant object attributes stored in the OKB.

The extracted information and analyzed contextual information are then classified and categorized using ML algorithms 1803, to generate a set of most likely intents and objectives 1804. The AI system then evaluates each generated intent and objective based on a set of predetermined criteria 1805, such as how well it aligns with the available contextual information and how likely it is to achieve the user's goal in the environment.

Once the AI system has evaluated each potential intent and objective, the evaluated results are sent to the AI application, which presents the most likely options to the user for validation 1806. The user can then confirm whether the AI system's suggestions align with their actual intent and objective 1807. If the user confirms the AI system's suggestions are correct, the AI system proceeds with generating a response or performing an action 1808. If the user indicates the AI system's suggestions are incorrect, the AI system continues to refine its understanding of the user's most relevant intent and objective based on the user's feedback 1809, and the process starts again until a satisfactory outcome is achieved.

The identification of the most relevant intent and objective is important for the AI system to offer a precise and effective response to the user. This approach aids in avoiding ambiguity and misinterpretation that could occur if the AI system tries to handle several intents and objectives concurrently. By focusing on and addressing the most relevant intent and objective one at a time, the AI system can enhance the user experience and boost the efficiency of the conversation. This approach also enables the AI system to provide more personalized and relevant recommendations or assistance to the user based on their current needs and preferences.

Furthermore, determining if the most relevant intent and objective predicted by AI are harmful requires incorporating ethical considerations into AI systems. This can involve developing guidelines and frameworks for ethical AI, such as those focused on fairness, transparency, and accountability. Additionally, incorporating human experts into the development and testing of AI systems can provide valuable insights into potential harms and unintended consequences.

One approach to ensuring that the most relevant intent and objective predicted by AI do not harm is to incorporate fairness considerations into the AI system. This involves developing algorithms and models that account for biases and avoid perpetuating discrimination or marginalization.

Another approach is to ensure that the decision-making process of AI systems is transparent and explainable, allowing greater accountability and oversight.

In addition, incorporating privacy considerations is also important in ensuring that the most relevant intent and objective predicted by AI do not harm. This can involve implementing privacy-preserving techniques such as differential privacy or homomorphic encryption to protect sensitive user information. Additionally, developing secure deployment methods and implementing multi-party computation techniques can further enhance the privacy and security of AI systems.

In one embodiment, the AI system uses the NLP engine to analyze the user's input and predict the most relevant intent and objective based on OKB. The OKB can contain predefined intents and objectives as well as user interaction and feedback that inform the AI system's predictions.

The AI system evaluates the user's input against the existing intents and objectives in the OKB and assigns a confidence score to each potential intent and objective. This confidence score represents the AI system's level of certainty that a particular intent or objective is the most relevant one for the user's input.

The confidence score is typically represented as a numerical value between 0 and 1, with 1 indicating the highest level of confidence that the AI system has in a particular intent or objective. For example, a confidence score of 0.9 means that the AI system is 90% certain that a particular intent or objective is the most relevant one for the user's input. The confidence score is used by the AI system to determine how to proceed with the conversation or task based on the level of certainty it has in the user's intent or objective.

The AI system then selects the intent and objective with the highest confidence score as the most relevant one and generates a response to the user. The confidence score can also be used to improve the accuracy of the AI system's future predictions.

For example, if a user asks a virtual assistant for a recipe for chicken noodle soup, the AI system may assign a higher confidence score to the intent of "recipe search" and the objective of "chicken noodle soup" compared to other possible intents and objectives that may be related to the user's input. The confidence score may be expressed as a percentage or a numerical value, with higher scores indicating greater certainty that the intent and objective are correct.

In some cases, an AI system may be designed to generate a confidence score even if the user does not provide any input. To do this, the AI system may use contextual information to make an educated guess about the user's intent or objective.

The AI systems can use various types of contextual information to generate confidence scores, such as user profile data, historical behavior, location, time of day, weather, and device type. User profile data can include age, gender, occupation, and interests, while historical behavior can include search and purchase history. Location can be determined by GPS or IP address, while weather data can also be used. Time of day and device type can also be considered.

For example, if a user has previously searched for recipes for vegetarian meals, an AI system might infer that the user is likely to be interested in vegetarian options when browsing a restaurant menu. Based on this inference, the system could assign a high confidence score to the intent of finding vegetarian options, even if the user has not explicitly stated this intent. Similarly, an AI system could use location data to infer that a user is likely to be looking for nearby businesses or attractions, and assign a high confidence score to the intent of finding nearby options.

In both cases, the AI system is using contextual information to make an educated guess about the user's intent or objective, which can be represented as a confidence score to guide the system's actions.

To generate a set of the most likely intents using the OKB, the AI system uses NLP methods such as semantic analysis and ML algorithms to identify keywords and phrases that indicate the user's intent. The AI system compares the identified keywords and phrases with the OKB, which contains a comprehensive list of intents and associated entities and actions. The AI system uses this comparison to generate a set of the most likely intents that match the user's input.

Additionally, if available, the AI system can use past interactions and user behavior data to improve the accuracy of intent prediction. For example, if a user has previously interacted with the AI system and consistently expressed a certain intent, the AI system can use this information to improve the prediction of future intents.

Furthermore, the AI system evaluates the user's input and available contextual information to determine if additional information is needed to understand the most likely intent and objective accurately.

In another embodiment, if the user did not explicitly tell the AI agent about their intent and objective for the conversational interaction, the AI system can use various techniques to analyze and generate the most relevant entity for the user as well as the most relevant intent and objective for the user based on the context and available information in the environment.

The AI system can utilize the ECAP model to analyze the user's current environment, including their location, time of day, and other relevant factors. This can help the AI system to determine the most relevant entity or physical object in the environment, such as a store, a product, or a service.

The AI system can then employ a CAM that considers the user's interaction history and preferences, as well as the current context, to suggest the most relevant intent and objective for the user. The CAM can incorporate various data sources, such as sensors, computer vision, APIs, and the OKB to provide a comprehensive and accurate analysis of the environment.

The AI system can also use NLP and NLU to analyze the user's input, such as their voice commands or text messages, and extract relevant information, such as entities and keywords. The NLU module can then use this information to identify the user's most relevant intent and objective based on the available context and OKB.

In FIG. 19, the AI system is shown evaluating the user's inputs and contextual information to determine if any additional information is required to improve the accuracy of understanding the most likely intent and objective 1900. The AI system first collects the user's input and any available contextual information 1901, such as the user's location, previous interactions, and historical data.

The AI system applies NLU algorithms to the collected data to analyze the information and form an understanding of the most likely intent and objective 1902. AI system compares the analyzed data with its pre-existing knowledge base to identify any gaps in information or discrepancies that may affect the accuracy of the understanding 1903.

Next, the AI system determines whether any additional information is needed 1904. If the AI system determines that the available contextual information is insufficient or the AI system is unable to determine the user's intent and objective with a reasonable level of confidence, it may request additional information again or provide alternative options for the user to choose from.

To accurately understand the most likely intent and objective, it proceeds to identify the additional information required to improve understanding, including obtaining additional information from the user 1905. After generating a request for clarification or more information from the user 1906, the AI system then determines whether a response from the user is received within a limited time 1907.

If the user does not respond to the AI's request for additional information, the AI system may still attempt to determine the user's intent and objective using the available contextual information and any previous interactions with the user 1908. However, the accuracy of the AI system's understanding may be reduced, and the AI system may provide less relevant or accurate responses or recommendations to the user.

If the user responds to the AI system and provides additional information, the AI system retrieves the relevant information from the appropriate sources 1909 and integrates it with the available contextual information 1910.

The integrated information is analyzed to improve the accuracy of understanding the intent and objective and a response is generated based on this improved understanding. The AI system repeats this process until the confidence level is high enough to generate a response based on the most likely intent and objective.

In one embodiment, the AI system matches the input with the most likely intent and objective from the OKB and evaluates the confidence level of the match. If the confidence level is high, the AI system generates a response based on the most likely intent and objective. However, if the confidence level is low, the AI system checks for missing or unclear information.

If there is missing or unclear information, the AI system prompts the recipient for additional information to improve the accuracy of understanding the most likely intent and objective. This can be done using NLG techniques to produce a response that asks for clarification or elaboration.

In another embodiment, the user can confirm or reject the suggested most likely intent and objective. If the user rejects the suggested most likely intent and objective, the AI system will refer back to the list of generated intents and present the user with the next most relevant intent and objective with the next highest confidence score. The AI system repeats this process until the user confirms the most accurate and relevant intent and objective.

The AI system validates the understanding of the most relevant intent and objective iteratively with the user until they agree. This ensures that the AI system has accurately identified the user's intent and objective and the conversation remains user-centered.

In the process of analyzing data, the AI system uses the OKB as a reference point to evaluate the accuracy of its understanding, wherein the OKB is a repository of pre-existing information and rules that the AI system has acquired through previous interactions and training.

When the AI system analyzes new data, it compares it with the information in the OKB to identify any gaps or discrepancies that may affect the accuracy of its understanding. If the AI system detects any discrepancies or gaps, it may request additional information from the user to clarify or fill in missing information.

For example, if the AI system is analyzing a user's request for a restaurant recommendation, it may compare the user's location, food preferences, and past dining experiences with its knowledge base of restaurants in the area. If the AI system identifies a gap in its knowledge, such as a new restaurant that has recently opened, it may request additional information from the user to update its knowledge base and improve the accuracy of its recommendations.

By continuously comparing and updating its knowledge base, the AI system can improve its accuracy and provide more contextually relevant and personalized responses to the user.

In an embodiment, a user is interacting with a conversational AI agent in a smart home environment. The AI system has analyzed the environment and has predicted a set of most likely intents and objectives based on the user's input collected by the conversational AI agent and contextual information analyzed by the AI system. The UI could show the set of predicted most likely intents and objectives as described options in a menu format on a screen or mobile device. The options could be listed in order of confidence score, with the most likely option at the top of the list. The user could then select the option that best matches their intent or objective, and the AI system could continue the conversation or act based on that selection.

In another embodiment, a conversational AI agent is installed in a public restroom to help users report broken faucets. The user approaches the sink and notices that the faucet is not working properly. The user can then initiate a conversation with the AI agent, either by speaking a voice command or typing a text message.

The conversational AI agent would evaluate the user's input and available contextual information to determine the most likely intent and objective. In this case, the most likely intent and objective would be to report the broken faucet and request that it be fixed. The AI agent would then engage in conversational iterations with the user to gather additional information and validate the most likely intent and objective. For example, the AI agent might ask the user for more details about the faucet, such as the location of the restroom or the severity of the problem. The AI agent also verifies the environment data received and analyzed by the AI system with the user, such as the state of the faucet (e.g., broken, leaking), the time of day, the presence of other users or staff members, and the overall condition of the restroom. This information could be collected through sensors or cameras installed in the restroom, or through manual input from staff members or users reporting an issue.

During this process, the AI agent would use contextual information to generate a confidence score for the user's intent and objective. For example, the AI agent might use the user's location data to determine which maintenance team is responsible for fixing the broken faucet or use historical data on faucet repairs to estimate the timeline for the repair. Once the AI agent has validated the user's intent and objective, it would submit a work order to the appropriate maintenance team and provide the user with a confirmation message. This would allow the maintenance team to quickly and efficiently address the problem and improve the user's experience in the restroom.

In another embodiment, the restroom is equipped with an AI system that is designed to detect and respond to environmental issues. The AI system has access to sensors that detect the presence of people in the restroom and can analyze data about the environment, such as the temperature, humidity, and water pressure.

When a person enters the restroom, the AI agent detects their presence and checks to see if they have conversational capability. If the person has a mobile device with a messaging app or a voice assistant, the AI agent will engage in a conversation with them. The AI agent can then analyze the environment data and detect that the faucet is broken based on the water pressure readings. The AI agent can then predict the most relevant contextual information for the user, such as the location of the nearest functioning faucet, and ask if the user needs assistance. The AI agent can then validate its predicted intent and objective with the user through conversational iterations, such as asking if the user needs help finding a functional faucet or if they have any other concerns. This process can help the AI agent provide personalized assistance to the user and improve their experience in the public restroom.

Referring to FIG. 11, after the AI application validates the most relevant intent and objective with the recipient, the next step is to generate an appropriate response or take the appropriate action. This may involve querying databases or other sources of information to retrieve relevant data, generating a visual or audio response to the recipient, or triggering an action in the environment through connected devices or systems. The response or action taken by the AI application should be tailored to the specific intent and objective identified and should be designed to provide the recipient with the most useful and relevant information or assistance possible.

For example, if the intent is to order food and the objective is to have it delivered to a specific location, the AI application can use information such as the recipient's location, dietary preferences, and previous food orders to suggest specific restaurant options and menu items.

A response can be generated using an encoder-decoder model and a language model AI. The encoder-decoder model is a type of deep neural network that consists of two main components: an encoder and a decoder. The encoder takes in the input sequence, such as a question or a statement, and converts it into a hidden state that captures the semantic meaning of the input. The decoder then uses this hidden state to generate a response sequence, such as an answer or a reply, by predicting one token at a time. The encoder-decoder model is commonly used for sequence-to-sequence tasks, such as machine translation or dialogue generation. The encoder-decoder model consists of two main components: an encoder network that processes the input sequence and generates a fixed-length context vector, and a decoder network that generates an output sequence based on the context vector. In the context of dialogue generation, the encoder-decoder model can be used to generate a preliminary response based on the input sequence.

To generate a more accurate and natural-sounding response, the AI system can also incorporate language models. The encoder-decoder model and the language models are two popular neural network architectures used in natural language processing (NLP) and conversational AI.

Language models are used to predict the likelihood of a sequence of words, based on the probability of each word given its preceding words. Language models can be trained on large amounts of text data to learn the patterns and structures of natural language, and can be used to generate coherent and natural-sounding text.

By combining these two architectures, a more powerful conversational AI system can be created. The AI system can first use the encoder-decoder model to generate a preliminary response based on the input sequence. The encoder-decoder model can use the context vector generated by the encoder network to capture the relevant information in the input sequence and generate a response that is contextually relevant.

However, the preliminary response generated by the encoder-decoder model may not be perfect and may require further refinement. This is where the language models can be used. The AI system can use the language models to refine and optimize the response to make it more accurate and natural sounding. The language models can be used to predict the likelihood of different words and phrases based on the context and generate a more coherent and natural-sounding response.

In various embodiments, the language model AI is designed to understand, process natural language input from users, and generate responses that are contextually relevant and coherent with the ongoing conversation. This is achieved through several mechanisms: (1) Attention mechanism: The language model employs an attention mechanism to dynamically adjust the importance of different parts of the input text, based on their relevance to the current context of the conversation. This allows it to focus on the most important information and generate responses that are more contextually appropriate. (2) Contextual embeddings: The language model uses pre-trained contextual word embeddings to capture the meaning of words and their relationships to each other in the context of the conversation. These embeddings are generated using deep neural network models that are trained on large amounts of text data, allowing the language model to understand and generate responses that are more natural and contextually relevant. (3) Dialogue history: The language model maintains a record of the previous turns in the conversation, along with their corresponding responses. This enables it to keep track of the context of the conversation and generate responses that are consistent with the previous dialogue turns. (4) Fine-tuning: The language model can be fine-tuned on specific domains or topics to improve its ability to generate contextually relevant responses for those domains. This involves training the model on a dataset of conversational data in the target domain, which allows it to learn the specific language and patterns of conversation in that domain.

Furthermore, language models can recognize and respond to users' emotions and sentiments. Sentiment analysis is a natural language processing technique that involves identifying the emotional tone of text, typically as positive, negative, or neutral. Language models can be trained on sentiment analysis tasks to recognize the emotional tone of the user's input and generate responses that are appropriate for the detected sentiments.

There are several ways in which language models can recognize and respond to user's emotions and sentiments: (1) Pre-trained sentiment analysis models: Many pre-trained language models come with pre-trained sentiment analysis models that can recognize the emotional tone of user's input. These models can be used to generate responses that are appropriate for the detected sentiments. (2) Sentiment-specific training data: Language models can be trained on sentiment-specific training data to improve their ability to recognize and respond to user's emotions. For example, a language model can be trained on a dataset of customer reviews to recognize the emotional tone of user's input in the context of customer feedback. (3) Contextual information: Language models can use contextual information, such as the user's previous input, to infer their emotional tone and generate responses that are appropriate for the detected sentiments. For example, if the user expresses frustration or dissatisfaction in their previous input, the language model can use this information to generate a response that addresses their concerns and offers a solution.

Additionally, the AI system can recognize and respond to the user's emotions and sentiments, allowing empathy to be integrated into conversational AI agents. To this end, an empathy model (EM) is introduced to consider the emotional state and needs of the recipient in the conversation, whether it be a human, an AI application, or a physical robot. The EM can be initialized with initial values based on the recipient's evaluated emotional state.

To develop an AI system that exhibits empathetic behavior in conversational interaction, there are several possible approaches. NLP methods can be used to analyze the emotional content of text data, and ML algorithms such as decision trees, random forests, and deep neural networks can be used to predict a person's emotional state from text data. Datasets containing labeled emotional data can be used to train the AI models, and reinforcement learning algorithms can be used to incentivize empathetic behavior in conversation.

In some embodiment, when the conversational AI agent interacts with the user, it can use NLP and the computer vision system to analyze the user's facial expressions, body language, and tone of voice to detect their emotional state. The emotional state can be used to provide a more personalized and empathetic response to the user.

Emotional states are stored in the OKB as a data type with a designated field for emotions. This field can store values that represent different emotional states, such as happy, sad, angry, or neutral. Each emotional state can be associated with a numerical value or a set of values that represent the intensity of the emotion.

For example, the emotional state of happiness can be associated with a numerical value of 1 to 10, with 1 being the lowest level of happiness and 10 being the highest level. The emotional state of anger can be associated with a numerical value of 1 to 10, with 1 being the lowest level of anger and 10 being the highest level.

Emotional states can be represented as a set of attributes associated with an identified object in the OKB. These attributes may include the identified object's emotional valence, arousal level, and specific emotions that it may evoke. For example, a physical object in a smart home environment, such as a lamp, could be associated with a positive emotional valence and a calming effect, while another object, such as an alarm clock, could be associated with a negative valence and a sense of urgency.

To store emotional states in the OKB, the AI system may use various techniques such as NLP and sentiment analysis to analyze text-based data and infer emotional states associated with objects. The AI system may also use sensor data to detect changes in the environment, such as changes in lighting or temperature, and use this information to infer emotional states associated with objects in the environment.

Once emotional states are identified and stored in the OKB, they can be used by the AI system to provide a more contextually relevant and personalized user experience. For example, the AI system may use emotional states associated with the physical objects to adjust lighting or sound levels in a room to create a more calming or stimulating environment, depending on the user's needs and preferences.

In an additional embodiment, the AI system uses empathy recognition and emotional states stored in the OKB to generate empathy responses. To accomplish this, the EM and a language model AI are designed to generate empathy responses conversationally based on the detected emotional states of the recipient's message. First, an empathy response database is initialized, and appropriate responses are retrieved based on the detected emotional states. Second, contextual information from the recipient's message is then added to the selected response, resulting in a more personalized and human-like interaction. The algorithm can be further refined and extended to handle additional emotional states and other factors, such as the recipient's personality or conversational interaction history.

FIG. 20 illustrates a flowchart of how the AI system generates a response using an empathy model (EM) and a language model AI 2000. The process begins with the AI system receiving input in the form of user queries or requests 2001. The language model AI then processes this input to generate a set of possible responses 2002.

Next, the AI system employs the empathy model to analyze the emotional tone of the input 2003 and determine the appropriate emotional response 2004. The empathy model takes into account factors such as the user's emotional states and sentiments, as well as contextual information, to generate a response that is emotionally relevant and appropriate. This emotional response is then integrated with the language model AI-generated responses, resulting in a set of emotionally relevant responses 2005.

The AI system then evaluates these responses based on various factors such as the user's preferences, the contextual information, and the relevance of the response 2006. The AI system selects the most appropriate response 2007 and presents it to the user in a natural and contextually relevant manner 2008.

Empathy responses can be based on the analysis of the recipient's environment, personality, and interaction history in the OKB. In some embodiments, the conversational AI agent analyzes the user's environment, conversational interaction, facial expressions, and body language to detect emotional states. The conversational AI agent also considers factors such as the recipient's personality and interaction history in the OKB. Based on this analysis, the conversational AI agent can update the EM and adjust the conversation accordingly to provide a more personalized and empathetic experience.

For example, if the conversational AI agent detects that the recipient is frustrated, it may adjust its response to be more calming and reassuring. If the recipient is expressing excitement, the conversational AI agent may respond with enthusiasm and energy.

By using the EM and the language model AI, the conversational AI agent can create a more natural and engaging conversation that is tailored to the recipient's emotional state and needs. This approach can help to build trust and rapport between the recipient and the AI, leading to a more human-like and empathetic interaction.

In one embodiment, a user interacts with a customer service chatbot to report an issue with a product they purchased. The conversational AI agent persona can be designed to recognize the user's emotional state based on their language and tone of voice, using techniques such as sentiment analysis and natural language processing. If the user expresses frustration or dissatisfaction, the conversational AI agent can generate an empathy response to acknowledge and validate the user's emotions.

For instance, the conversational AI agent can respond with a message like, "I'm sorry to hear that you're having trouble with your product. I understand how frustrating that can be, and I want to help you find a solution as quickly as possible." This response shows that the conversational AI agent understands the user's emotions and is committed to resolving their issue.

Alternatively, the AI application can use a combination of ML algorithms and a language AI model to generate an empathy response. The ML algorithms can analyze the user's language and tone to identify emotions, while the language AI model can generate appropriate responses based on the context and user input.

By using empathy responses, the AI application can improve the user experience and build trust and rapport with the user. The AI application can also help to de-escalate negative interactions and prevent the user from becoming more frustrated or angry.

For example, the AI application is a virtual tutor that provides academic support to students. A student interacts with the virtual tutor to ask a question about a math problem but is feeling frustrated because they have been struggling with math.

The AI system uses a computer vision system and environment analysis to detect the emotional state of the student, which is evaluated as "frustrated". Based on this emotional state, the AI system retrieves a list of empathy responses from the OKB, such as "I understand that math can be challenging, but with practice, you can improve."

The AI system then selects a response randomly from the list, using a model to set the degree of freedom and adapts the response to the situation in the environment. The selected empathy response is then presented to the student by the virtual tutor.

The virtual tutor also adds contextual information from the student's conversational interaction, such as the specific math problem the student is struggling with. This contextual information is then added to the OKB to update the list of empathy responses for future interactions.

FIG. 21 illustrates the process by which the AI system can identify and respond to user emotional states and sentiments 2100. The flowchart depicts the steps involved in analyzing the user's tone, language, and attitude, generating an appropriate response, and adjusting the response as needed to provide effective communication.

The process starts with the AI system receiving input from the user 2101. The AI system then analyzes the user's tone, language, and attitude using NLP techniques 2102 to identify the user's emotional states and sentiments 2103. Based on this analysis, the AI system generates an appropriate response that considers the user's emotional states and sentiments 2104. Throughout the conversation, the AI system continually evaluates the user's emotional states and sentiments to adjust its responses as needed to provide the most appropriate and effective communication 2105.

For example, if a user is expressing frustration or anger, a conversational AI agent may respond in a more empathetic tone, acknowledging the user's feelings and offering solutions to their problem. On the other hand, if the user is expressing joy or satisfaction, the conversational AI agent may respond with a more positive and congratulatory tone. Throughout this process, the conversational AI agent continually evaluates the user's emotional states and sentiments, adjusting its responses as needed to provide the most appropriate and effective communication.

The conversational AI agent can also incorporate external data sources, such as user profiles and contextual information, to further personalize the conversation and provide more relevant recommendations.

In one embodiment, a conversational AI agent is used as a customer service agent. When a user contacts the conversational AI agent with a complaint or issue, the AI agent analyzes the user's tones and sentiments to determine the emotional state of the user. If the user is angry or frustrated, the AI agent responds in a more empathetic tone, acknowledging the user's feelings and offering solutions to their problem. On the other hand, if the user is happy or satisfied, the AI agent responds with a more positive and congratulatory tone. By tailoring its responses to the user's emotional states and sentiments, the AI agent can provide a more effective and satisfying customer service experience.

In another embodiment, the conversational AI agent is used as a mental health agent. The AI agent analyzes the user's tone, language, and attitude to determine their emotional states and sentiments. If the user is expressing symptoms of depression or anxiety, the AI agent responds in a more compassionate tone, acknowledging the user's feelings and offering coping strategies or resources for seeking professional help. By providing personalized and empathetic responses, the AI agent can help users manage their mental health and well-being.

Another embodiment where the AI system can identify and respond to user emotions and sentiments is in the context of customer service. In this case, the AI system can analyze the tone and language of the customer's message or voice call to identify their emotional states and sentiments, such as frustration or satisfaction with a product or service. Based on this analysis, the AI system can provide a personalized response that is tailored to the customer's emotional states and sentiments. For example, if a customer is expressing frustration with a product or service, the AI system may offer a solution or a discount to address their concerns, while acknowledging their frustration in a compassionate tone.

FIG. 22 illustrates how the AI system can generate personalized recommendations or suggestions based on user preferences and behavior 2200.

The process of providing personalized recommendations or suggestions based on user preferences and behavior starts with the AI system receiving input from the user, such as a search query or selection 2201. This input serves as a starting point for the AI system to generate relevant options for the user.

Once the AI system has received user input, it retrieves user data such as preferences and behavior history 2202. This data is then filtered and analyzed by the AI system to identify relevant options that can be recommended to the user 2203. Based on this analysis, the AI system generates personalized recommendations or suggestions that are tailored to the user's preferences and behavior 2204. These recommendations can take the form of product suggestions, content recommendations, or any other relevant options based on the user's input and data.

The AI system then presents these personalized recommendations or suggestions to the user 2205, who can provide feedback on the options presented 2206. This feedback is valuable in improving the recommendations or suggestions for future interactions with the user. The AI system uses feedback from the user to update the recommendations or suggestions 2207. This iterative process of feedback and data analysis allows the AI system to continually learn and adapt to the user's preferences and behavior. The AI system uses the updated information to update the OKB to improve future recommendations or suggestions 2208.

The process ends when the user has received and responded to the personalized recommendations or suggestions with satisfactory 2209. By leveraging the user's data and feedback, the AI system can provide more relevant and personalized recommendations over time, improving the user experience and driving engagement.

Figure 23:
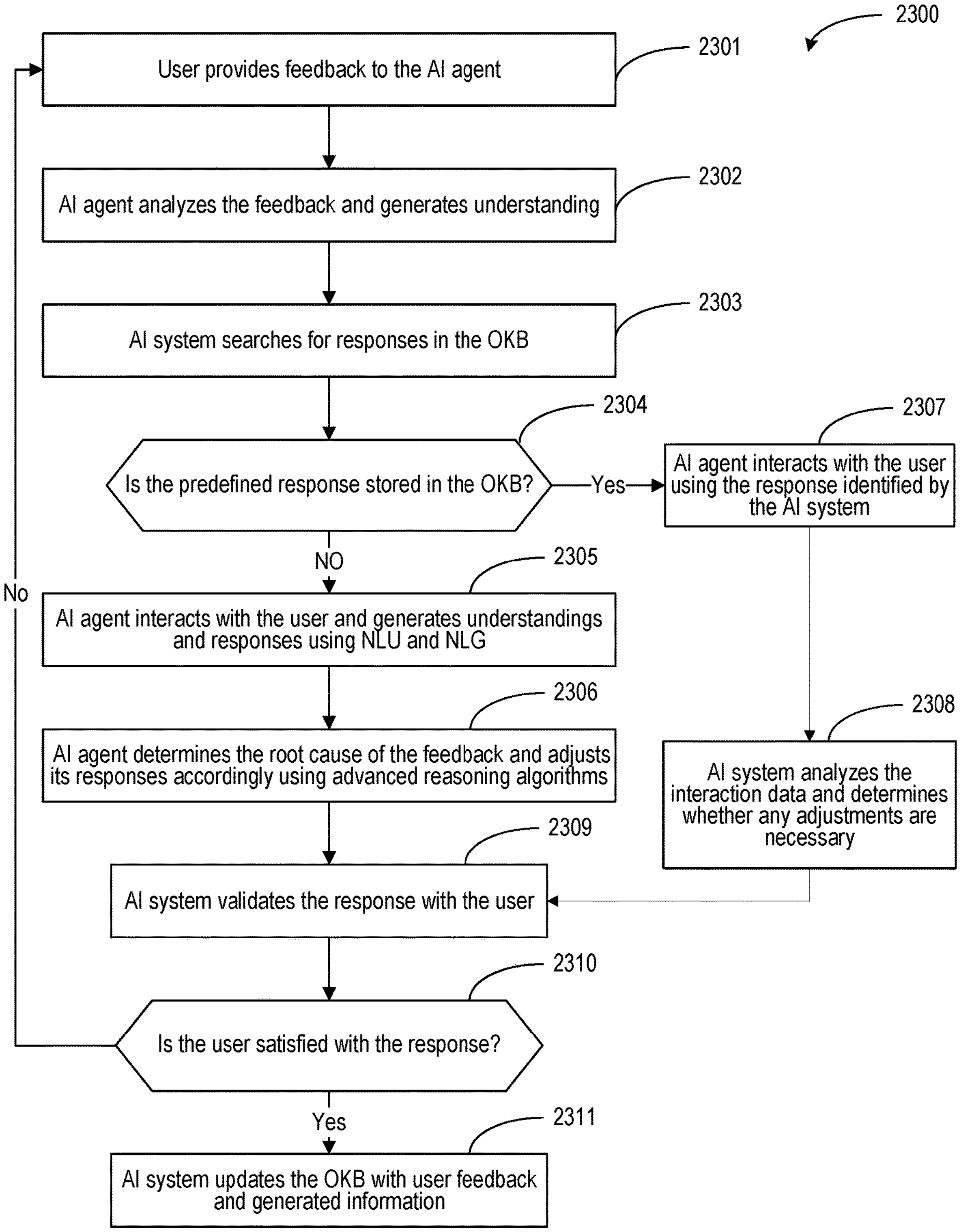
FIG. 23 depicts a flow chart illustrating a process through which a conversational AI agent learns and adapts based on user feedback and advanced reasoning models.

FIG. 23 illustrates the process by which the AI agent can learn and adapt based on user feedback using advanced reasoning algorithms 2300. The chart highlights the steps involved in receiving user feedback, updating the OKB, analyzing the feedback, and adjusting the AI agent's responses accordingly.

The process begins when the user provides feedback to the AI agent, such as correcting a response or indicating dissatisfaction with a recommendation 2301. The AI agent then analyzes the feedback to generate an understanding of user feedback 2302. Next, the AI system searches for responses in the OKB 2303. The AI system determines whether a predefined response is available in the OKB 2304. If there are no predefined responses in the OKB, the AI agent interacts with the user and generates understanding and responses using NLU and NLG 2305. Using advanced reasoning algorithms, the AI agent can determine the root cause of the feedback and adjust its responses accordingly 2306. This process involves analyzing the user's input and context to determine the most likely cause of the feedback and selecting an appropriate response based on this analysis. If a predefined response is in the OKB, the AI agent interacts with the user using the response identified by the AI system 2307. The AI system analyzes the interaction data and determines whether any adjustments are necessary 2308.

The AI system further validates the responses with the user 2309. And the AI system determines whether the user is satisfied with the responses 2310. If the responses satisfy the user, the user feedback and generated information are then updated in the OKB 2311. The new information is then used by the AI system to analyze the feedback and determine the appropriate action to take. If the responses do not satisfy the user, the AI system will collect new feedback from the user.

The flow chart emphasizes the iterative nature of this process, with the AI agent continually learning and adapting based on user feedback to improve its overall performance and provide more contextually relevant and personalized responses.

A user-centered conversational UI selection is a process where the AI system allows the user to select the most appropriate UI/UX for their needs in a given environment. The AI system then generates an appropriate and safe UI based on predefined rules and guidelines.

Note that when a conversational AI agent engages with users by following predefined dialogue and business rules, it is not limited to a single rule set determined by just one member of the responsible party for the object, which could be an organization with multiple subject matter experts. These rules are dynamic, as the AI system can modify them over time.

The process typically starts with the AI system providing the user with multiple options for UI, such as a voice-controlled interface or a touch screen interface. The user can then select the UI that best suits their needs and preferences, such as speaking a voice command, typing text, or making a gesture. In one embodiment, the AI system can generate a customized interface that is safe and appropriate for the user in the environment. For example, if the user is in a car, the AI system can generate a voice-controlled interface that is easy to use while driving and does not distract the user from the road.

In some embodiments, the AI system can predict a most relevant conversational UI if the user allows for the environment data analysis, such as enabling the camera to view the environment. In this case, it is not required for the user to select a desired input format, such as speaking a voice command, typing text, or making a gesture.

The prediction of the most likely UI involves analyzing various factors such as the user's past interactions, preferences, environment, and the context of the current situation. The AI system can use ML algorithms to analyze this data and make predictions based on patterns and trends in the data. Additionally, the AI system may also consider the capabilities and limitations of the available interfaces and select the one that is most suitable for the user's needs and abilities. In the last step, the most likely UI is determined by a combination of the user's preferences and the contextual factors surrounding the interaction. The most likely UI is then generated by the AI agent generator. The purpose of the UI is to provide users with a means of communicating with the AI system using natural language. This can take the form of a chat window, voice interface, or any other appropriate communication method.

Additionally, the UI would display a message asking the user if they would like to enable the camera to view the environment. If the user consents, the AI system would update the OKB and generate a list of most likely UIs based on the environment data analysis.

Figure 24:
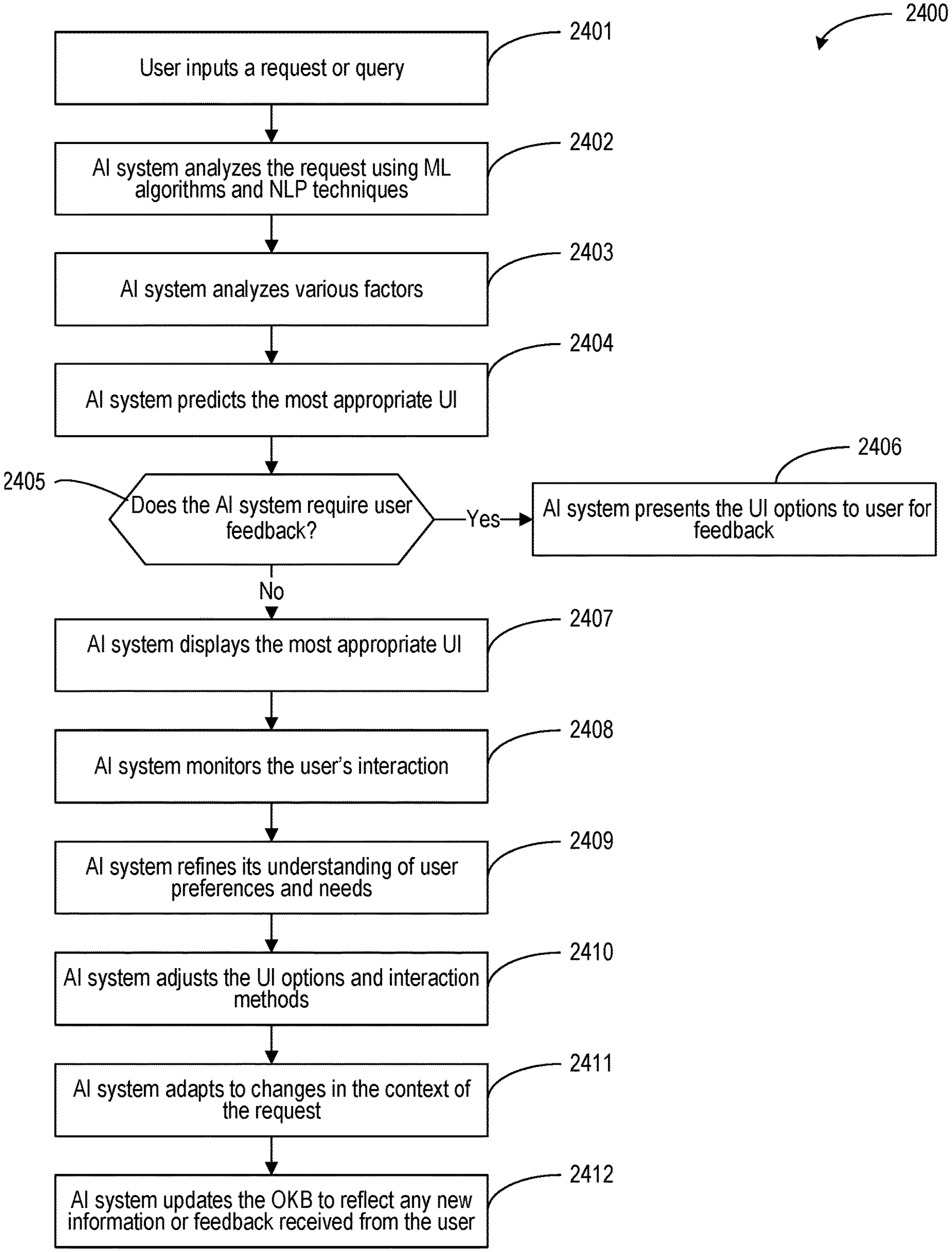
FIG. 24 depicts a flow chart illustrating the determination of the most relevant user interface (UI).

FIG. 24 displays a flow chart that illustrates how the AI system determines the most relevant user interface (UI) for a given user request 2400. The chart outlines the steps involved in selecting the most appropriate UI and adapting it to provide the best user experience.

The process begins with the user inputting a request or query into the AI system 2401. The system analyzes the request using ML algorithms and NLP techniques to interpret and understand the user's intent 2402. The AI system then analyzes various factors, such as the user's previous interactions, preferences, environment, and the context of the request 2403. Based on this analysis, the AI system predicts the most suitable UI to provide to the user 2404.

The AI system may present a range of UI options to the user, including voice commands, text input, gesture recognition, or other methods of interaction, and request feedback 2405. If feedback is required, the AI system presents the UI options for the user to select, allowing them to input further requests or interact with the system as needed 2406. If feedback is not necessary, the AI system displays the most appropriate UI to the user 2407.

Throughout the interaction, the AI system continually monitors the user's input and adjusts the UI and interaction to ensure the most relevant and effective experience for the user 2408. This includes refining the system's understanding of the user's preferences and needs 2409, adjusting the UI options and interaction methods 2410, and adapting to changes in the context of the request 2411. Once the most relevant UI is determined by the AI system and confirmed by the user, the information about the interaction and UI selection is updated in the OKB 2412.

For example, when a customer enters a store, they can access a conversational AI through a store weekly newsletter using their mobile devices to ask questions about products, promotions, and store layout. The conversational AI agent detects the environment and sends the information to the AI system. The AI system analyzes the information and predicts that the most relevant UI in a busy shopping environment will be a GUI with respect to noise and privacy.

If the customer enables the conversational AI agent to access their device's camera, the AI system can analyze the store environment and update the OKB with real-time data about the products and their locations. This allows the conversational AI agent to generate an up-to-date list of most likely intents for the customer to select from.

For example, a customer may ask "Where can I find women's shoes?". The conversational AI agent can search the OKB for information about the store's layout and the location of women's shoes. The AI system can also use image recognition to analyze the store environment and identify the location of women's shoes based on visual cues.

The conversational AI agent can then present the customer with a list of most likely intents, such as "Women's shoes on sale," "New arrivals in women's shoes," and "Women's shoes in your size.". The customer can select the intent that best fits their needs, and the conversational AI agent can provide a personalized response based on the selection.

In one embodiment, mobile devices or smart speakers serve as the primary interface for the user to interact with the AI application and include features such as microphones, speakers, touchscreens, and cameras. In another embodiment, the AI system can also incorporate rules and guidelines to ensure the safety and appropriateness of the interface. For example, the AI system may limit certain functionalities while the user is driving or in other high-risk situations. Additionally, the AI system may provide prompts or warnings to remind the user to use the interface safely and responsibly.

Furthermore, the AI system can provide a personalized UI for interacting with the conversational AI agent. In an embodiment, the UI includes examples of natural language queries and responses. The AI system handles multiple user inputs and generates personalized responses based on user preferences and history by analyzing the user's input, identifying the user's intent, accessing the user's preferences and history from the database, generating a response, and sending the response to the user. The AI system can handle a variety of user inputs, such as voice commands, text input, and gesture recognition, and can use natural language processing to understand and interpret the user's intent. Based on the user's preferences and history, the AI system can generate personalized responses that are tailored to the user's specific needs and interests. The AI system can also adapt and learn from user feedback, improving the accuracy and relevance of its responses over time.

It is to be understood throughout this document that the following terms shall be interpreted as indicated below:

The present invention may be a system, a method, and/or a computer program product at any possible technical detail level of integration. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block in the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block in the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage on a computer readable storage medium within the respective computing/processing device.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform aspects of the present invention.

While embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for enabling a user-centered and contextually relevant conversational interaction, comprising:

receiving, by an artificial intelligence (AI) system, environment data;

analyzing, by the AI system, the environment data to detect a plurality of physical objects in a physical environment;

generating, by the AI system, contextual information about the detected plurality of physical objects in the physical environment, to form a set of contextual understandings of the plurality of physical objects and the physical environment;

identifying, by the AI system, a user relevant to the set of contextual understandings of the plurality of physical objects and the physical environment;

predicting, by the AI system, a most relevant contextual information to the user;

transforming, by the AI system, the most relevant contextual information into a textual form;

predicting, by the AI system, a set of intents and objectives for a user-centered and contextually relevant conversational interaction;

utilizing a user-centered interface and interaction design approach to facilitate the interaction with the user;

utilizing an empathy model (EM) to respond to the user conversationally;

evaluating the user's conversational interaction, facial expression, and body language to detect emotional states and sentiments, considering factors selected from a group consisting of the environment data, the user's personality, and interaction history in an object knowledge base;

initializing the EM based on the detected emotional states and sentiments;

generating, by the EM, an empathy response;

interacting conversationally between the AI system and the user iteratively through the user-centered interaction to determine an understanding of a most relevant intent and a most relevant objective;

validating, by the AI system, the understanding of the most relevant intent and the most relevant objective with the user iteratively until the user agrees; and utilizing, by the AI system, the validated most relevant intent and the most relevant objective to facilitate the user-centered and contextually relevant conversational interaction.

2. The method of claim 1, wherein the generating of the empathy response, further comprises:

retrieving, from the object knowledge base, a list of candidate empathy responses corresponding to the detected emotional states and sentiments;

selecting one of the candidate empathy responses from the list based on a predefined selection criterion;

enriching the selected empathy response with contextual information derived from the environment data and the user's conversational interaction; and updating the object knowledge base to associate the enriched empathy response with the corresponding emotional states and sentiments.

3. The method of claim 1, wherein the receiving of the environment data is performed using a plurality of technologies selected from a group consisting of application programming interfaces (APIs), sensors, and computer vision systems, configured to capture environmental features relevant to the user's context, interaction history, or physical surroundings.

4. The method of claim 1, further comprising:

embedding the AI system in a robot configured to perform the user-centered and contextually relevant conversational interaction through one or more of:

verbal, non-verbal, or multimodal modalities.

5. The method of claim 4, wherein the robot is configured to express empathy using at least one of:

speech output, body gestures, posture adjustment, facial expressions, or tactile interaction with the user, contingent upon user approval.

6. The method of claim 5, wherein the robot's empathetic response is selected based on the user's detected emotional state and surrounding environmental context.

7. The method of claim 1, wherein the AI system is further configured to utilize a set of security and privacy rules to control access to user-specific data, including emotional state, interaction history, and environment data, based on user-defined preferences or system policy.

8. A method for enabling a user-centered and contextually relevant conversational interaction, comprising:

receiving, by an artificial intelligence (AI) system, environment data;

analyzing, by the AI system, the environment data to detect a plurality of physical objects in a physical environment;

generating, by the AI system, contextual information about the detected plurality of physical objects to form a set of contextual understandings of the plurality of physical objects and the physical environment, the generating further comprising:

preprocessing the environment data of the plurality of physical objects in the physical environment;

classifying and categorizing the environment data;

labeling the classified and categorized environment data to form a plurality of labeled data;

associating a selected classified and categorized environment data with a selected object;

determining, from the selected classified and categorized environment data, whether the selected object is in an object knowledge base;

responsive to determining that the selected object is not in the object knowledge base:

automatically adding the selected object and the selected classified and categorized environment data associated with the selected object to the object knowledge base;

responsive to identifying that the selected object is in the object knowledge base:

retrieving information about the selected object from the object knowledge base;

utilizing the retrieved information about the selected object in the knowledge base to form an understanding of context for the user-centered and contextually relevant conversational interaction;

iteratively labeling the classified and categorized environment data to identify candidate entities with conversational capability, and validating one of the candidate entities as the user through subsequent interaction;

identifying, by the AI system, a user relevant to the set of contextual understandings of the plurality of physical objects and the physical environment;

predicting, by the AI system, a most relevant contextual information to the user;

transforming, by the AI system, the most relevant contextual information into a textual form;

predicting, by the AI system, a set of intents and objectives for a user-centered and contextually relevant conversational interaction;

utilizing a user-centered interface and interaction design approach to facilitate the interaction with the user;

utilizing an empathy model (EM) to respond to the user conversationally;

evaluating the user's conversational interaction, facial expression, and body language to detect emotional states and sentiments, considering factors selected from a group consisting of the environment data, the user's personality, and interaction history in an object knowledge base;

initializing the EM based on the detected emotional states and sentiments;

generating, by the EM, an empathy response;

interacting conversationally between the AI system and the user iteratively through the user-centered interaction to determine an understanding of a most relevant intent and a most relevant objective;

validating, by the AI system, the understanding of the most relevant intent and the most relevant objective with the user iteratively until the user agrees; and utilizing, by the AI system, the validated most relevant intent and the most relevant objective to facilitate the user-centered and contextually relevant conversational interaction.

9. The method of claim 8, wherein the step of iteratively labeling the classified and categorized environment data to identify candidate entities with conversational capability, and validating one of the candidate entities as the user through subsequent interaction, further comprises:
predicting the most relevant contextual information for a candidate entity;
attempting to interact conversationally with the candidate entity using the predicted contextual information;
waiting for a response to the attempted interaction for a limited period of time;
responsive to receiving a positive response within the limited period of time from the candidate entity:
interacting conversationally with the candidate entity to confirm that the candidate entity is the user;
applying a user-centered conversational approach to form an understanding of a most relevant intent and a most relevant objective in a user-centered conversational interaction;
responsive to detecting an absence of a response within the limited period of time:
iteratively searching for an additional candidate entity with conversational capability; and
updating the object knowledge base with the information generated from the user-centered conversational interaction.

10. The method of claim 8, wherein the user is an AI application configured to interact with the system to request contextual information or initiate conversational workflows.

11. The method of claim 8, wherein the step of labeling the classified and categorized environment data further comprises:
identifying a source or contributor associated with the plurality of labeled data;
assigning a unique identifier to the contributor;
annotating the plurality of labeled data with the assigned identifier;
enriching the annotations with human-readable descriptive information generated by a language model; and
storing the annotated data in the object knowledge base.

12. The method of claim 11, wherein the plurality of labeled data is selected from the group consisting of image data, audio data, emotional data, environmental data, location data, time data, and interaction data.

13. The method of claim 11, wherein the contributor is selected from the group consisting of an object, an entity, an AI application, and an AI system.

14. A method for enabling a user-centered and contextually relevant conversational interaction, comprising:
receiving, by an artificial intelligence (AI) system, environment data;
analyzing, by the AI system, the environment data to detect a plurality of physical objects in a physical environment;
generating, by the AI system, contextual information about the detected plurality of physical objects to form a set of contextual understandings;
identifying, by the AI system, a user relevant to the set of contextual understandings of the physical objects and the physical environment;
scraping, by the AI system, information automatically through authorized sources and open APIs;
curating the scraped information to form curated data;
processing and analyzing the curated data using machine learning algorithms;
predicting, by the AI system, the most relevant contextual information to the user;
transforming, by the AI system, the most relevant contextual information into a textual form;
predicting, by the AI system, a set of intents and objectives for a user-centered and contextually relevant conversational interaction;
utilizing a user-centered interface and interaction design approach to facilitate the interaction with the user;
utilizing an empathy model (EM) to respond to the user conversationally;
evaluating the user's conversational interaction, facial expression, and body language to detect emotional states and sentiments, considering factors selected from a group consisting of the environment data, the user's personality, and interaction history in an object knowledge base;
initializing the EM based on the detected emotional states and sentiments;
generating, by the EM, an empathetic response;
interacting conversationally between the AI system and the user iteratively through the user-centered interaction to determine an understanding of a most relevant intent and a most relevant objective;
validating, by the AI system, the understanding of the most relevant intent and the most relevant objective with the user iteratively until the user agrees;
utilizing, by the AI system, the validated most relevant intent and the most relevant objective to facilitate the user-centered and contextually relevant conversational interaction;
applying an automated program generator to create programming scripts to update the object knowledge base iteratively; and
enhancing the accuracy of understanding relationships among entities and physical objects using user-centered, contextually relevant conversational interaction data.

15. The method of claim 14, wherein the most relevant contextual information is selected from the group consisting of image data, audio data, emotional data, environmental data, location data, time data, and interaction data.

16. The method of claim 14, wherein the analyzing of the environment data further comprises:
utilizing an environmental contextual analysis and prediction (ECAP) model, a context matching (CM) method, and a context-aware model (CAM);
converting the textual form into a non-textual form; and
interacting with the user using a combination of the textual form and the non-textual form.

17. The method of claim 14, wherein the step of interacting conversationally between the AI system and the user iteratively further comprises:
predicting the most relevant user interface for the user;
generating the most relevant user interface utilizing an automated interface generator;
interacting with the user using the most relevant user interface;
managing, by the AI system, a flow of user-centered and contextually relevant conversational interactions utilizing the user's inputs, environment data, and the context of the interaction; and
iteratively updating the object knowledge base with the contextually relevant conversational interactions.

18. The method of claim 17, wherein the step of predicting the most relevant user interface further comprises:
analyzing the user and the environment using an ECAP model and a behavioral model;

dynamically generating the predicted most relevant user interface;

utilizing the generated user interface for interacting with the user;

validating the user interface with the user for acceptance; and storing the validated user interface and the associated interactions between the AI system and the user in the object knowledge base.

19. The method of claim 18, wherein the user interface includes voice-based, gesture-based, or multimodal interaction components.

20. The method of claim 14, wherein determining the understanding of the most relevant intent and the most relevant objective in the user-centered conversational interaction, further comprises:

analyzing the set of intents and objectives for the user-centered interaction generated by language models;

predicting a set of most likely intents and objectives of the user by utilizing the most relevant information to the user and an intent and objective recognizer;

interacting conversationally with the user utilizing the predicted set of most likely intents and objectives;

evaluating the user's input and available contextual information to determine whether additional information is required to improve the accuracy of the understanding of the set of most likely intents and objectives;

responsive to determining the additional information is required:

refining the predicting of the set of most likely intents and objectives of the user;

calculating confidence scores for the set of predicted most likely intents and objectives based on the refined predicting;

selecting a most likely intent and objective with a highest confidence score along with the most relevant contextual information to further interact conversationally with the user to form user-centered conversational interaction; and updating the object knowledge base with the user-centered conversational interaction.

* * * * *